US012577455B2

(12) United States Patent
Kawakami et al.

(10) Patent No.: US 12,577,455 B2
(45) Date of Patent: Mar. 17, 2026

(54) PHOTOCHROMIC COMPOUND, PHOTOCHROMIC COMPOSITION, PHOTOCHROMIC ARTICLE AND SPECTACLES

(71) Applicant: HOYA LENS THAILAND LTD., Pathumthani (TH)

(72) Inventors: Hironori Kawakami, Tokyo (JP); Aoi Matsue, Tokyo (JP); Kei Kobayashi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 44 days.

(21) Appl. No.: 18/209,034

(22) Filed: Jun. 13, 2023

(65) Prior Publication Data

US 2023/0323197 A1 Oct. 12, 2023

Related U.S. Application Data

(63) Continuation of application No. PCT/JP2022/011105, filed on Mar. 11, 2022.

(30) Foreign Application Priority Data

Mar. 12, 2021 (JP) ................................ 2021-040294

(51) Int. Cl.
*C09K 9/02* (2006.01)
*G02B 1/10* (2015.01)

(52) U.S. Cl.
CPC .................. *C09K 9/02* (2013.01); *G02B 1/10* (2013.01); *C09K 2211/1018* (2013.01)

(58) Field of Classification Search
CPC ..... C09K 9/02; C09K 2211/1018; G02B 1/10
See application file for complete search history.

(56) References Cited

U.S. PATENT DOCUMENTS

| | | | | |
|---|---|---|---|---|
| 2006/0228557 | A1* | 10/2006 | Kim | C07D 493/04 544/31 |
| 2012/0145973 | A1* | 6/2012 | Bancroft | C09K 9/02 544/150 |
| 2012/0145975 | A1* | 6/2012 | Chopra | G03C 1/73 544/150 |
| 2014/0225050 | A1* | 8/2014 | Shimizu | C07D 405/12 549/330 |

FOREIGN PATENT DOCUMENTS

| | | | | |
|---|---|---|---|---|
| CN | 101180575 | A | 5/2008 | |
| CN | 103635470 | A | 3/2014 | |
| JP | 2000219686 | A * | 8/2000 | C09K 9/02 |
| JP | 2008-535971 | A | 9/2008 | |
| JP | 2008-537762 | A | 9/2008 | |
| KR | 10-2016-0140751 | A | 12/2016 | |
| WO | 96/14596 | A1 | 5/1996 | |
| WO | 00/15631 | A1 | 3/2000 | |
| WO | 00/39245 | A1 | 7/2000 | |
| WO | 2006/110219 | A1 | 10/2006 | |
| WO | 2006/110221 | A1 | 10/2006 | |
| WO | 2006/110513 | A1 | 10/2006 | |
| WO | 2012/030518 | A1 | 3/2012 | |
| WO | 2013/042800 | A1 | 3/2013 | |
| WO | 2013/086248 | A1 | 6/2013 | |
| WO | 2015/148619 | A1 | 10/2015 | |
| WO | 2021/244442 | A1 | 12/2021 | |

OTHER PUBLICATIONS

May 31, 2022 Search Report issued in International Application No. PCT/JP2022/011105.
De Azevedo et al. "Synthesis and Photochromism of Novel Pyridyl-Substituted Naphthopyrans"; The Journal of Organic Chemistry; vol. 85; 2020; pp. 10772-10796.
Sallenave et al.; "5-Nitrogenated-naphthopyrans: toward photoinduced hydrogen-bonded complexes"; Journal of Physical Organic Chemistry; 2007; vol. 20; pp. 872-877.
Frigoli et al.; "Synthesis and photochromic behaviour of a series of benzopyrans bearing an N-phenyl-carbazole moiety: photochromism control by the steric effect"; Photochemical & Photobiological Sciences; 2020; vol. 19; pp. 1344-1355.
Abe, Jiro; "Recent Advances in Photochromic Molecules with Fast Thermal Bleaching Rate"; Photochemistry; 2012; vol. 43; No. 1; pp. 1-9.
Jun. 4, 2024 Office Action issued in Japanese Patent Application No. 2023-505663.
Sep. 12, 2023 International Preliminary Report on Patentability issued in International Patent Application No. PCT/JP2022/011105.
Feb. 24, 2025 Search Report issued in European Patent Application No. 22767288.8.
Jan. 7, 2025 Office Action issued in Japanese Patent Application No. 2023-505663.
Jan. 14, 2025 Office Action issued in Korean Patent Application No. 10-2023-7020341.
Apr. 26, 2025 Office Action issued in Chinese Patent Application No. 202280008237.7.
Aug. 30, 2025 Office Action issued in Chinese Patent Application No. 202280008237.7.

* cited by examiner

*Primary Examiner* — Bijan Ahvazi
(74) *Attorney, Agent, or Firm* — Oliff PLC

(57) ABSTRACT

Provided is a photochromic compound represented by the following General Formula 1. In General Formula 1, Az represents a monovalent azine ring group which is unsubstituted or has a substituent, L represents a divalent or higher linking group, D represents a photochromic dye structure, a and c each independently represent an integer of 1 or more, b represents 0 or an integer of 1 or more; and when there are a plurality of Az's in General Formula 1, the plurality of Az's may be the same as or different from each other, and when there are a plurality of L's in General Formula 1, the plurality of L's may be the same as or different from each other.

(General Formula 1)

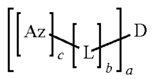

16 Claims, No Drawings

PHOTOCHROMIC COMPOUND, PHOTOCHROMIC COMPOSITION, PHOTOCHROMIC ARTICLE AND SPECTACLES

CROSS-REFERENCE TO RELATED APPLICATIONS

This application is a Continuation of PCT International Application No. PCT/JP2022/011105 filed on Mar. 11, 2022, which was published under PCT Article 21 (2) in Japanese and claims priority under 35 U.S.C. § 119 (a) to Japanese Patent Application No. 2021-040294 filed on Mar. 12, 2021. Each of the above applications is hereby expressly incorporated by reference, in its entirety, into the present application.

TECHNICAL FIELD

The present disclosure relates to a photochromic compound, a photochromic composition, a photochromic article and spectacles.

BACKGROUND ART

A photochromic compound is a compound having a property of coloring under emission of light in a wavelength range having photoresponsivity and fading without light emission (photochromic properties). For example, WO2000/15631 and WO1996/14596, which are expressly incorporated by reference, in their entirety, disclose naphthopyran compounds having photochromic properties.

SUMMARY

For example, photochromic properties can be imparted to optical articles such as spectacle lenses by a method of incorporating a photochromic compound into a substrate, a method of forming a layer containing a photochromic compound or the like.

As an example, a photochromic compound undergoes structural conversion into a colored component through an excited state when it receives light such as sunlight. The structure after structural conversion via light emission may be called a "colored component". On the other hand, the structure before light emission may be called a "colorless component". Here, regarding the colorless component, the term "colorless" is not limited to being completely colorless, and includes a case in which the color is lighter than that of the colored component. Examples of properties desired for a photochromic compound include exhibiting a fast fade rate after being colored by light irradiation.

The present disclosure provides for a photochromic compound having a high fade rate.

One aspect of the present disclosure relates to a photochromic compound represented by the following General Formula 1.

[C1]

(General Formula 1)

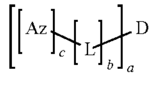

In General Formula 1, Az represents a monovalent azine ring group which is unsubstituted or has a substituent, L represents a divalent or higher linking group, D represents a photochromic dye structure (may also called a "dimming dye structure"), a and c each independently represent an integer of 1 or more, b represents 0 or an integer of 1 or more. When there are a plurality of Az's in General Formula 1, the plurality of Az's may be the same as or different from each other, and when there are a plurality of L's in General Formula 1, the plurality of L's may be the same as or different from each other.

In addition, one aspect of the present disclosure relates to a photochromic composition containing a photochromic compound represented by General Formula 1.

In addition, one aspect of the present disclosure relates to a photochromic article containing a photochromic compound represented by General Formula 1.

Regarding the photochromic compound represented by General Formula 1 having the azine ring group substituted directly or via a linking group in a photochromic dye structure, the inventors conducted extensive studies, and as a result, newly found that such a photochromic compound can exhibit a fast fade rate.

According to one aspect of the present disclosure, it is possible to provide a photochromic compound having a high fade rate.

DESCRIPTION OF EMBODIMENTS

As an example, a photochromic compound undergoes structural conversion into a colored component through an excited state when it receives light such as sunlight. The structure after structural conversion via light emission may be called a "colored component". On the other hand, the structure before light emission may be called a "colorless component". However, regarding the colorless component, "colorless" is not limited to being completely colorless, and includes a case in which the color is lighter than that of the colored component. The structures of General Formula 1 and general formulae to be described below are structures of respective colorless components.

In the present disclosure and this specification, the term "photochromic article" refers to an article containing a photochromic compound. The photochromic article according to one aspect of the present disclosure contains one or more compounds represented by General Formula 1 as a photochromic compound. The photochromic compound can be incorporated into a substrate of a photochromic article and/or can be incorporated into a photochromic layer in a photochromic article having a substrate and a photochromic layer. The term "photochromic layer" is a layer containing a photochromic compound.

In the present disclosure and this specification, the term "photochromic composition" refers to a composition containing a photochromic compound. The photochromic composition according to one aspect of the present disclosure contains one or more compounds represented by General Formula 1 as a photochromic compound, and can be used for producing a photochromic article according to one aspect of the present disclosure.

[Photochromic Compound]

In the present disclosure and this specification, substituents contained in compounds represented by General Formula 1 and various substituents contained in compounds represented by various general formulae to be described below may each independently represent, a substituent $R'''$ selected from the group consisting of linear or branched alkyl groups having 1 to 18 carbon atoms such as a hydroxy group, methyl group, ethyl group, propyl group, butyl group, pentyl group, and hexyl group, monocyclic or multicyclic cycloaliphatic alkyl groups such as a bicyclic ring having 5 to 18 carbon atoms such as a cyclopentyl group and cyclohexyl group, linear or branched alkoxy groups having 1 to 24 constituent atoms such as a methoxy group, ethoxy group, and butoxy group, linear or branched perfluoroalkyl groups having 1 to 18 carbon atoms such as non-aromatic cyclic substituents having 1 to 24 constituent atoms and a trifluoromethyl group, linear or branched perfluoroalkoxy groups such as a trifluoromethoxy group, linear or branched alkylsulfide groups having 1 to 24 constituent atoms such as a methylsulfide group, ethylsulfide group, and butylsulfide group, aryl groups such as a phenyl group, naphthyl group, anthracenyl group, fluoranthenyl group, phenanthryl group, pyranyl group, perylenyl group, styryl group, and fluorenyl group, aryloxy groups such as a phenyloxy group, arylsulfide groups such as a phenylsulfide group, heteroaryl groups such as a pyridyl group, furanyl group, thienyl group, pyrrolyl group, benzofuranyl group, benzothiophenyl group, indolyl group, dibenzofuranyl group, dibenzothiophenyl group, carbazolyl group, diazolyl group, triazolyl group, quinolinyl group, phenothiazinyl group, phenoxazinyl group, phenazinyl group, thianthryl group, and acridinyl group, monoalkylamino groups such as an amino group ($-NH_2$) and monomethylamino group, dialkylamino groups such as a dimethylamino group, monoarylamino groups such as a monophenylamino group, diarylamino groups such as a diphenylamino group, cyclic amino groups such as a piperidino group, morpholino group, thiomorpholino group, tetrahydroquinolino group, and tetrahydroisoquinolino group, an ethynyl group, a mercapto group, a silyl group, a sulfonic acid group, an alkylsulfonyl group, a formyl group, a carboxy group, a cyano group and halogen atoms such as a fluorine atom, chlorine atom, bromine atom, and iodine atom; or a substituent in which $R'''$ is additionally substituted with one or more of the same or different $R'''$'s.

Two or more substituents may be bonded to form a ring structure.

As an example of the substituent in which the above $R'''$ is additionally substituted with one or more of the same or different $R'''$'s, a structure in which the terminal carbon atom of an alkoxy group is additionally substituted with an alkoxy group, and the terminal carbon atom of the alkoxy group is additionally substituted with an alkoxy group may be exemplified. In addition, as another example of the substituent in which the above $R'''$ is additionally substituted with one or more of the same or different $R'''$'s, a structure in which two or more positions among five substitutable positions of a phenyl group are substituted with the same or different $R'''$'s may be exemplified. However, the present disclosure is not limited to such examples.

In the present disclosure and this specification, the terms "number of carbon atoms" and "number of constituent atoms" refer to the numbers including the number of carbon atoms or the number of atoms of the substituent with respect to a group having a substituent.

In addition, in the present disclosure and this specification, substituents contained in the compound represented by General Formula 1 and various substituents contained in compounds represented by various general formulae to be described below may each independently be a solubilizing group. In the present disclosure and this specification, the "solubilizing group" refers to a substituent that can contribute to increasing the compatibility with any liquid or a specific liquid. Examples of solubilizing groups include alkyl groups containing a linear, branched or cyclic structure having 4 to 50 carbon atoms, linear, branched or cyclic alkoxy groups having 4 to 50 constituent atoms, linear, branched or cyclic silyl groups having 4 to 50 constituent atoms, those in which some of the above groups are substituted with a silicon atom, sulfur atom, nitrogen atom, phosphorus atom or the like, and those obtained by combining two or more of the above groups, and the solubilizing group may be a substituent that can contribute to promoting thermal motion of molecules of the compound according to inclusion of this substituent. A compound having a solubilizing group as a substituent can inhibit the distance between solute molecules from decreasing and prevent the solute from solidifying, and can lower the melting point and/or glass transition temperature of the solute and create a molecule aggregation state close to that of a liquid. Therefore, the solubilizing group can liquefy a solute or increase the solubility of the compound having this substituent in a liquid. In one aspect, the solubilizing group may be an n-butyl group, n-pentyl group, n-hexyl group, and n-octyl group which are a linear alkyl group, a tert-butyl group which is a branched alkyl group, or a cyclopentyl group and a cyclohexyl group which are a cyclic alkyl group.

The substituent may be a substituent selected from the group consisting of a methoxy group, ethoxy group, phenoxy group, methylsulfide group, ethylsulfide group, phenylsulfide group, trifluoromethyl group, phenyl group, naphthyl group, dibenzofuranyl group, dibenzothiophenyl group, carbazolyl group, phenothiazinyl group, phenoxazinyl group, phenazinyl group, acridinyl group, dimethylamino group, diphenylamino group, piperidino group, morpholino group, thiomorpholino group, cyano group and solubilizing group, and may be a substituent selected from the group consisting of a methoxy group, phenoxy group, methylsulfide group, phenylsulfide group, trifluoromethyl group, phenyl group, dimethylamino group, diphenylamino group, piperidino group, morpholino group, thiomorpholino group, cyano group and solubilizing group.

Hereinafter, compounds represented by General Formula 1 will be described in more detail. For partial structures described below, "*" represents a position where such a partial structure bonds to an adjacent atom.

[C2]

(General Formula 1)

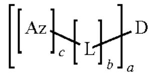

In General Formula 1, Az represents a monovalent azine ring group which is unsubstituted or has a substituent, L represents a divalent or higher linking group, D represents a photochromic dye structure, a and c each independently represent an integer of 1 or more, b represents 0 or an integer of 1 or more; and when there are a plurality of Az's in General Formula 1, the plurality of Az's may be the same as or different from each other, and when there are a plurality of L's in General Formula 1, the plurality of L's may be the same as or different from each other.

Az represents a monovalent azine ring group which is unsubstituted or has a substituent. For substituents when present, the description regarding the above substituents can be referred to. The azine ring group may have one or two or more substituents. When there are two or more substituents, the plurality of substituents may be the same as or different from each other. The azine ring is a 6-membered aromatic heterocycle containing one or more nitrogen atoms or a condensed ring partially containing a 6-membered aromatic heterocycle containing one or more nitrogen atoms. The inventors speculate that the inclusion of Az in General Formula 1 contributes to an ability of the photochromic compound represented by General Formula 1 to exhibit a fast fade rate after light emission. However, the present disclosure is not limited by the speculation described in this specification.

In one aspect, regarding the azine ring group, azine ring groups selected from the following groups may be exemplified. In the following, X represents a nitrogen atom or a carbon atom which is unsubstituted or has a substituent. However, since the following structure represents an azine ring group, one or more of the plurality of X's contained in each of the following structures represent a nitrogen atom. The plurality of X's contained in each azine ring group may be the same as or different from each other. * represents a bonding position with L (when b is an integer of 1 or more) or D (when b is 0 (in such cases, Az is bonded to D with a single bond)).

[C3]

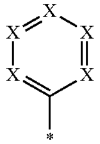

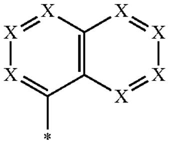

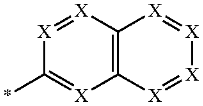

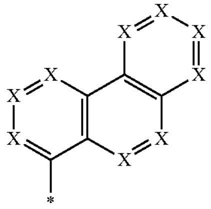

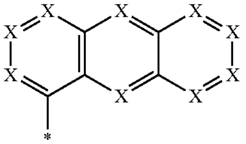

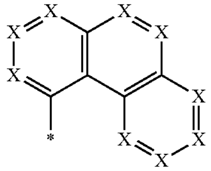

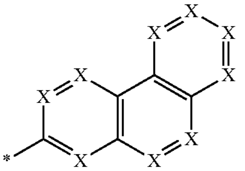

-continued

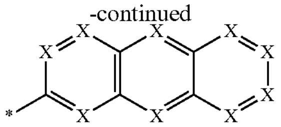

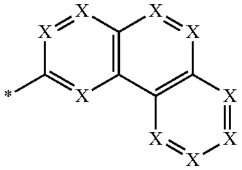

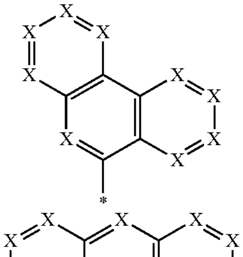

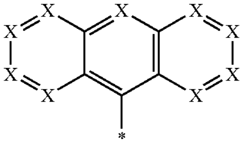

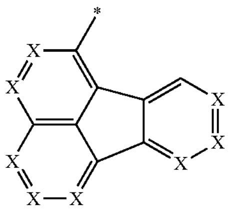

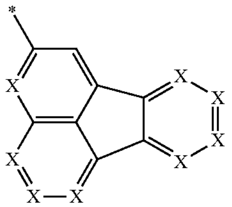

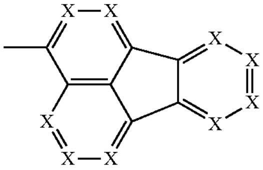

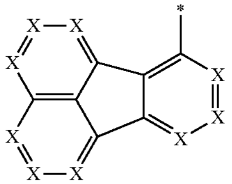

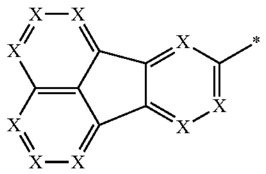

Specific examples of azine rings contained in the azine ring group include a pyridine ring, pyridazine ring, pyrimidine ring, pyrazine ring, triazine ring, quinoline ring, isoquinoline ring, quinazoline ring, quinoxaline ring, benzoquinazoline ring, and azafluoranthene ring.

When the carbon atom represented by X has a substituent, for such substituents, the above description regarding substituents can be referred to.

In one aspect, the azine ring group may be an azine ring group selected from the following groups.

[C4]

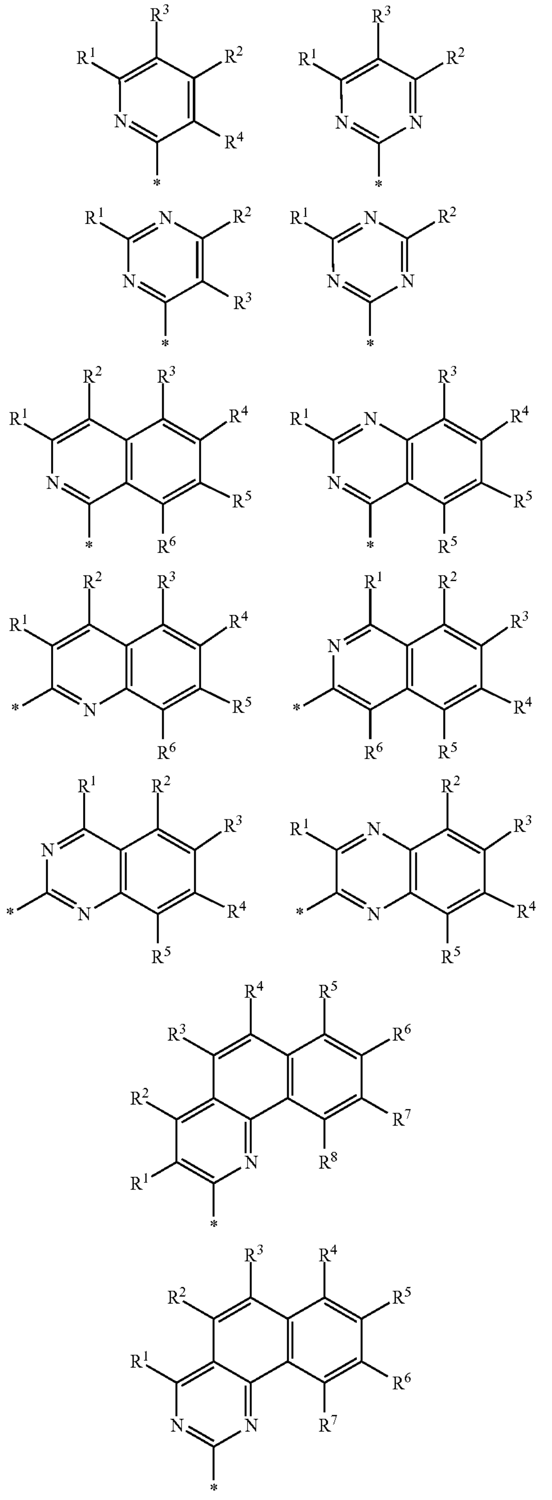

-continued

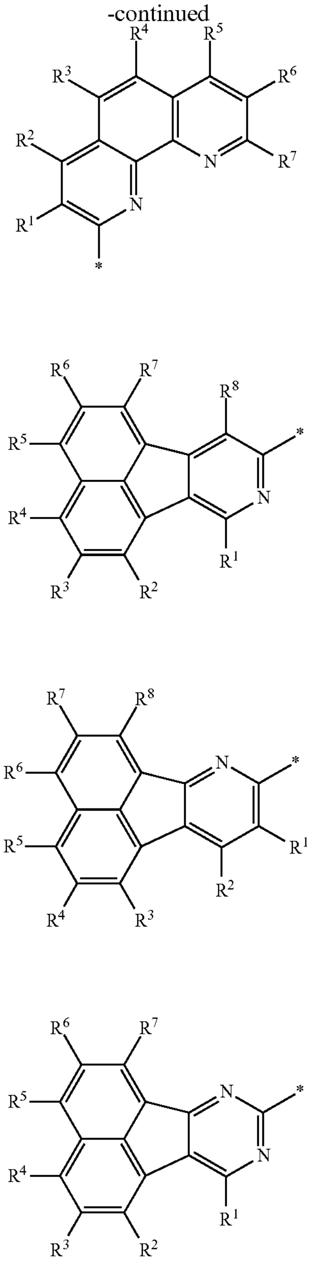

In the above, $R^1$ to $R^8$ each independently represent a hydrogen atom or a substituent. For substituents, the above description regarding substituents can be referred to. Two or more substituents may be bonded to form a ring structure. * represents a bonding position with L when b is an integer of 1 or more and a bonding position with D when b is 0.

In order to further increase the fade rate, the azine ring group represented by Az in General Formula 1 may be a group in which, among constituent atoms constituting the azine ring, one or both of constituent atoms at two positions adjacent to a carbon atom bonded to a linking group L (when b is an integer of 1 or more) or a photochromic dye structure D (when b is 0) are a nitrogen atom, and may be a group in which nitrogen atoms are positioned in both of the positions.

Among the above examples, the azine ring groups may be the following azine ring groups (a), (b) and (c), or the following azine ring groups (b) and (c).

[C5]

(a)

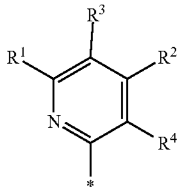

(b)

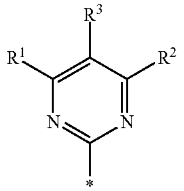

(c)

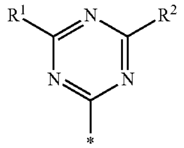

$R^1$ and $R^2$ in the azine ring group (b) each independently may represent a phenyl group or a methoxy group, and may represent a phenyl group. In addition, $R^3$ in the azine ring group (b) may represent a hydrogen atom.

$R^1$ and $R^2$ in the azine ring group (c) each independently may represent a phenyl group or a methoxy group, and may represent a phenyl group.

In General Formula 1, L represents a divalent or higher linking group. Specific examples of such linking groups include an alkylene group, alkenylene group, arylene group, heteroarylene group, polyalkylene oxide oligomer chain group, polyester oligomer chain group, polysiloxane chain group, and polyester polyether oligomer chain group, and the specific examples includes an arylene group and a heteroarylene group. The specific examples include a phenylene group. Each group exemplified as the linking group may be unsubstituted or may have a substituent. For substituents, the above description regarding substituents can be referred to.

In General Formula 1, D represents a photochromic dye structure. "Photochromic dye structure" is a structure that provides photochromic properties to the compound represented by General Formula 1. The compound represented by General Formula 1 can reversibly change its structure depending on the presence of light emission when it contains a photochromic dye structure as described above. Examples of photochromic dye structures represented by D include azobenzene and its derivatives, spiropyran and its derivatives, spirooxazine and its derivatives, benzopyran and its derivatives, naphthopyran and its derivatives, indeno-fused naphthopyran and its derivatives, fluoranthenopyran and its derivatives, phenanthropyran and its derivatives, triphenylenopyran and its derivatives, bisimidazole and its derivatives, donor-acceptor Stenhouse adduct (DASA) and its derivatives, salicylalaniline and its derivatives, dihydropyrene and its derivatives, anthracene dimer and its derivatives, fulgide and its derivatives, diarylethene and its derivatives, phenoxynaphthacenequinone and its derivatives, and stilbene and its derivatives.

In one aspect, the photochromic dye structure represented by D may be a photochromic dye structure selected from the group consisting of naphthopyran and its derivatives and indeno-fused naphthopyran and its derivatives. Examples of the compound represented by General Formula 1 having such a photochromic dye structure include compounds represented by the following general formulae.

[C6]

(General Formula 3)

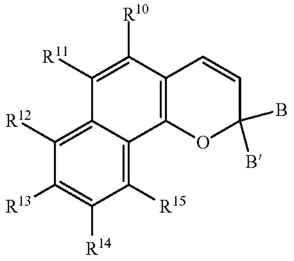

(General Formula 4)

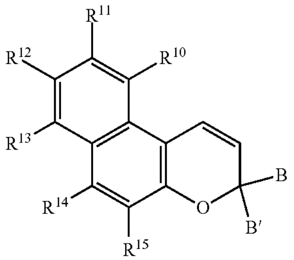

(General Formula 5)

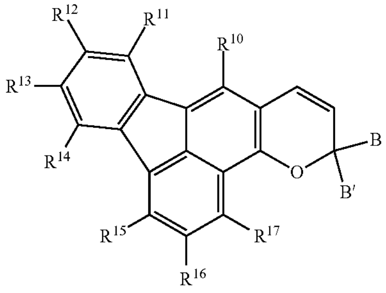

(General Formula 6)

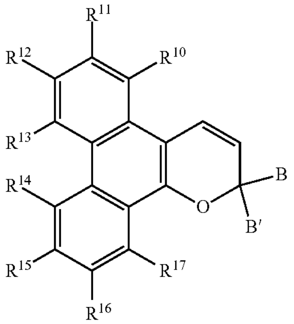

-continued

[C7]

(General Formula 7)

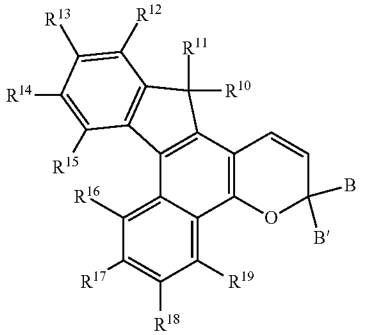

(General Formula 8)

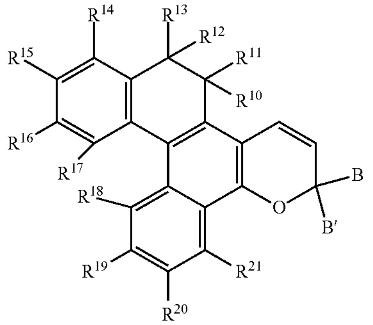

(General Formula 9)

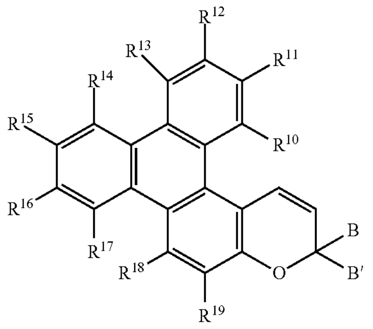

[C8]

(General Formula 10)

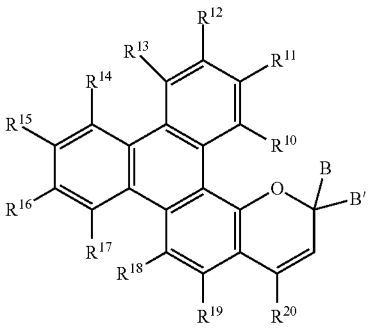

-continued (General Formula 11)

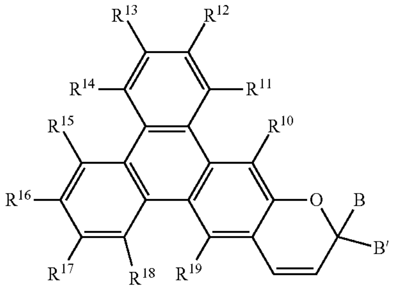

$R^{10}$ to $R^{15}$, B and B' in General Formula 3
$R^{10}$ to $R^{15}$, B and B' in General Formula 4,
$R^{10}$ to $R^{17}$, B and B' in General Formula 5
$R^{10}$ to $R^{17}$, B and B' in General Formula 6
$R^{10}$ to $R^{19}$, B and B' in General Formula 7
$R^{10}$ to $R^{21}$, B and B' in General Formula 8
$R^{10}$ to $R^{19}$, B and B' in General Formula 9
$R^{10}$ to $R^{20}$, B and B' in General Formula 10, and
$R^{10}$ to $R^{19}$, B and B' in General Formula 11
each independently represent a hydrogen atom or a substituent.

Here, any one of $R^{10}$ to $R^{15}$, B and B' in General Formula 3 represents a partial structure represented by the following General Formula 2.

Any one of $R^{10}$ to $R^{15}$, B and B' in General Formula 4 represents a partial structure represented by the following General Formula 2.

Any one of $R^{10}$ to $R^{17}$, B and B' in General Formula 5 represents a partial structure represented by the following General Formula 2.

Any one of $R^{10}$ to $R^{17}$, B and B' in General Formula 6 represents a partial structure represented by the following General Formula 2.

Any one of $R^{10}$ to $R^{19}$, B and B' in General Formula 7 represents a partial structure represented by the following General Formula 2.

Any one of $R^{10}$ to $R^{21}$, B and B' in General Formula 8 represents a partial structure represented by the following General Formula 2.

Any one of $R^{10}$ to $R^{19}$, B and B' in General Formula 9 represents a partial structure represented by the following General Formula 2.

Any one of $R^{10}$ to $R^{20}$, B and B' in General Formula 10 represents a partial structure represented by the following General Formula 2.

Any one of $R^{10}$ to $R^{19}$, B and B' in General Formula 11 represents a partial structure represented by the following General Formula 2.

In General Formula 2, a is 1, Az, L, b and c each have the same meanings as in General Formula 1, and * represents a bonding position with an adjacent atom (for example, a carbon atom). For General Formula 2, the description regarding General Formula 1 above and description that follows can be referred to.

[C9]

(General Formula 2)

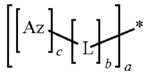

In one aspect, in the above general formulae, either one of B and B' may represent a partial structure represented by General Formula 2.

In addition, in another aspect, for $R^{10}$ to $R^{15}$ in General Formula 3, $R^{10}$ to $R^{15}$ in General Formula 4, $R^{10}$ to $R^{17}$ in General Formula 5, $R^{10}$ to $R^{17}$ in General Formula 6, $R^{10}$ to $R^{19}$ in General Formula 7, $R^{10}$ to $R^{21}$ in General Formula 8, $R^{10}$ to $R^{19}$ in General Formula 9, $R^{10}$ to $R^{20}$ in General Formula 10, and $R^{10}$ to $R^{19}$ in General Formula 11 (hereinafter, collectively referred to as an "R moiety"), any one of the R moieties in the above general formulae may represent a partial structure represented by General Formula 2.

When compounds represented by the above general formulae contain one or more substituents in addition to the partial structure represented by General Formula 2, for such substituents, the above description regarding substituents can be referred to.

In the compounds represented by the above general formulae, when either one of B and B' represents a partial structure represented by General Formula 2, the other may be a substituent. Such a substituent may represent a substituted or unsubstituted phenyl group, substituted or unsubstituted naphthyl group, substituted or unsubstituted fluorenyl group, substituted or unsubstituted benzofluorenyl group, substituted or unsubstituted fluoranthenyl group, substituted or unsubstituted dibenzofuranyl group or substituted or unsubstituted dibenzothiophenyl group, and may represent a substituted phenyl group. Such substituted phenyl groups may include one or more substituents selected from the group consisting of an alkoxy group having 1 to 6 carbon atoms, methylsulfide group, amino group, dimethylamino group, piperidino group, morpholino group, thiomorpholino group, phenyl group, fluorine atom, chlorine atom, bromine atom, iodine atom, trifluoromethyl group and cyano group. When either one of B and B' is a substituted phenyl group, the substitution position of the substituent in the substituted phenyl group may be a position that is a para position with respect to a position where B or B' is bonded to a carbon atom constituting a pyran ring of indeno-fused naphthopyran. In addition, for B and B' when any one of R moieties in the compounds represented by the above general formulae represents the partial structure represented by General Formula 2, the above description can be referred to.

For example, the compound represented by General Formula 1 may be the compound represented by General Formula 7.

In one aspect, in General Formula 7, either one of B and B' may represent a partial structure represented by General Formula 2. In addition, in another aspect, in General Formula 7, any one of $R^{10}$ to $R^{19}$ may represent a partial structure represented by General Formula 2. In such a case, for example, $R^{13}$ may represent a partial structure represented by General Formula 2.

In one aspect, in General Formula 7, $R^{12}$ to $R^{15}$ all may represent a hydrogen atom.

In General Formula 7, when either one of B and B' represents a partial structure represented by General Formula 2, the compound represented by General Formula 7 may be, for example, the following compound.

A compound in which, in General Formula 7, $R^{10}$ and $R^{11}$ each independently represent a methyl group or an ethyl group. For example, $R^{10}$ and $R^{11}$ both may represent a methyl group. In addition, for example, $R^{10}$ and $R^{11}$ both may represent an ethyl group. In such compounds, for example, $R^{13}$ represents a phenyl group or a trifluoromethyl group, $R^{17}$ and $R^{18}$ both represent a methoxy group, or $R^{17}$ represents a hydrogen atom and $R^{18}$ represents a methoxy group, and all the other R moieties may represent a hydrogen atom. In addition, for example, $R^{13}$ may represent a phenyl group or a trifluoromethyl group, and all the other R moieties may represent a hydrogen atom. In addition, for example, all of $R^{13}$ to $R^{19}$ may represent a hydrogen atom.

In General Formula 7, $R^{10}$ and $R^{11}$ are bonded to form a compound with a ring structure spiro-condensed with indeno-fused naphthopyran. In such compounds, the carbon atom at position 13 of indeno-fused naphthopyran (that is, in General Formula 7, a carbon atom bonded to $R^{10}$ and $R^{11}$) is a spiro atom shared by the indeno-fused naphthopyran and the ring structure.

The ring structure may be unsubstituted or have a substituent. When R represents a ring structure having a substituent, the number of carbon atoms refers to the number of carbon atoms including the number of carbon atoms of the substituent. The number of carbon atoms of the ring structure represented by R (including the carbon atom at position 13 of indeno-fused naphthopyran) is 3 or more, and may be 4 or more, 5 or more, 6 or more or 7 or more. In addition, the number of carbon atoms of the ring structure represented by R (including the carbon atom at position 13 of indeno-fused naphthopyran) is 20 or less, and may be 19 or less, 18 or less, 17 or less, 16 or less or 15 or less.

The ring structure may be an alicyclic structure which is unsubstituted or has a substituent. Such an alicyclic structure may be a monocyclic structure, may be a condensed polycyclic structure such as a bicyclic or tricyclic structure, may be a bridged ring structure such as a bicyclic structure, and may be a spiro ring structure such as a bicyclic structure.

In the compound in which, in General Formula 7, $R^{10}$ and $R^{11}$ are bonded to form a ring structure spiro-condensed with indeno-fused naphthopyran, specific examples of the following partial structure include the following partial structure.

[C10]

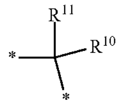

[C11]

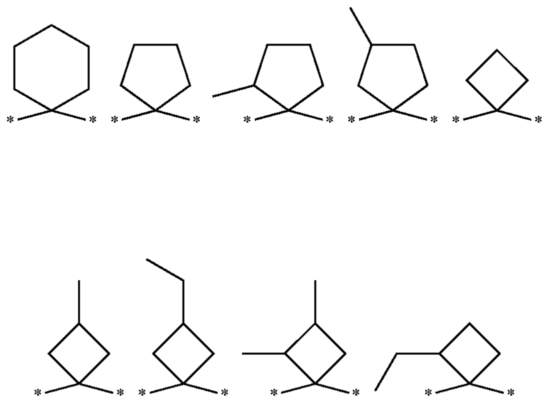

-continued

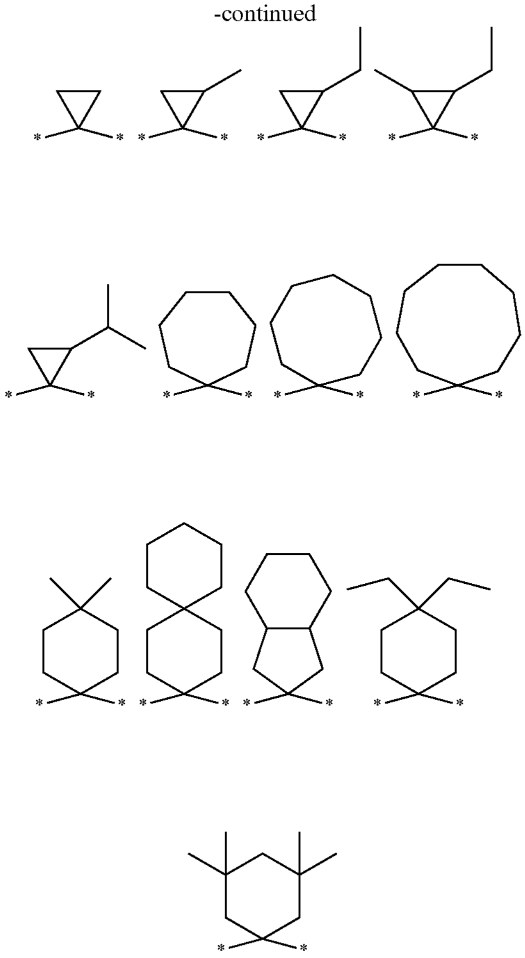

In a compound in which $R^{10}$ and $R^{11}$ in General Formula 7 are bonded to form a ring structure spiro-condensed with indeno-fused naphthopyran, for example, $R^{12}$ to $R^{19}$ all may represent a hydrogen atom. In addition, for example, $R^{13}$ represents a fluorine atom or a trifluoromethyl group, and $R^{12}$ and $R^{14}$ to $R^{19}$ all represent a hydrogen atom.

In General Formula 1, a and c each independently represent an integer of 1 or more. In General Formula 1, b represents 0 or an integer of 1 or more. When there are a plurality of Az's in General Formula 1, the plurality of Az's may be the same as or different from each other. When there are a plurality of L's in General Formula 1, the plurality of L's may be the same as or different from each other.

In one aspect, in General Formula 1, b represents 0 or 1. In addition, in one aspect, in General Formula 1, a and c both represent 1.

In one aspect, in General Formula 1, b may represent 1 and L may represent an arylene group which is unsubstituted or has a substituent or a heteroarylene group which is unsubstituted or has a substituent. Here, L may be an arylene group which is unsubstituted or has a substituent, may be a phenylene group which is unsubstituted or has a substituent, and may be an unsubstituted phenylene group. The phenylene group which is unsubstituted or has a substituent may have an azine ring group represented by Az, for example, at a para position with respect to a position where L bonds to D.

Photochromic compounds represented by General Formula 1 can be used for producing photochromic articles. Specific examples of photochromic compounds represented by General Formula 1 include the following compounds. However, the present disclosure is not limited to the following exemplary compounds.

[C12]

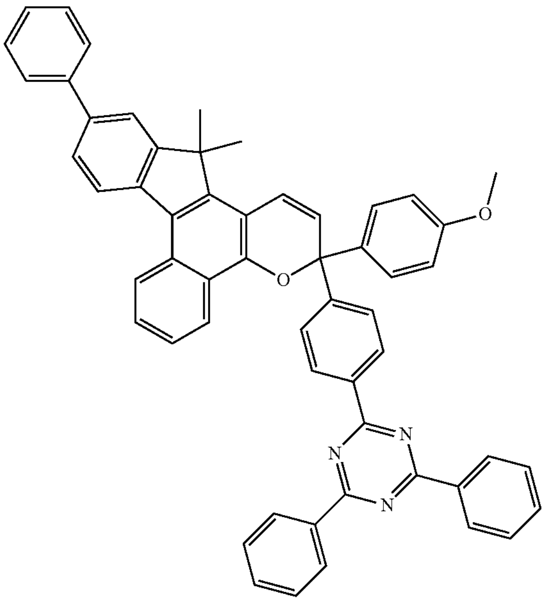

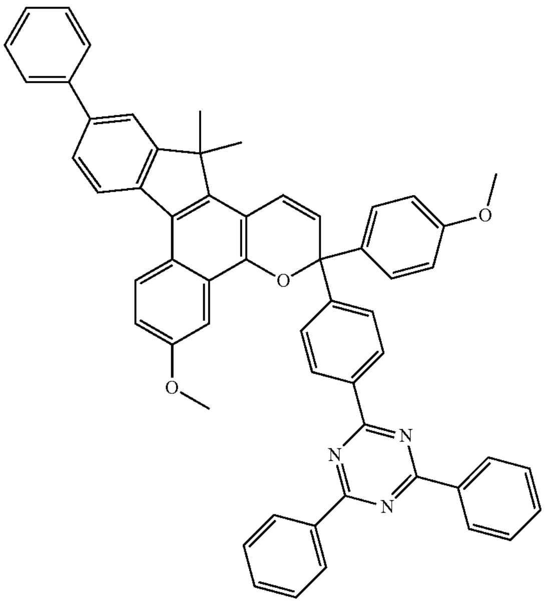

-continued
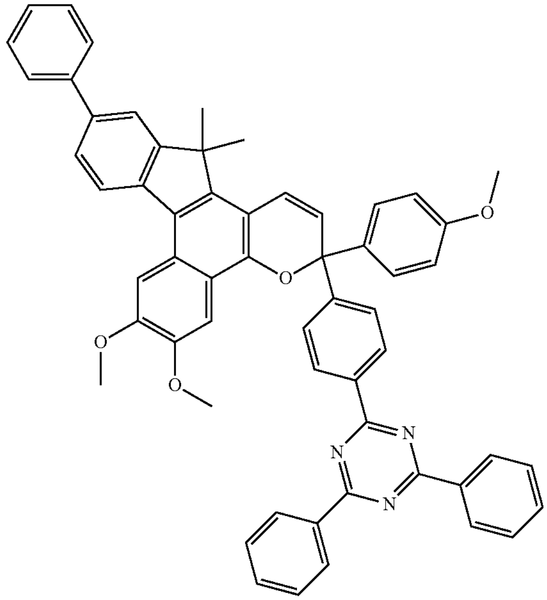
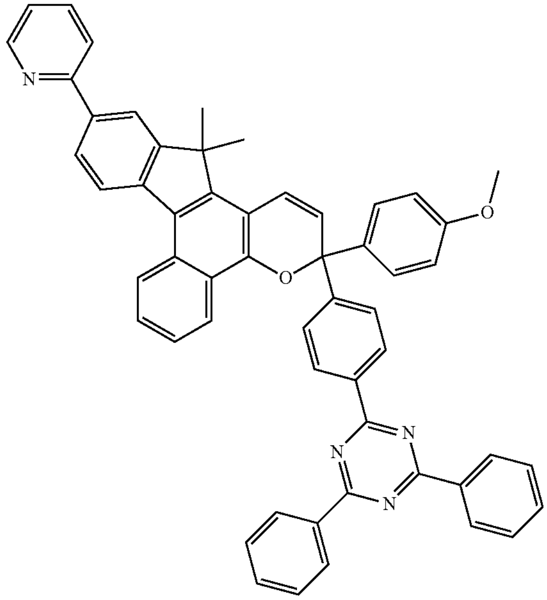
-continued
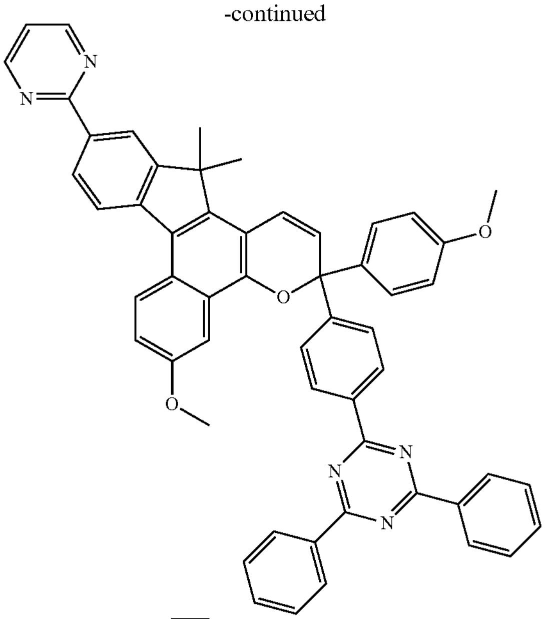
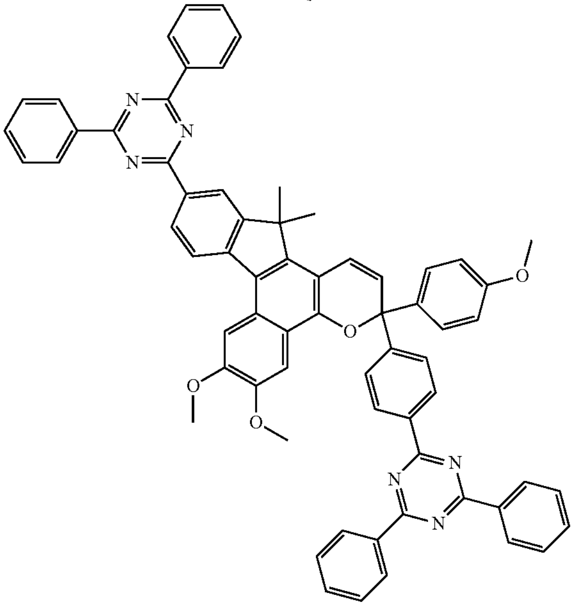
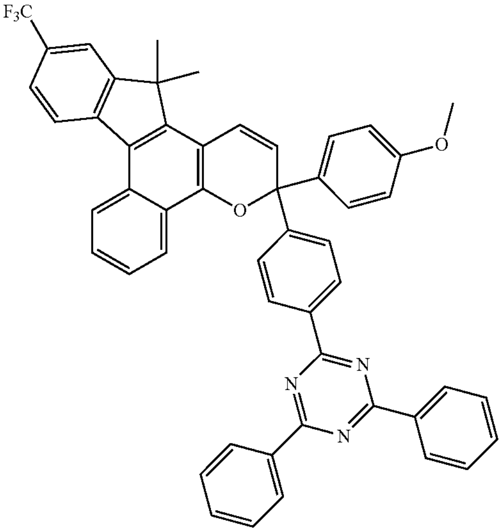

-continued
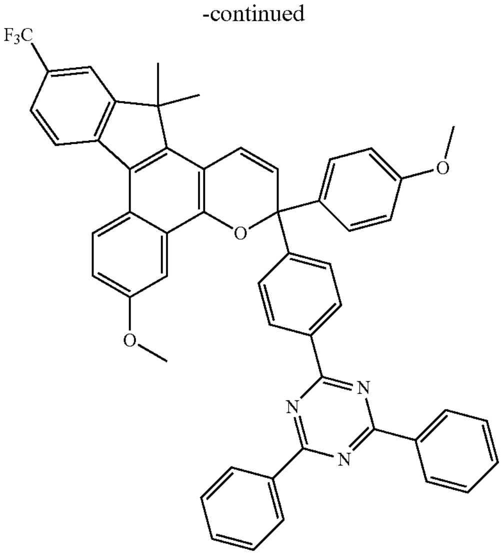
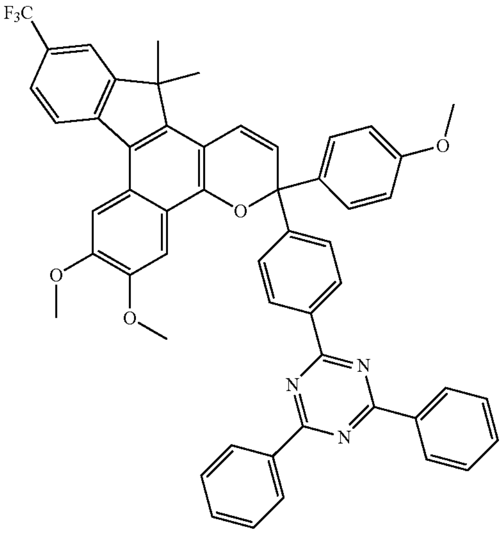
-continued
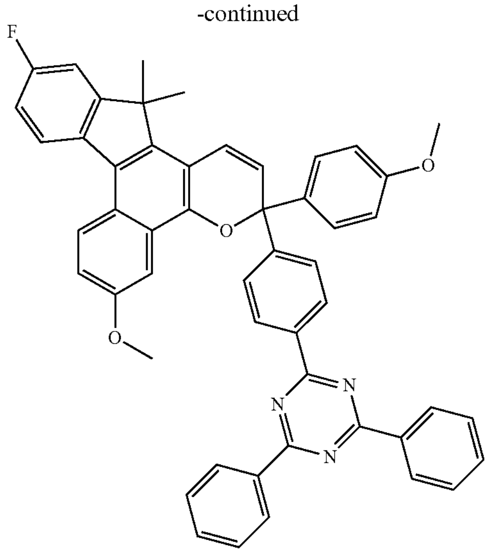
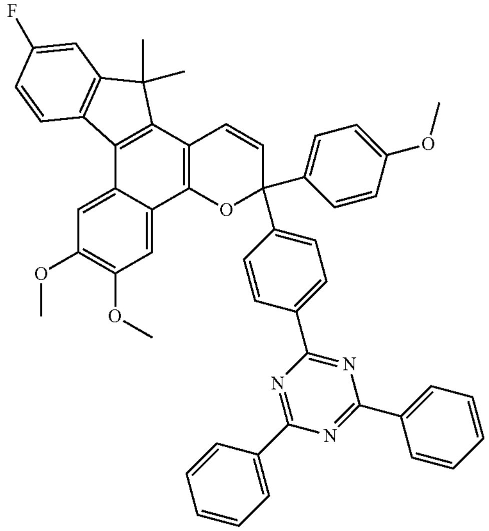
[C13]
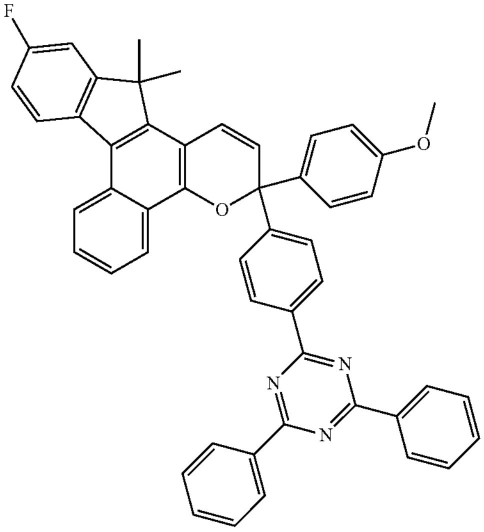
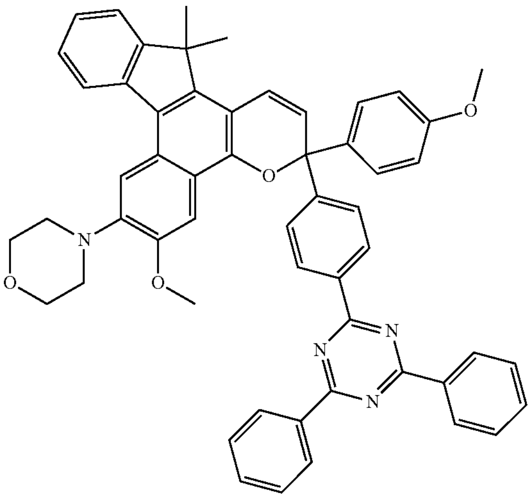

-continued
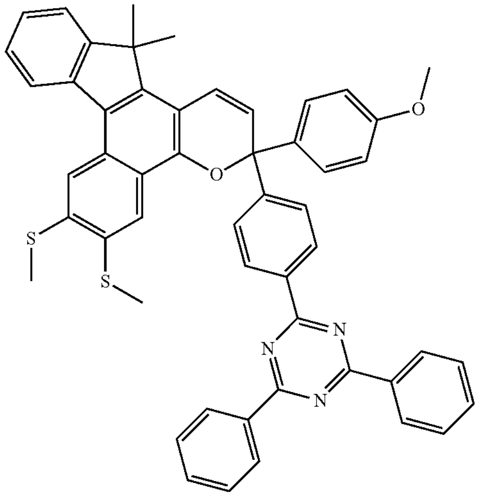
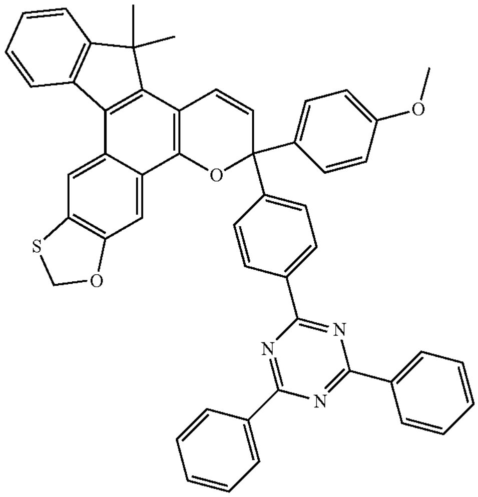
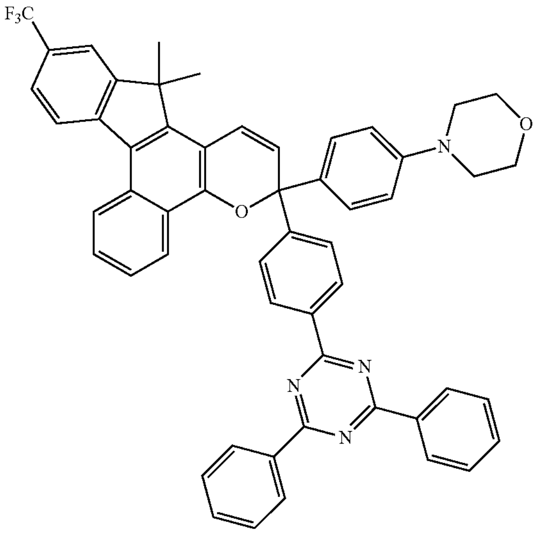
-continued
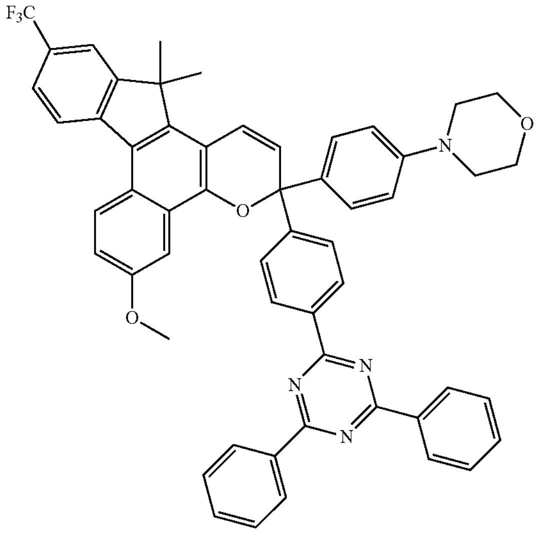
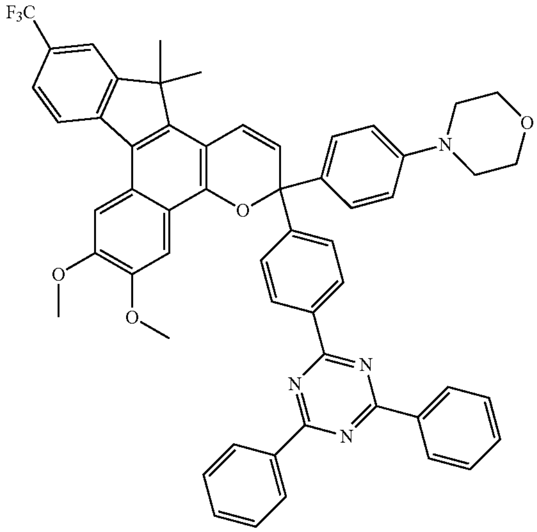
[C14]
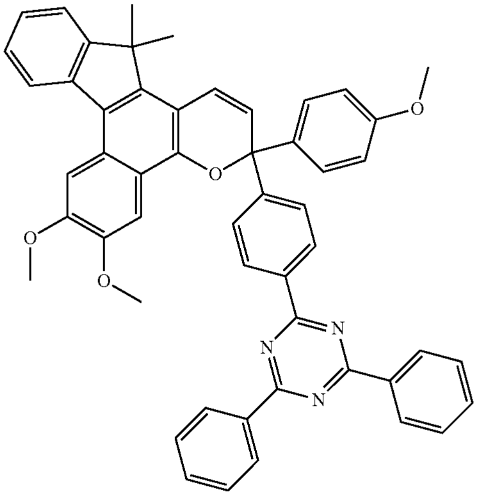

-continued
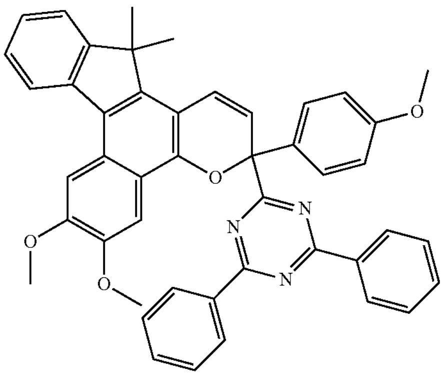
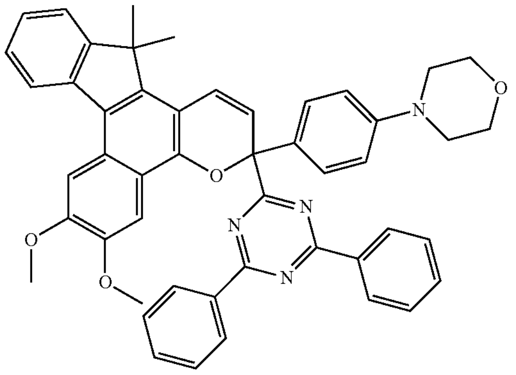
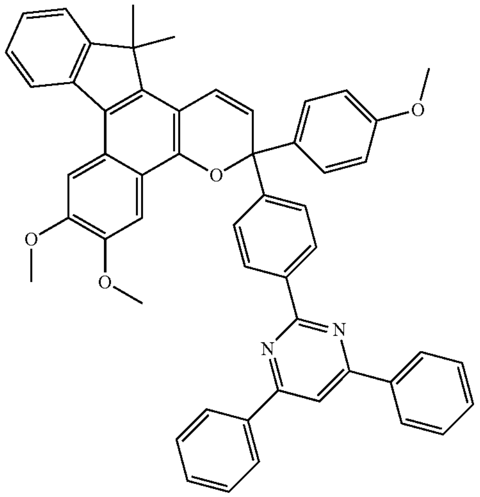
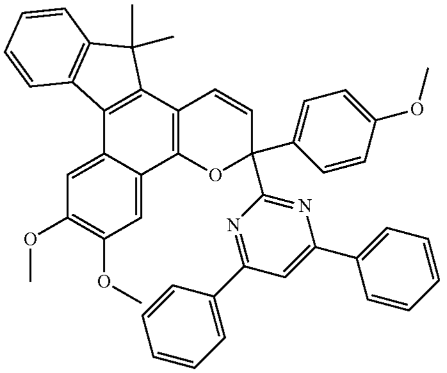
-continued
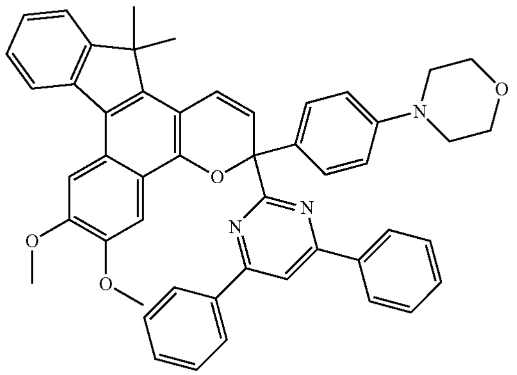
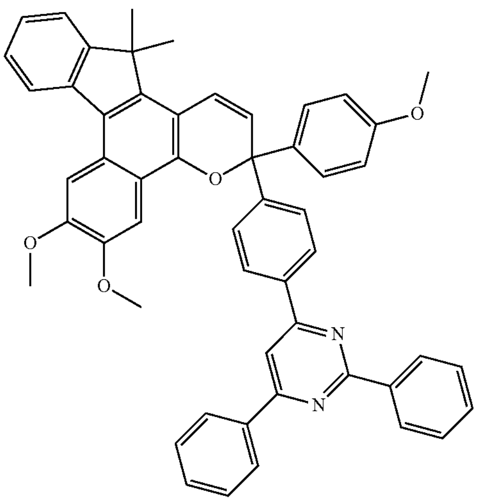
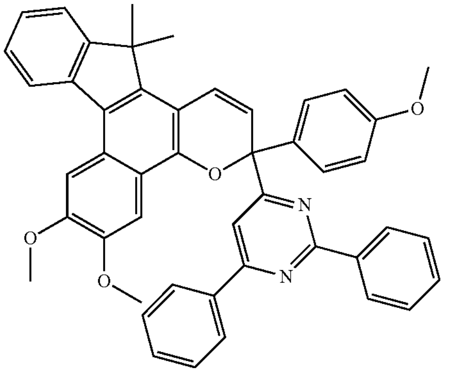
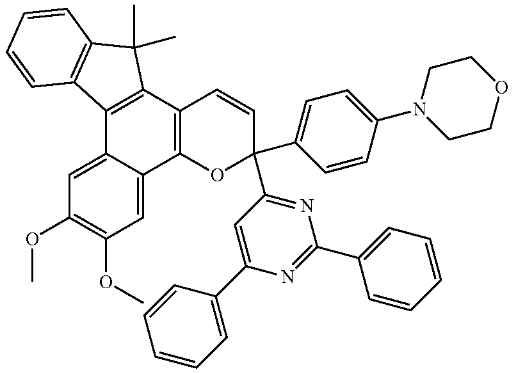

-continued
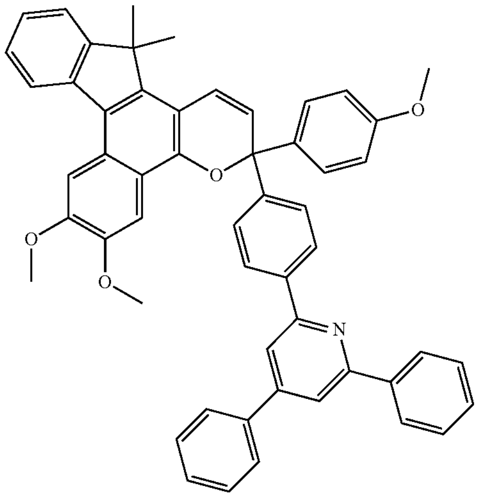
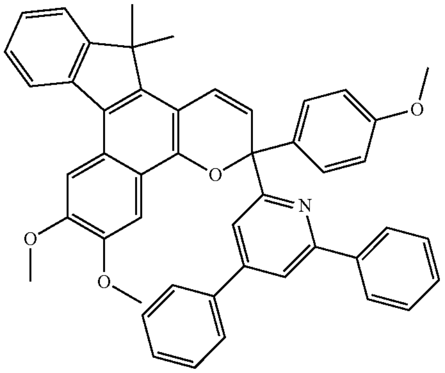
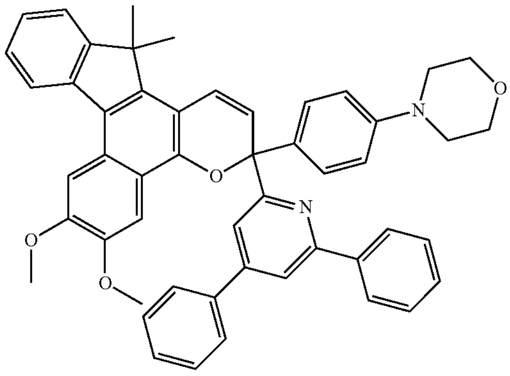
-continued
[C15]
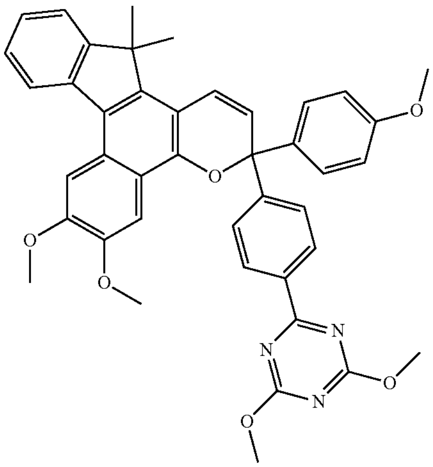
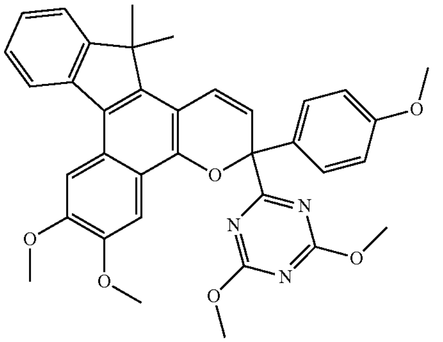
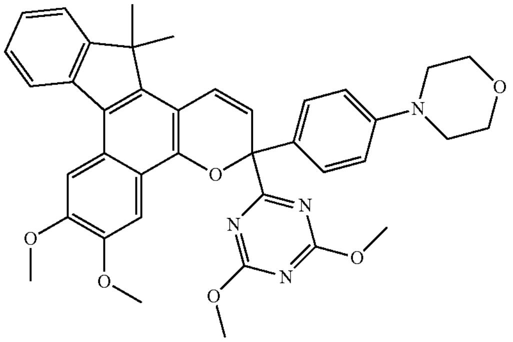
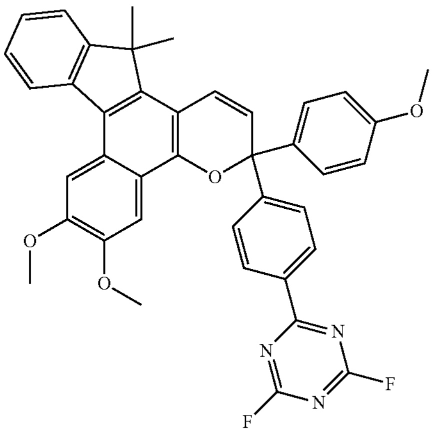

-continued
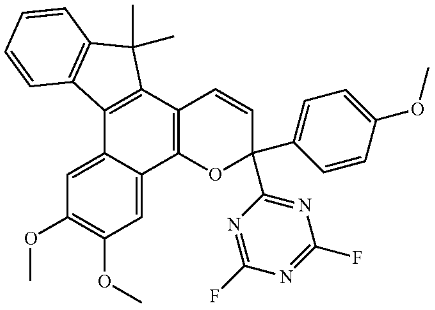
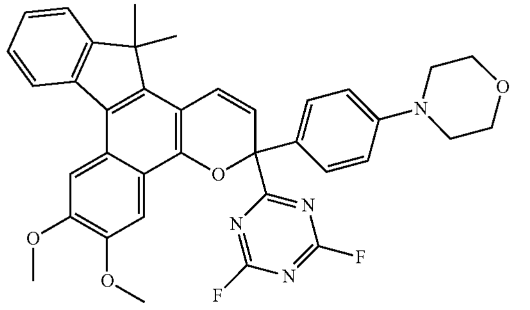
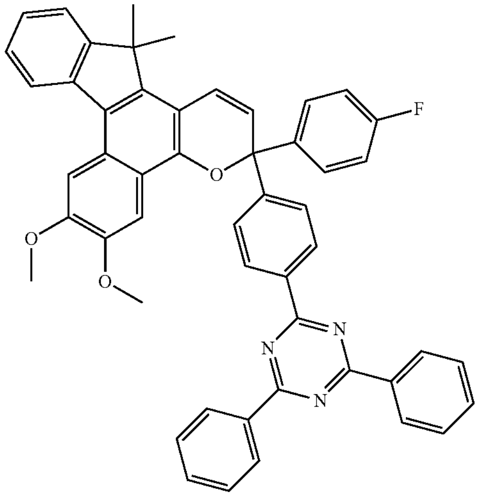
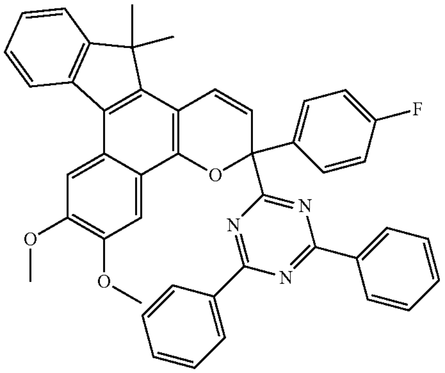
-continued
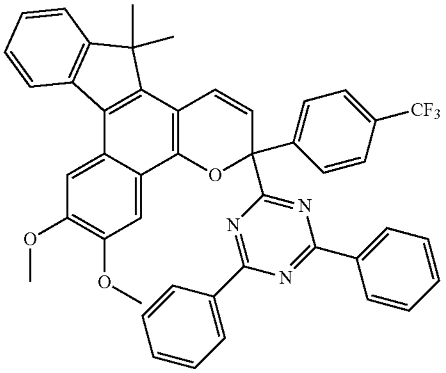
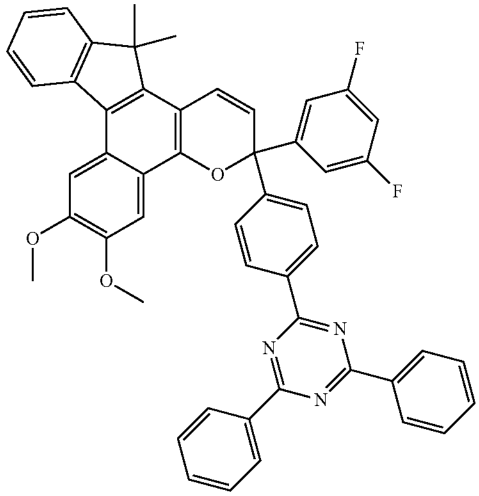
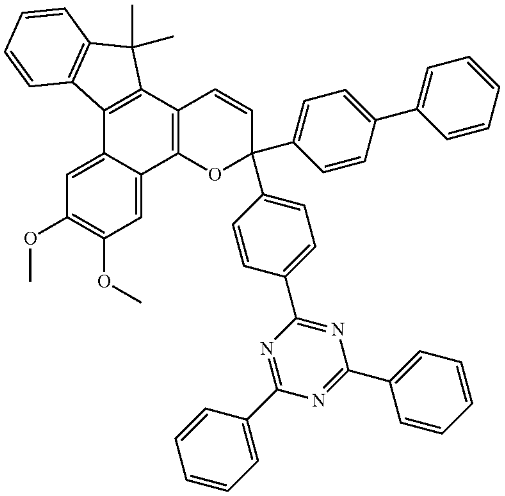

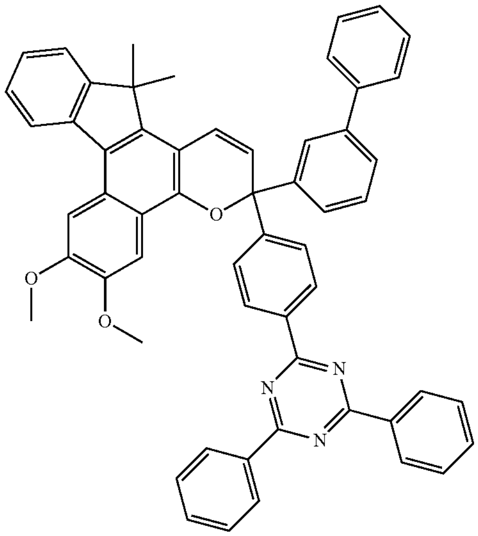
[C16]
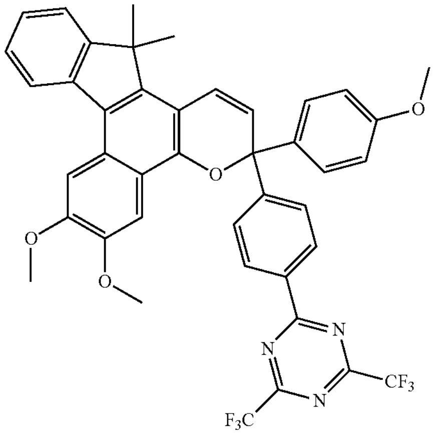
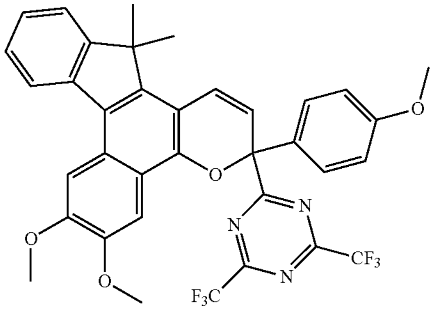
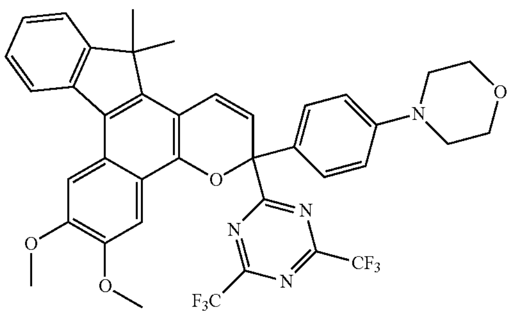
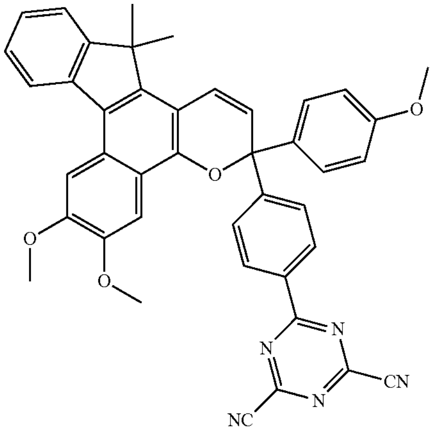
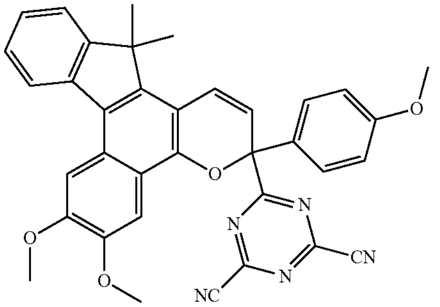
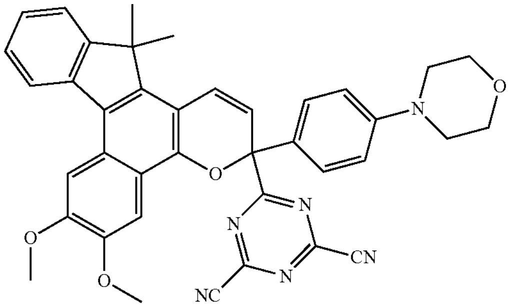
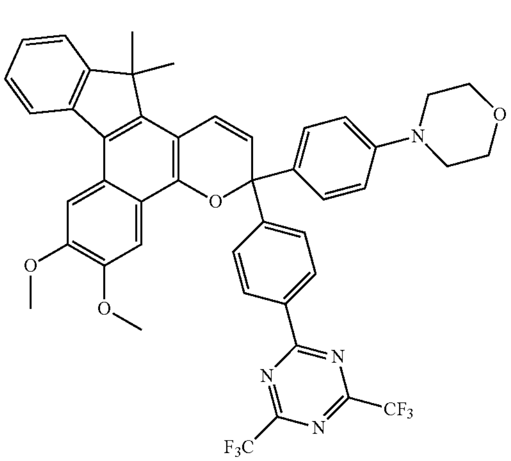

-continued
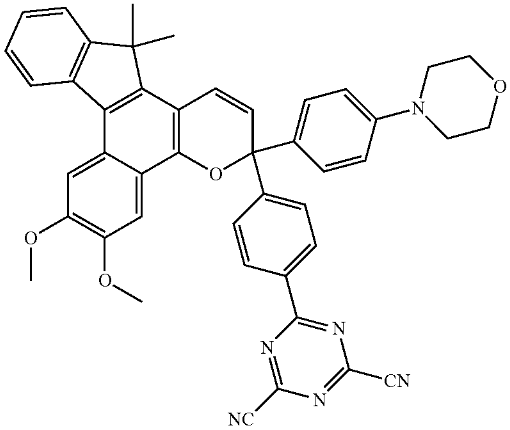
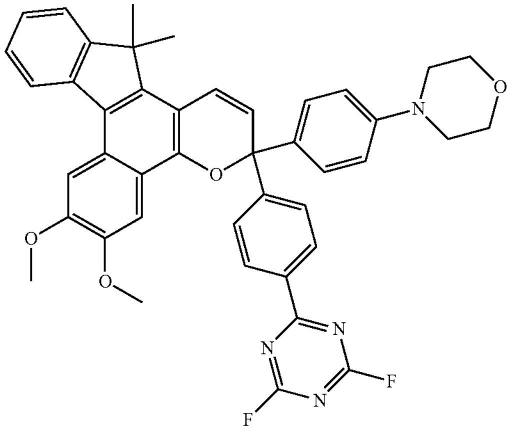
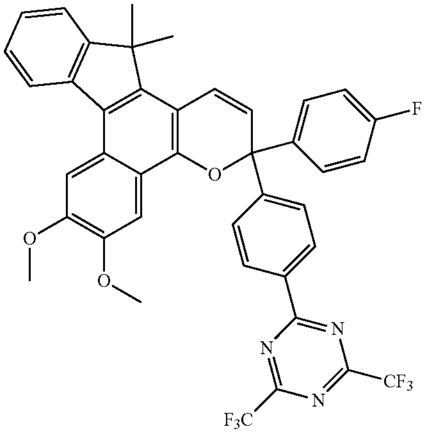
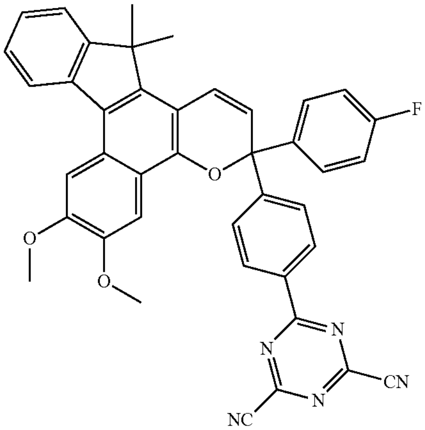
-continued
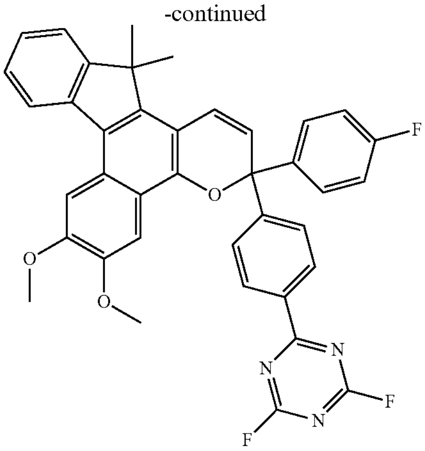
[C17]
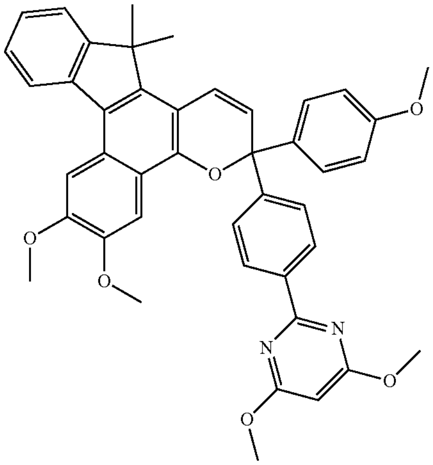
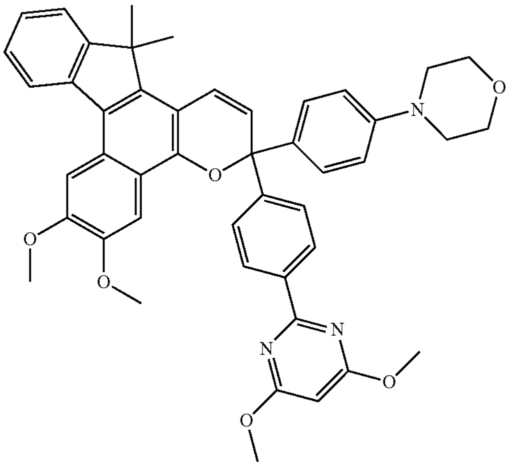

-continued
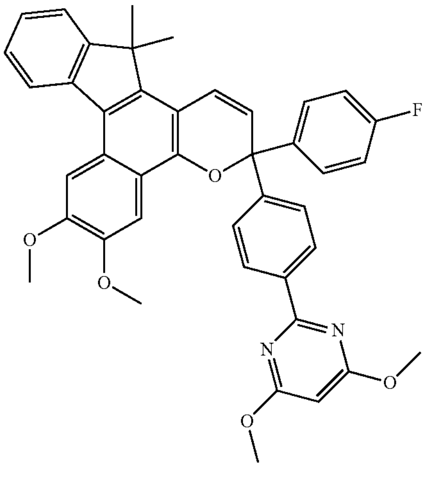
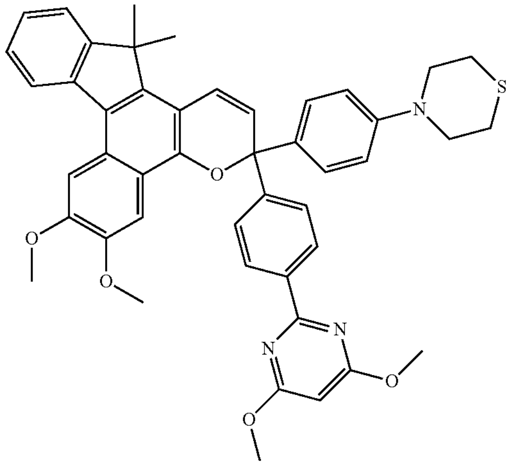
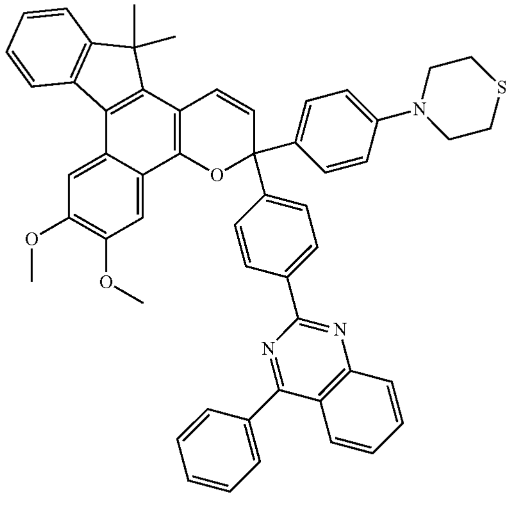
-continued
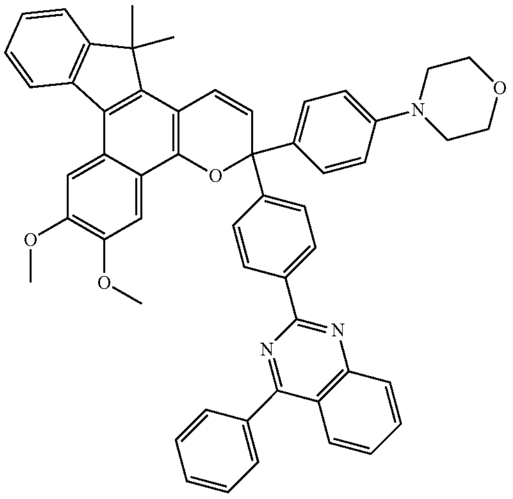
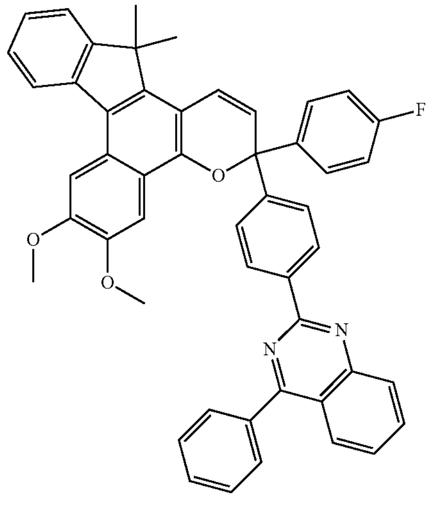
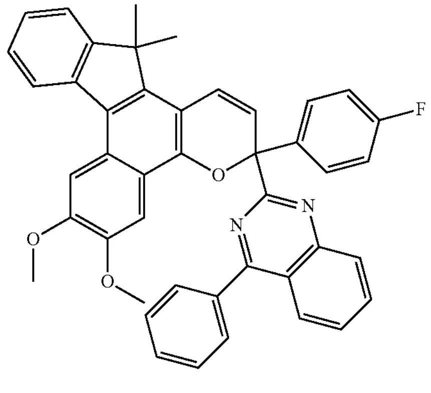

-continued
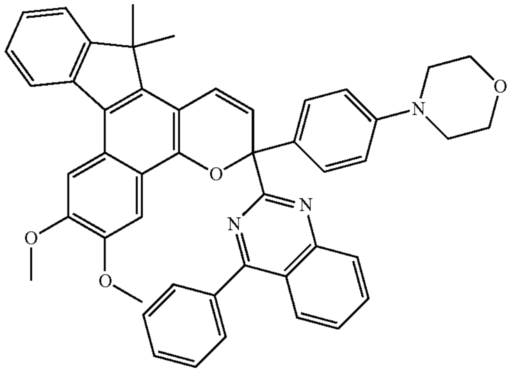
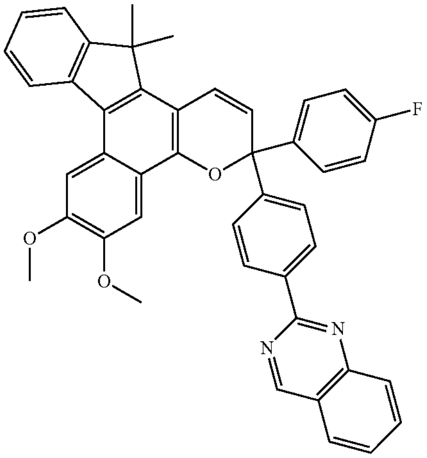
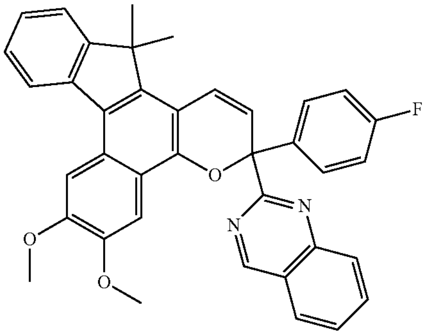
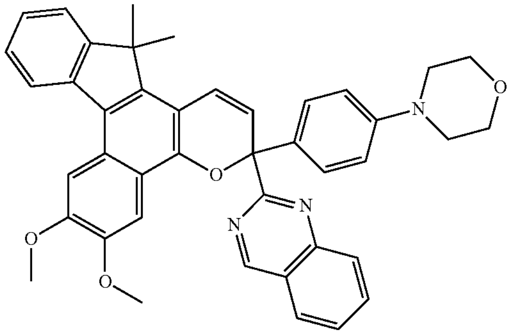
-continued
[C18]
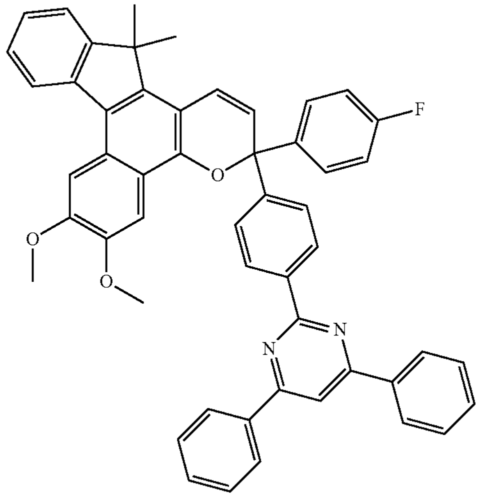
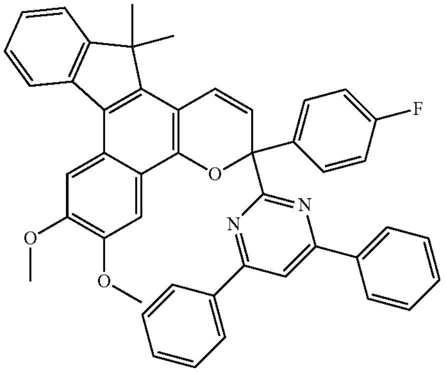
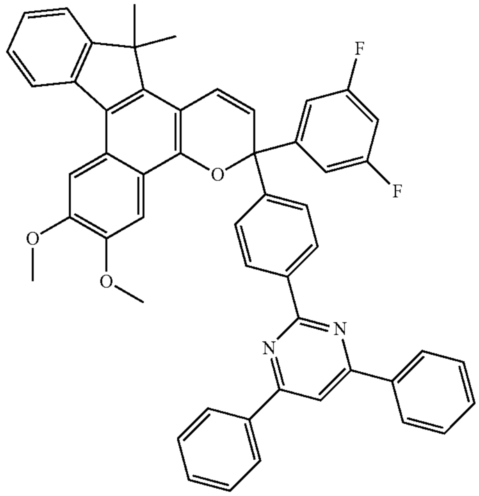

-continued
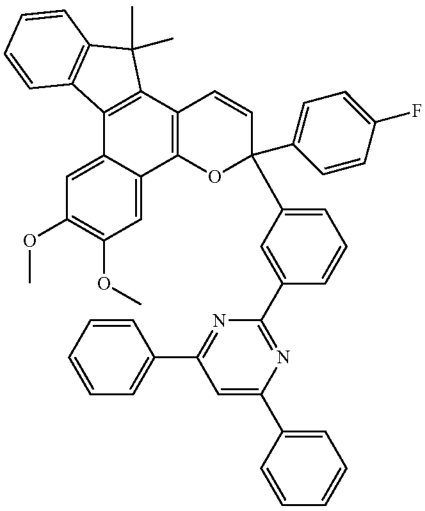
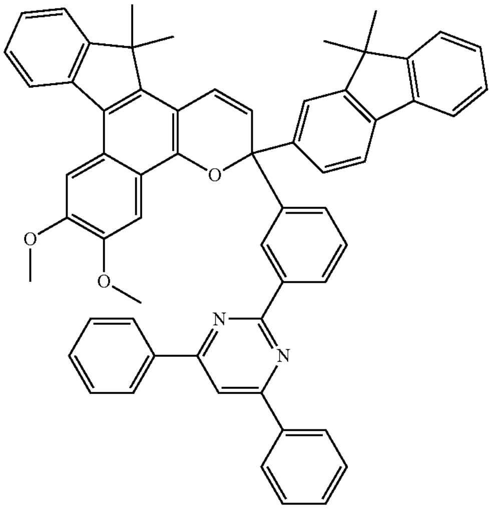
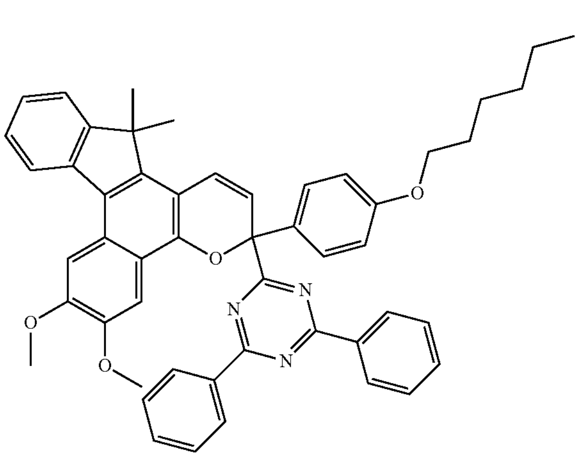
-continued
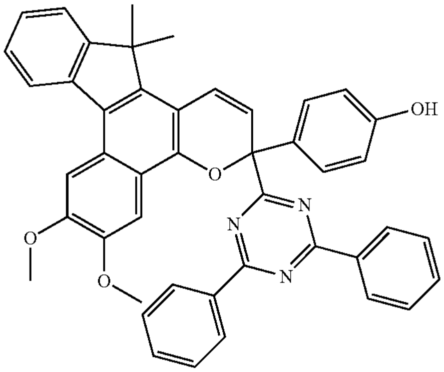
[C19]
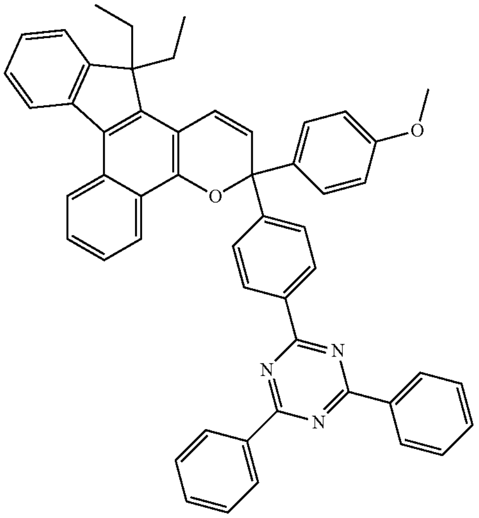
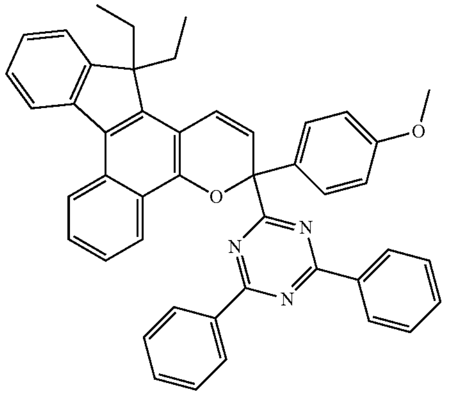
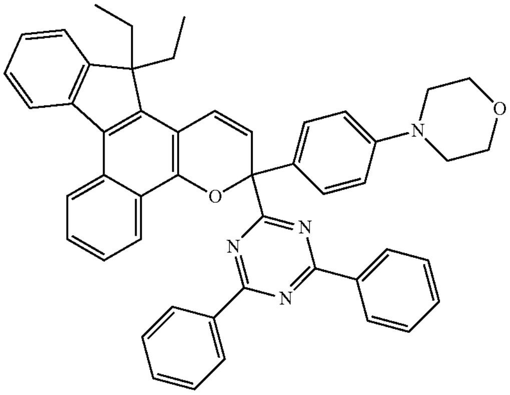

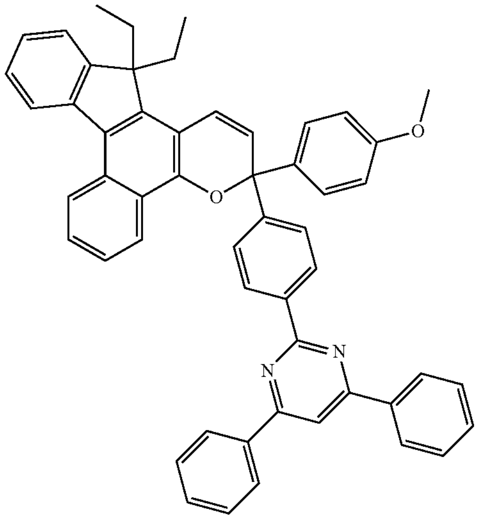
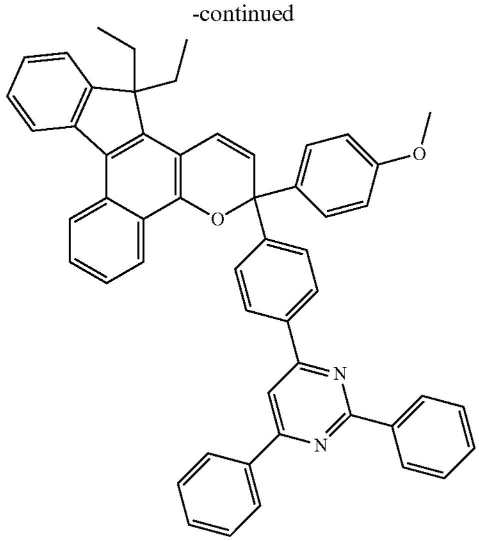
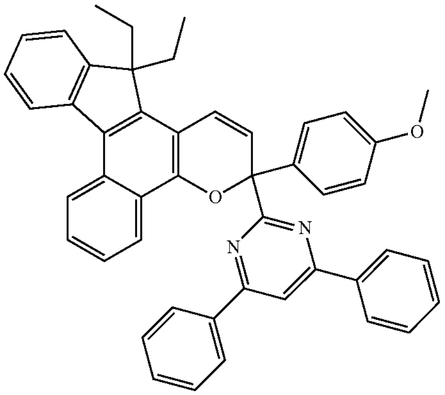
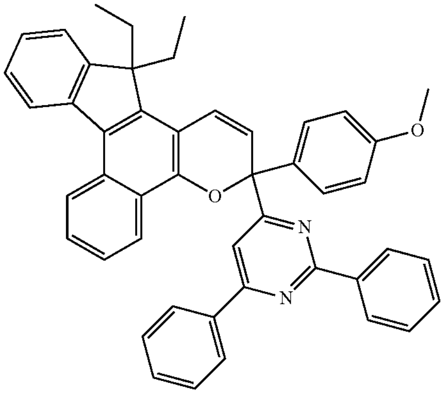
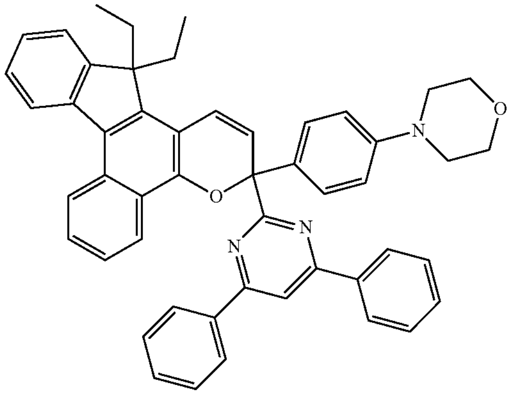
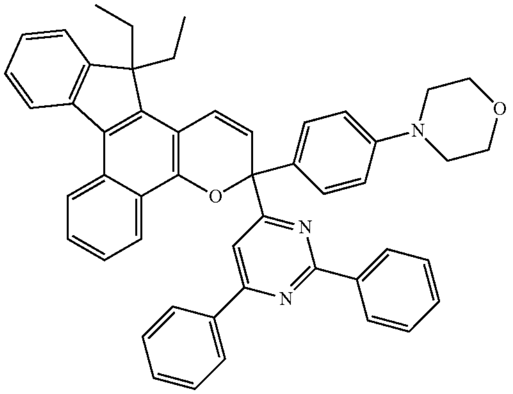

-continued
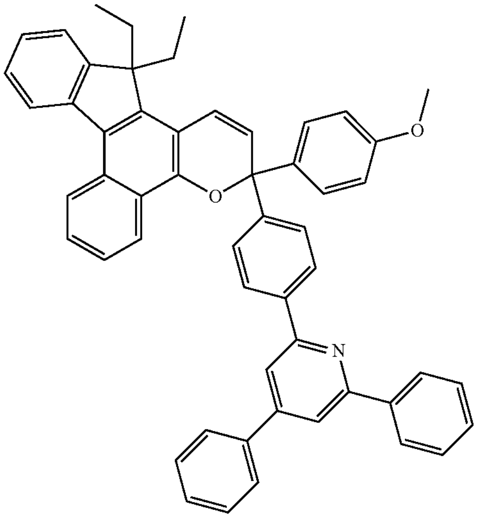
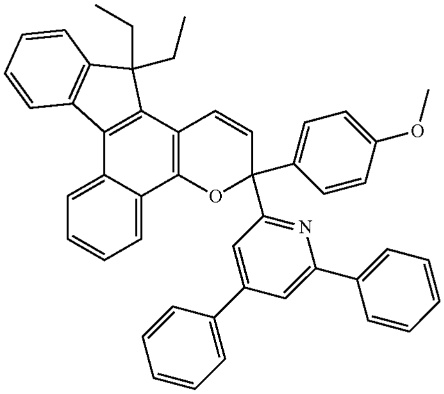
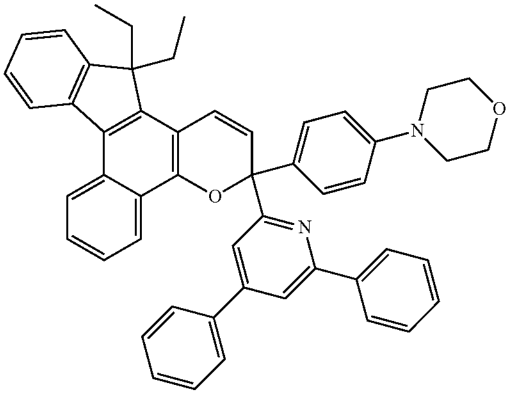
-continued
[C20]
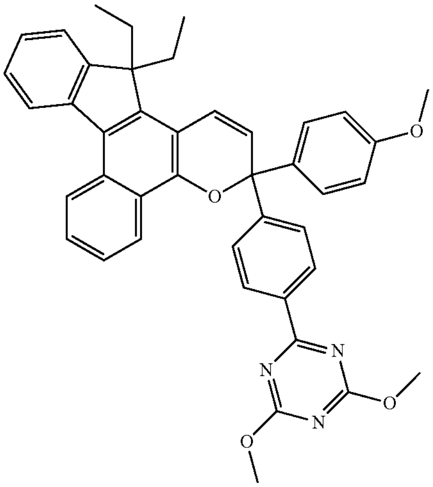
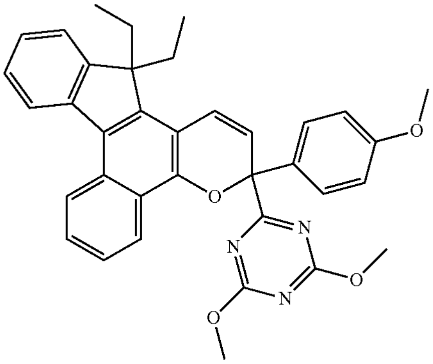
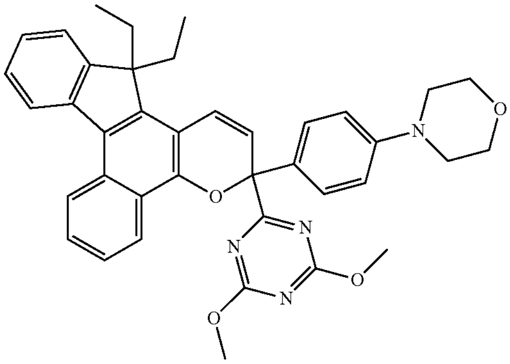
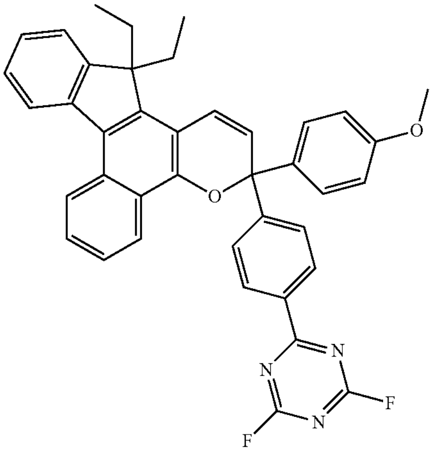

-continued
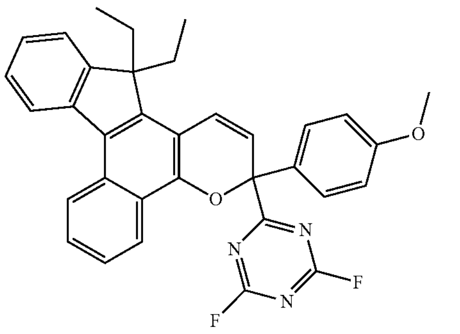
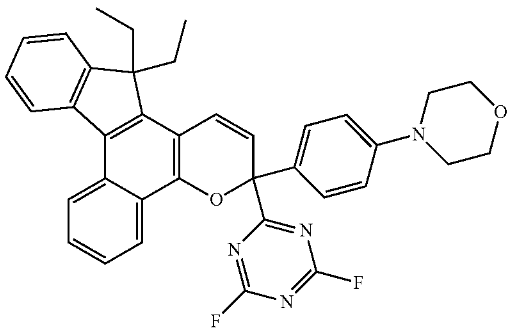
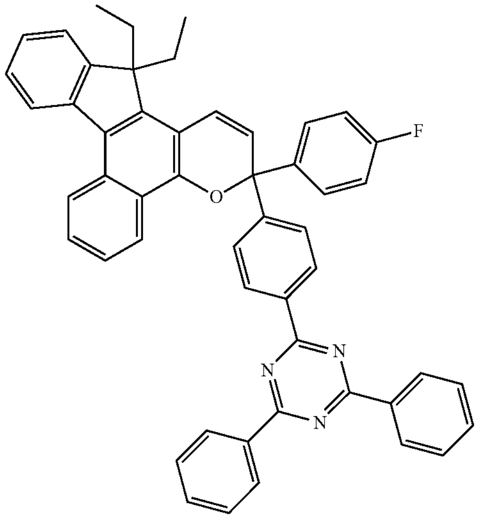
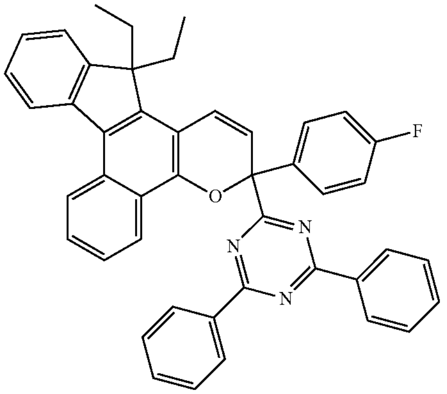
-continued
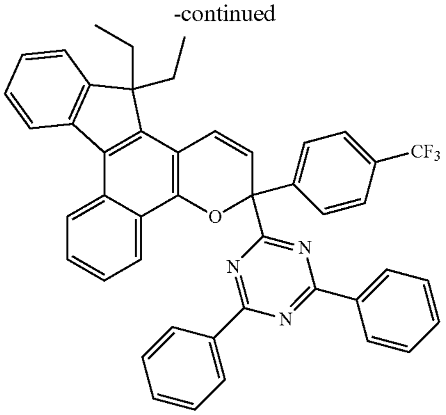
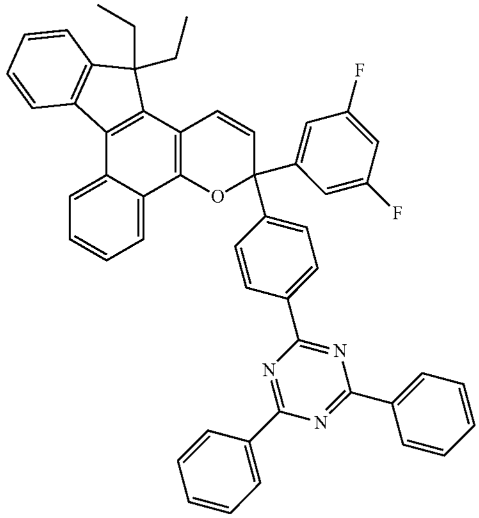
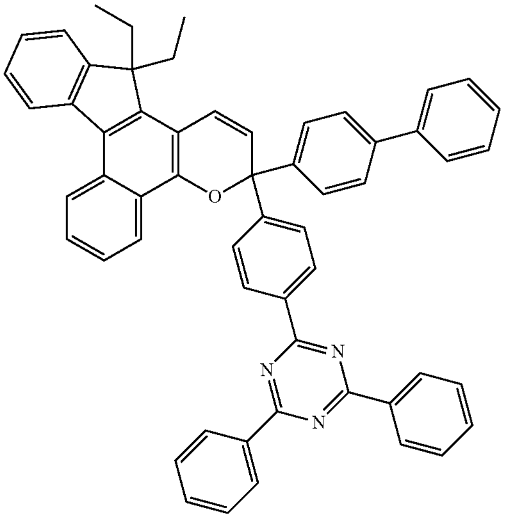

-continued
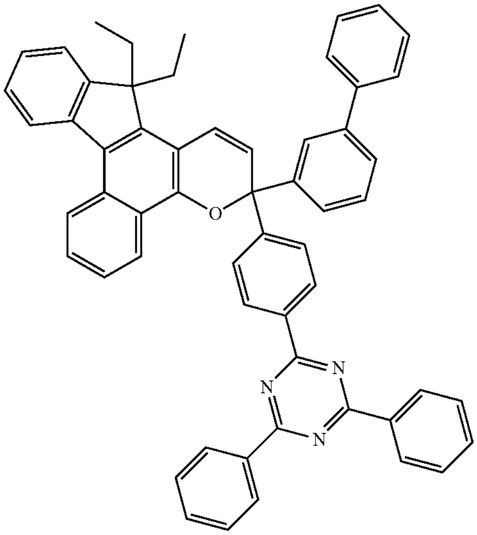
[C21]
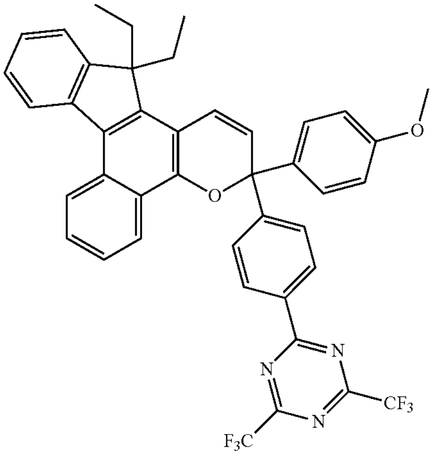
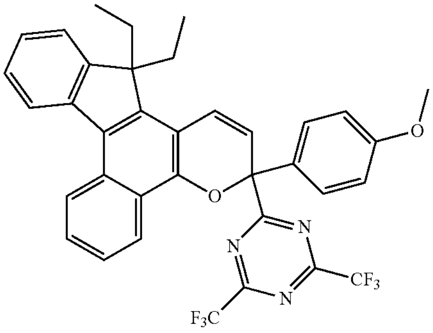
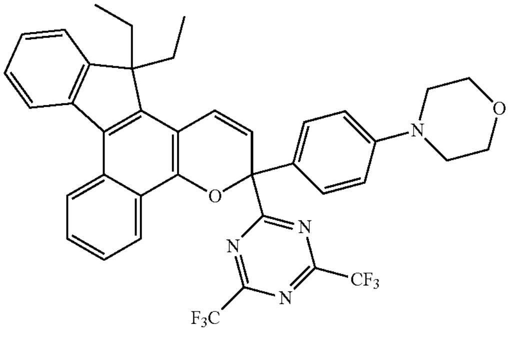
-continued
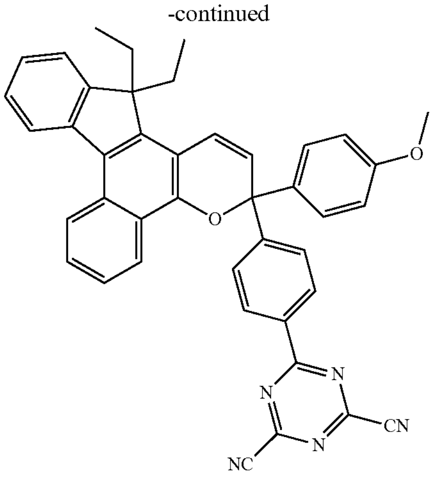
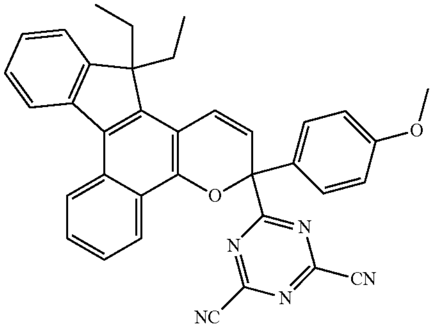
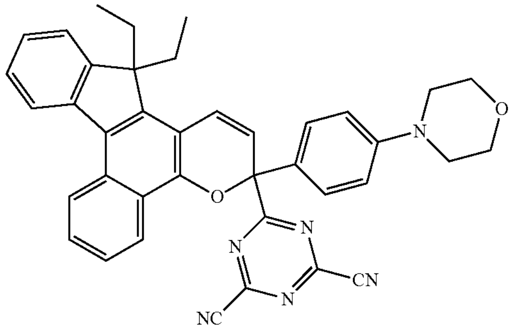
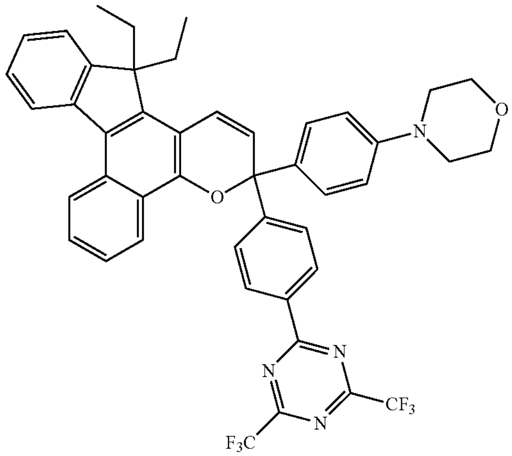

-continued
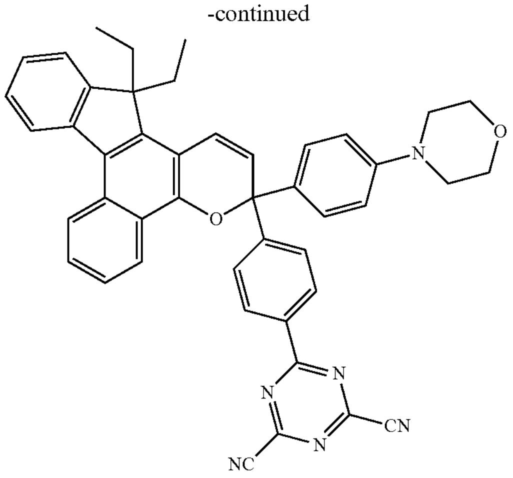
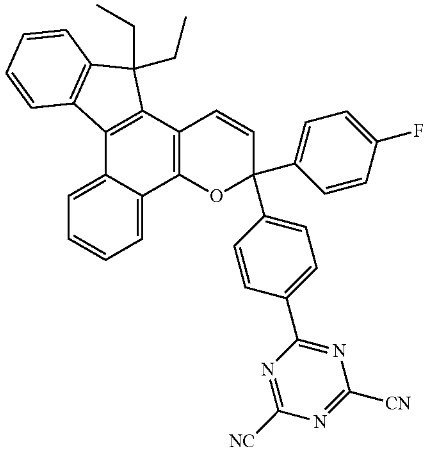
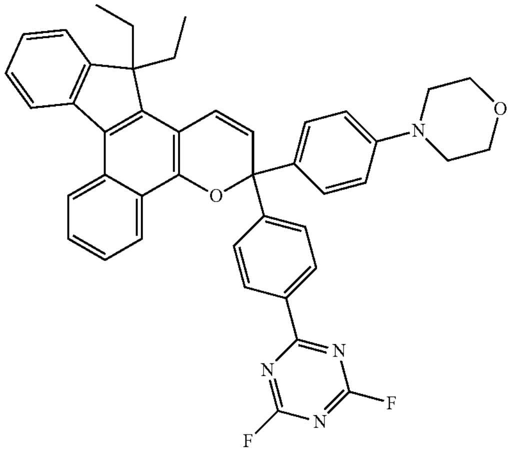
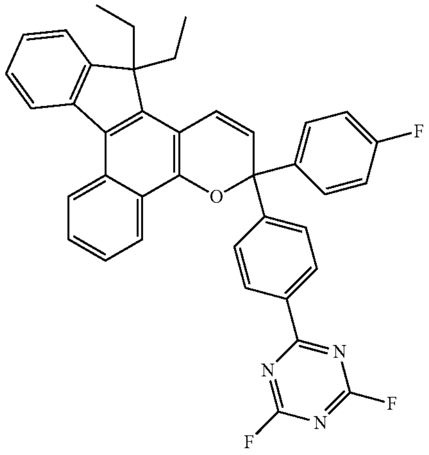
[C22]
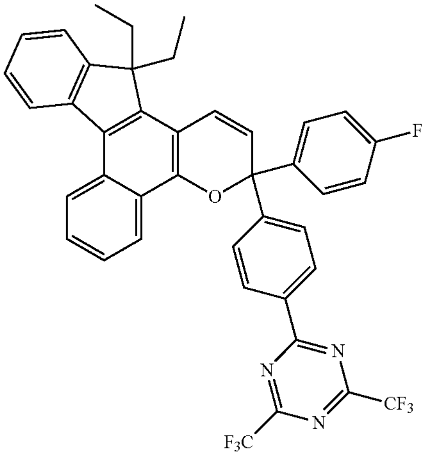
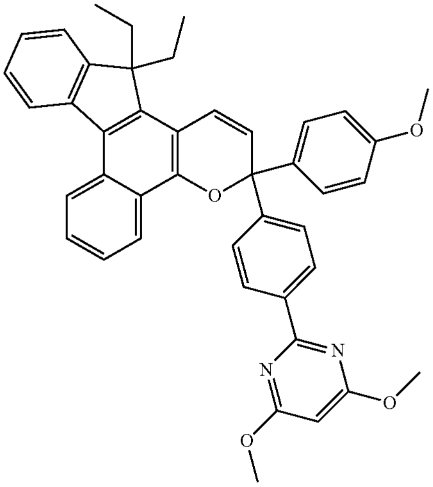
-continued -continued
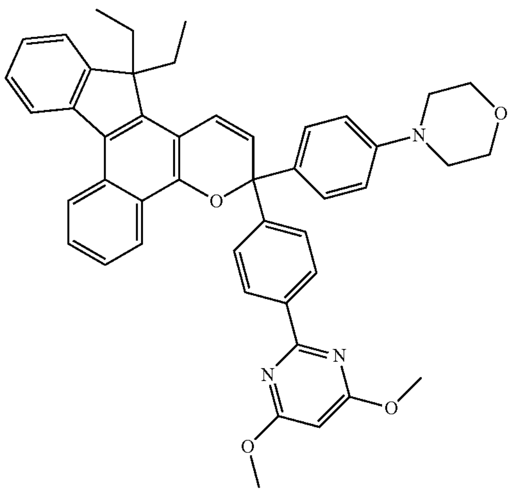
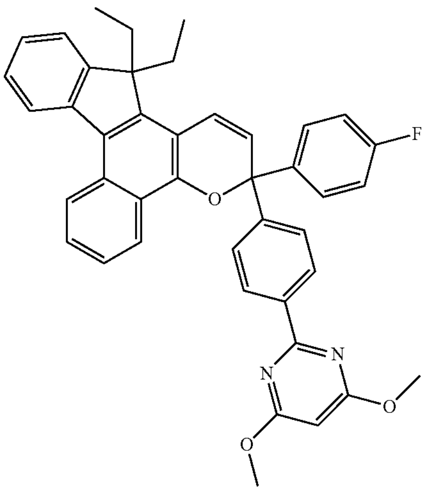
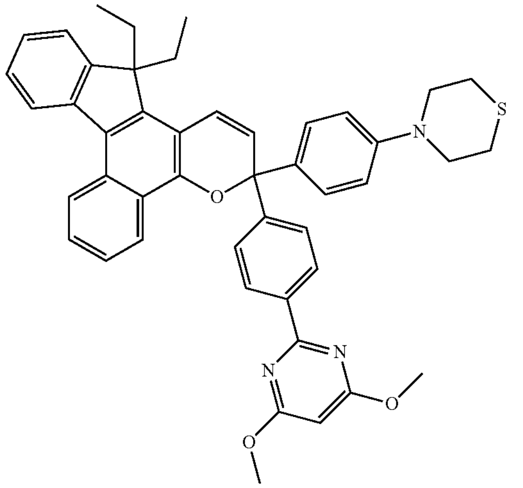
-continued
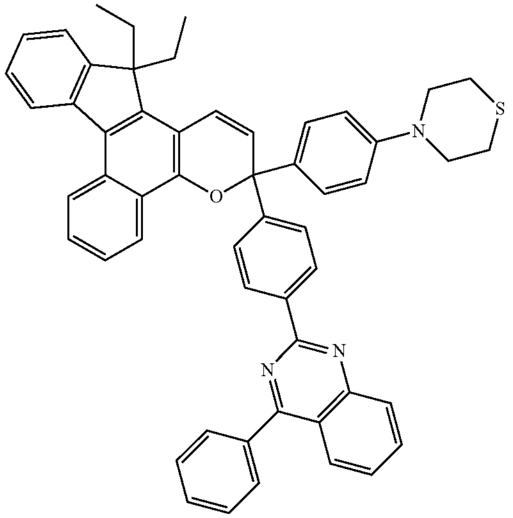
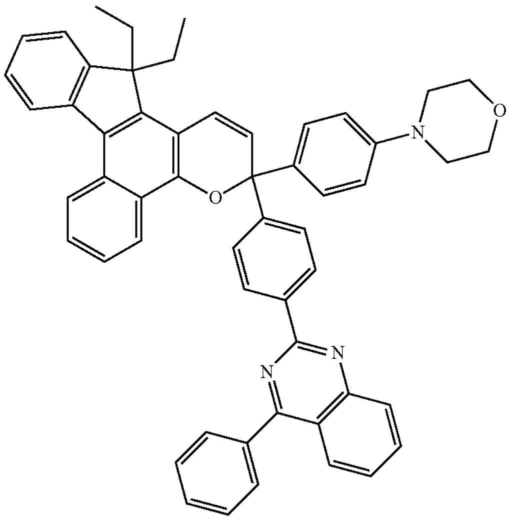
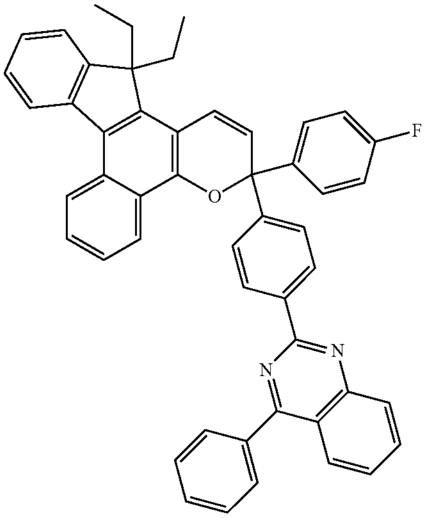

-continued
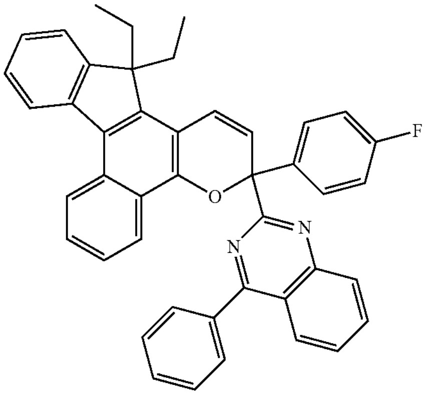
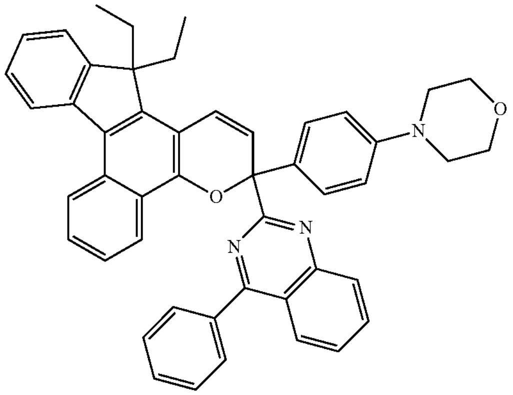
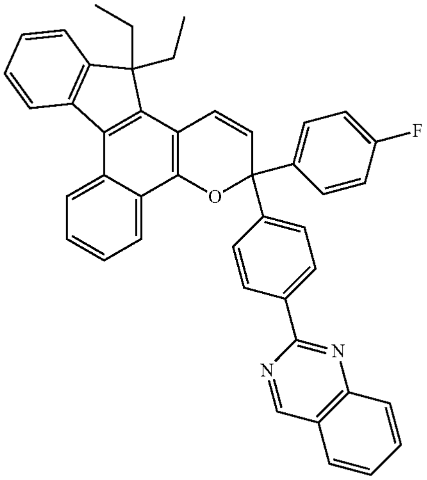
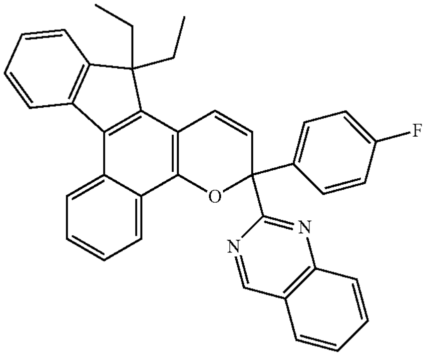
-continued
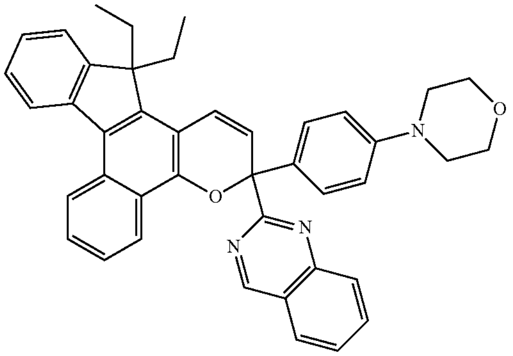
[C23]
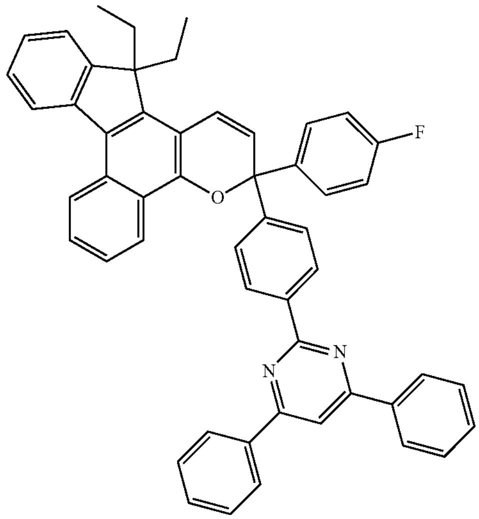
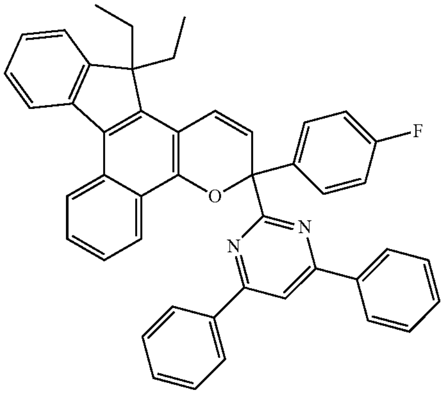

-continued
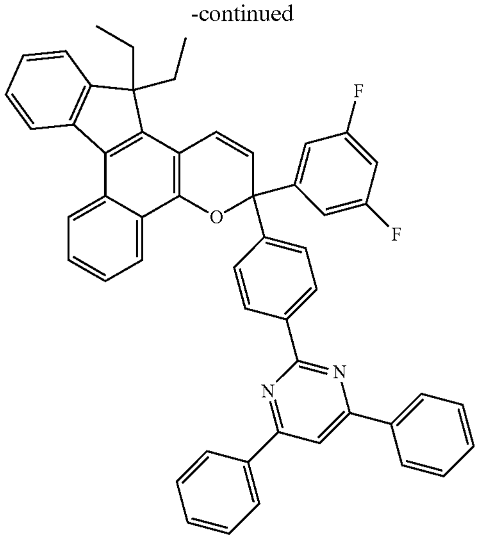
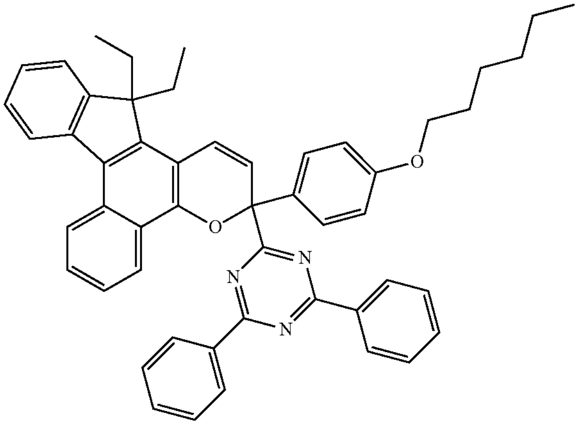
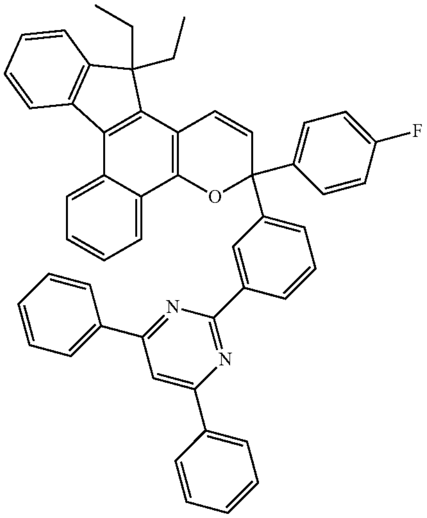
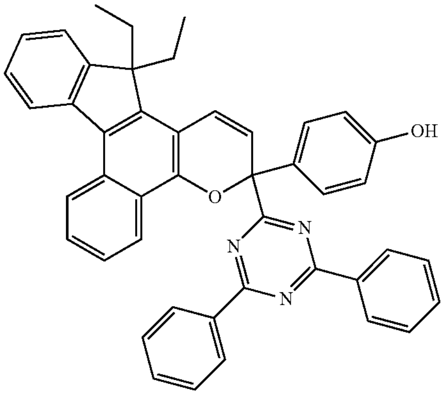
[C24]
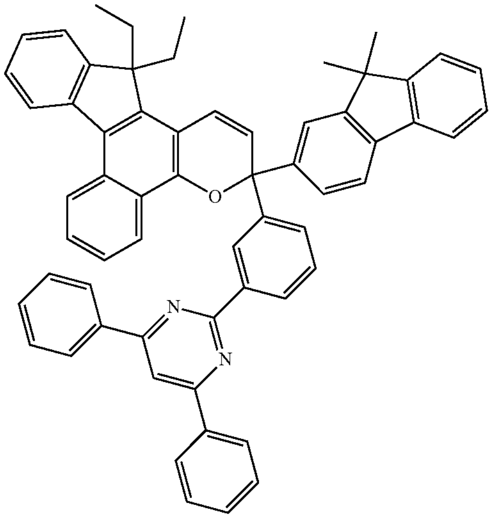
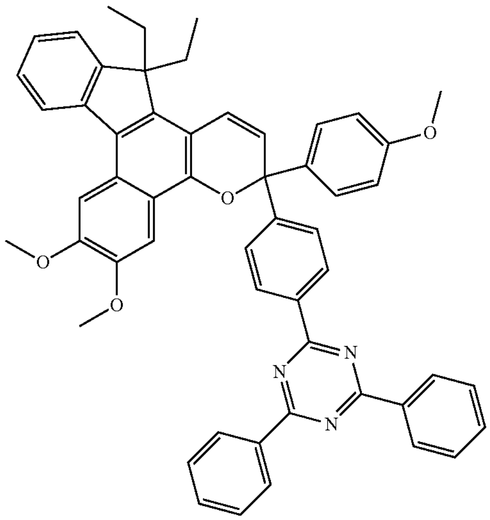

-continued
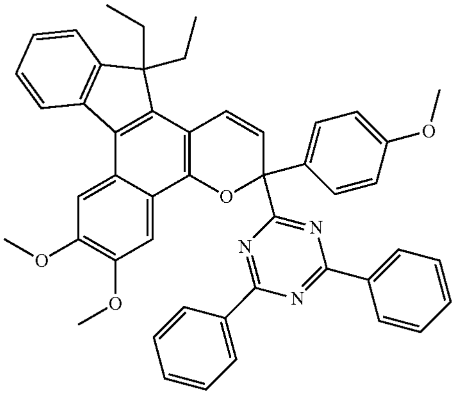
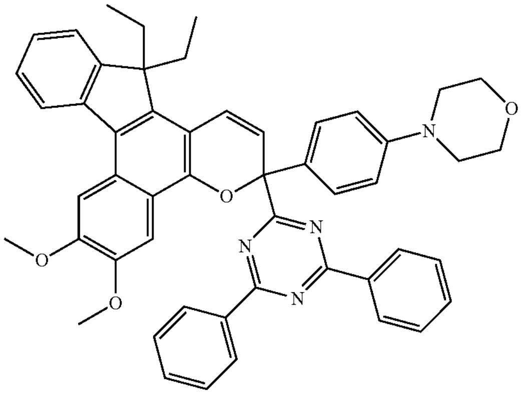
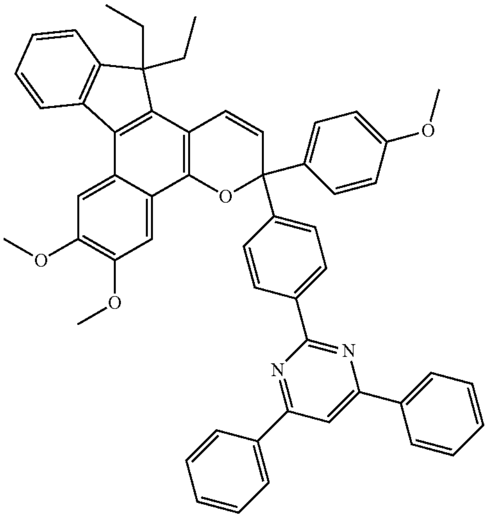
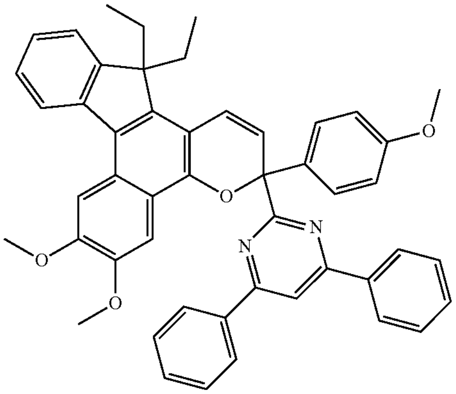
-continued
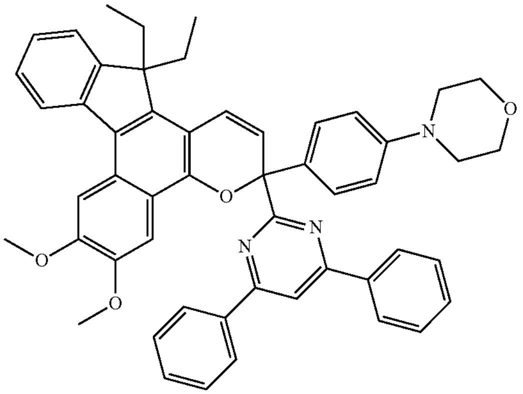
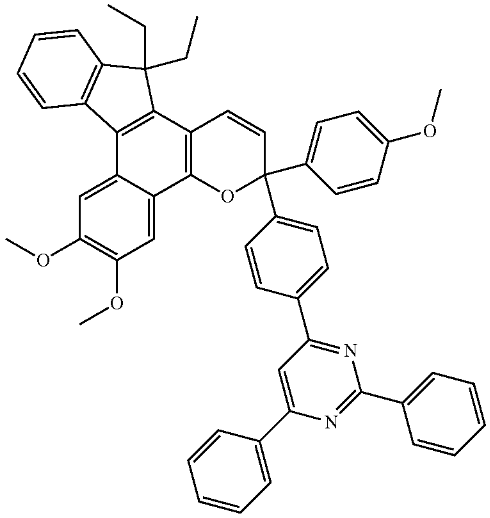
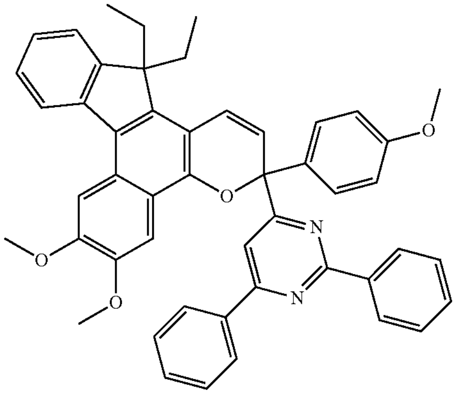
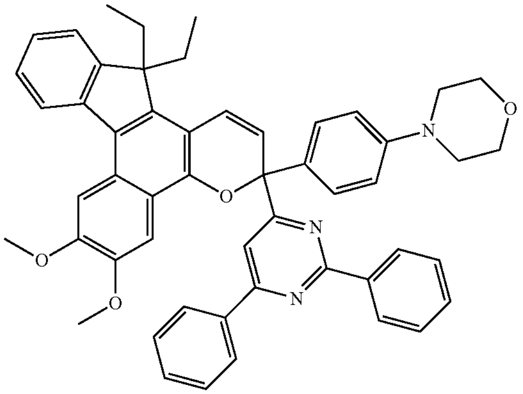

-continued
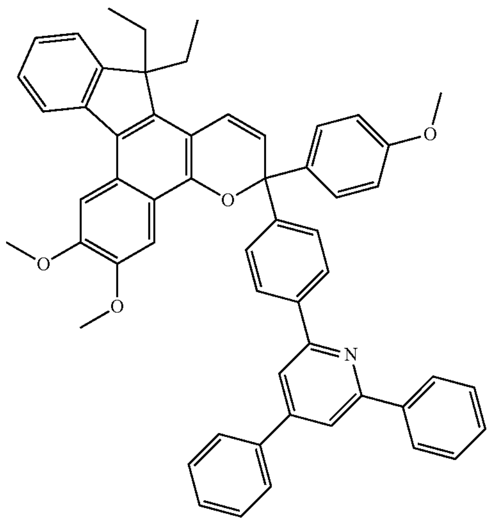
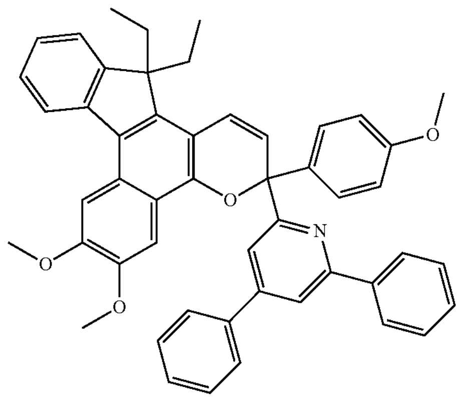
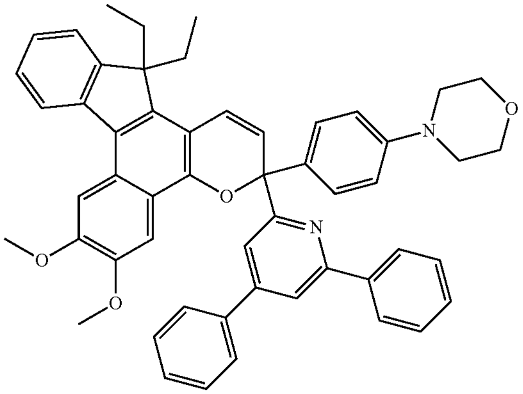
-continued
[C25]
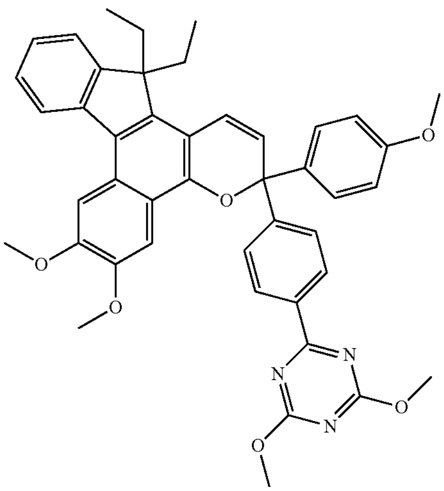
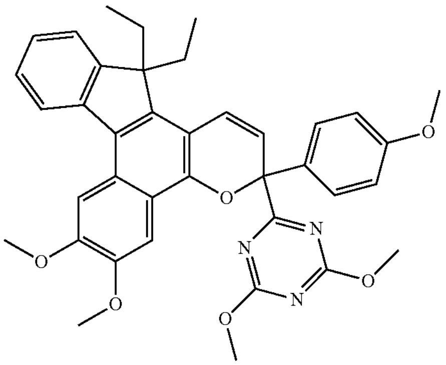
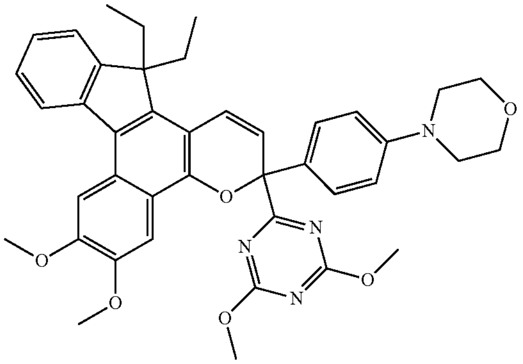
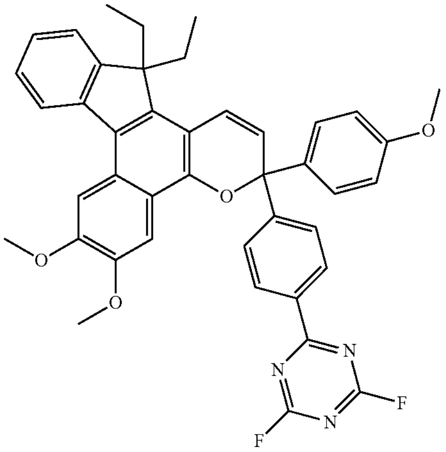

-continued
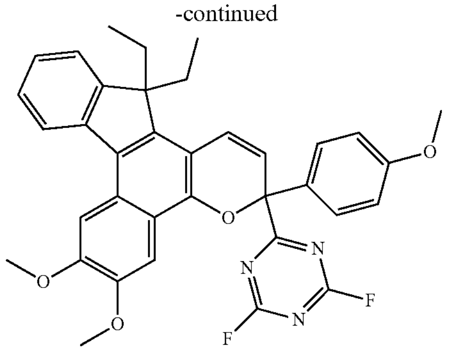
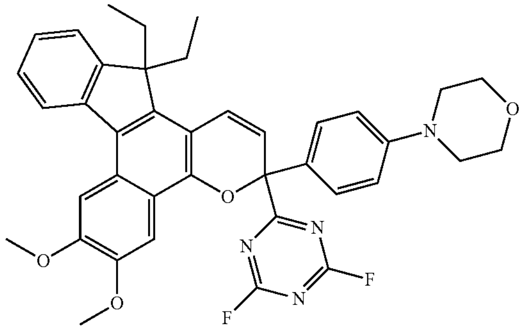
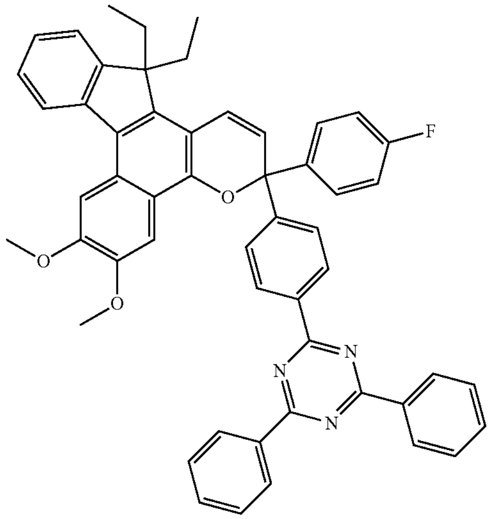
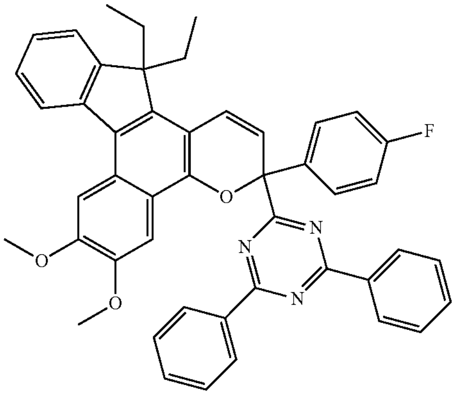
-continued
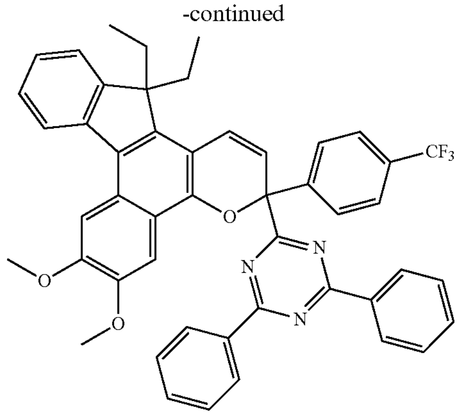
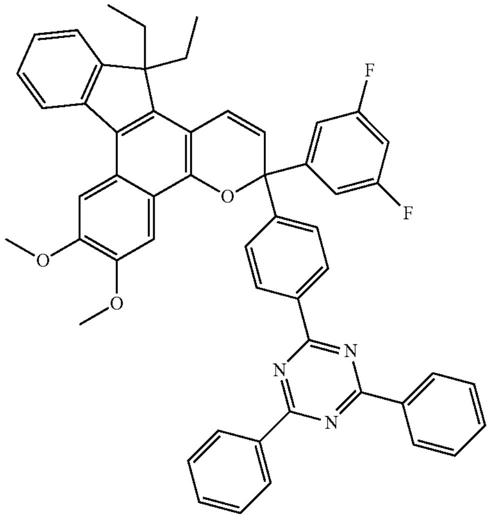
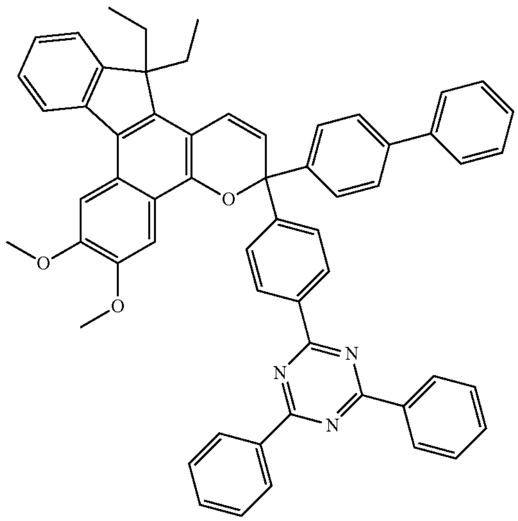

-continued
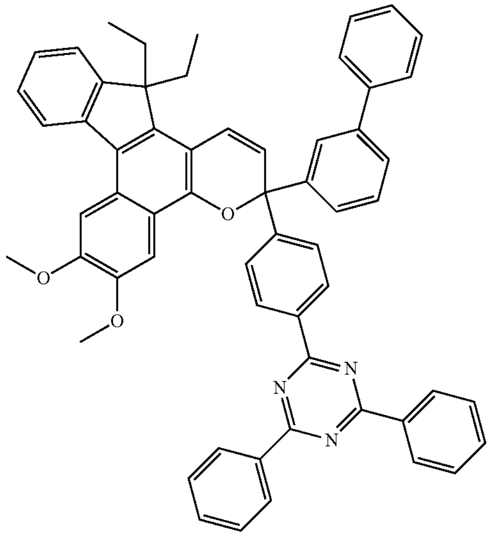
[C26]
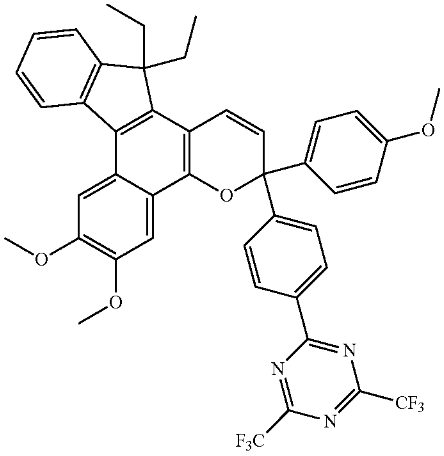
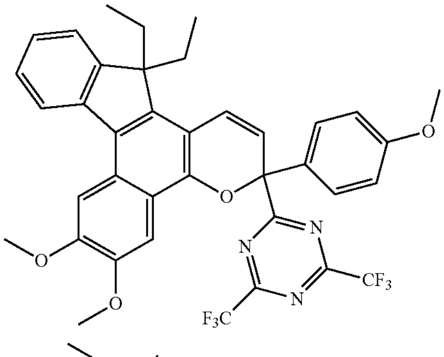
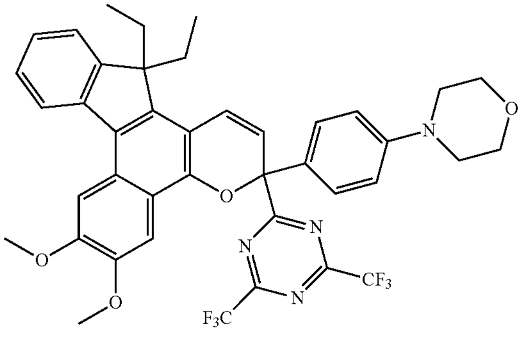
-continued
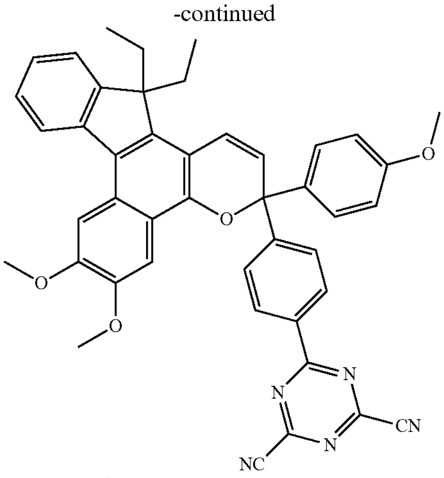
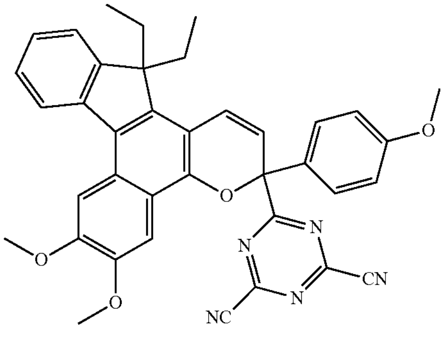
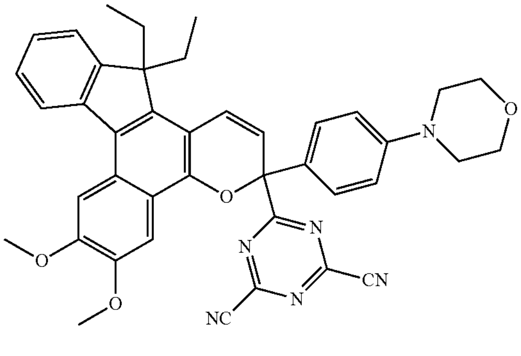
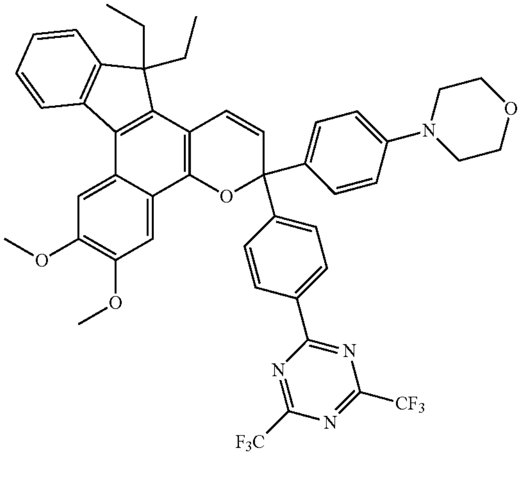

-continued
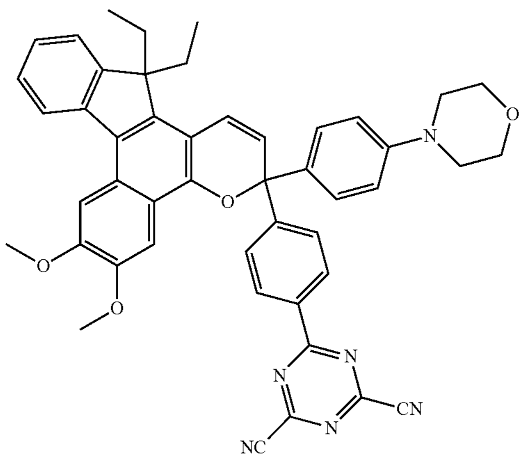
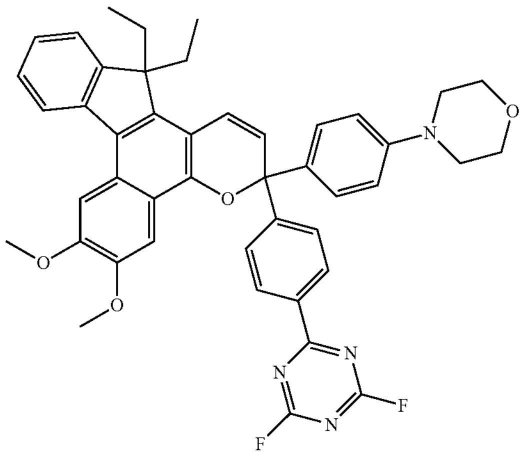
-continued
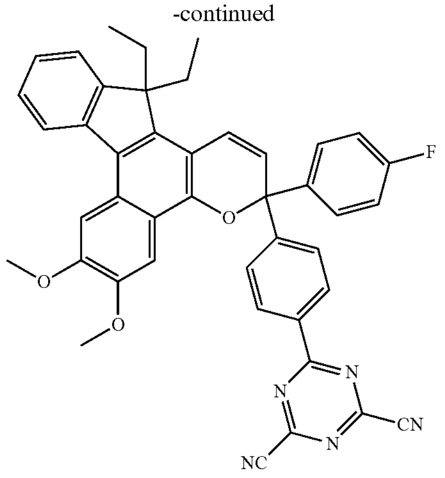
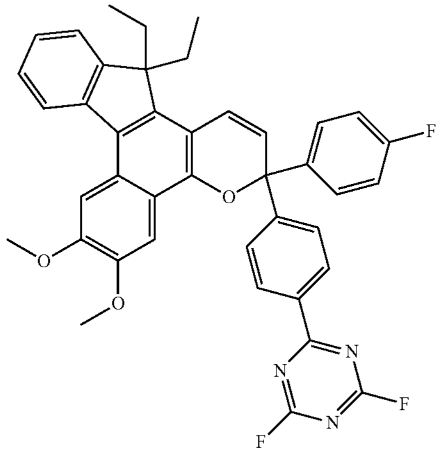
[C27]
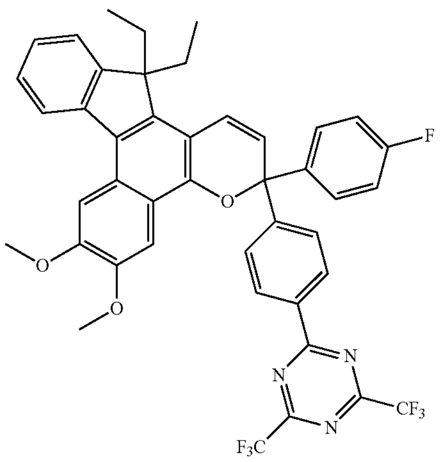
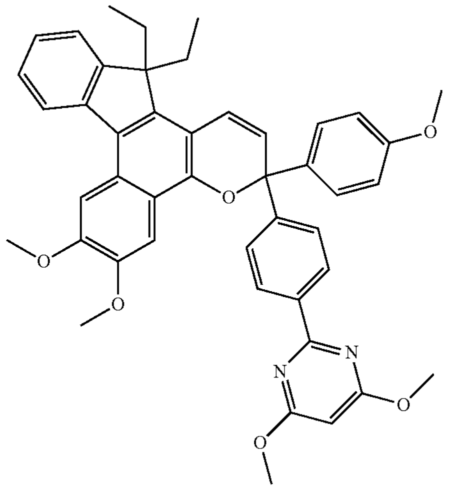

-continued
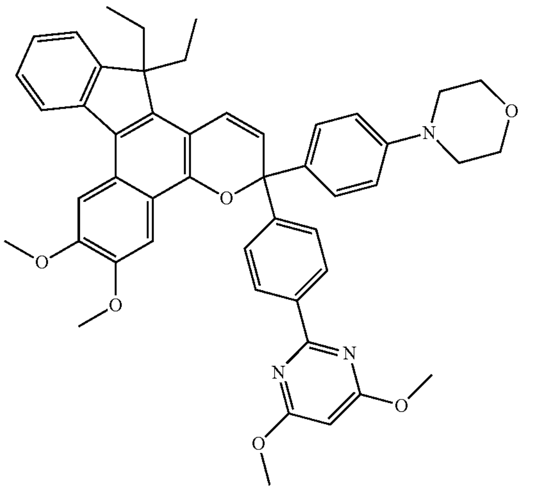
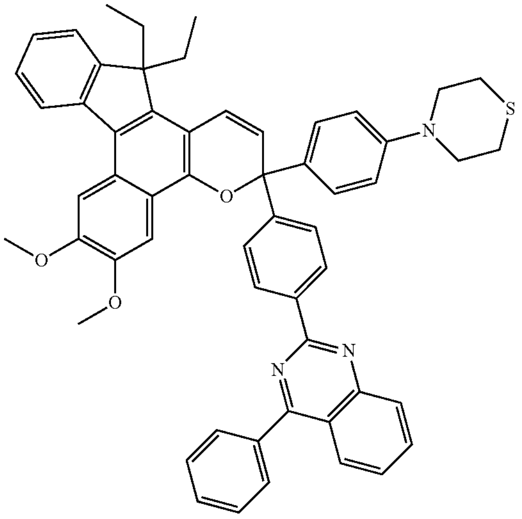
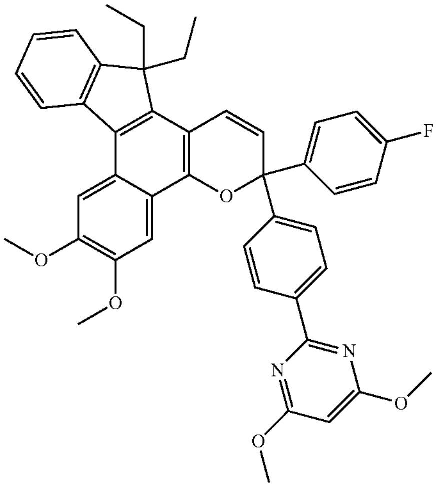
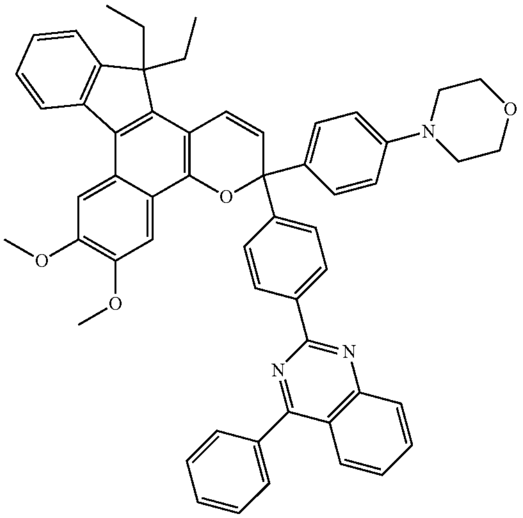
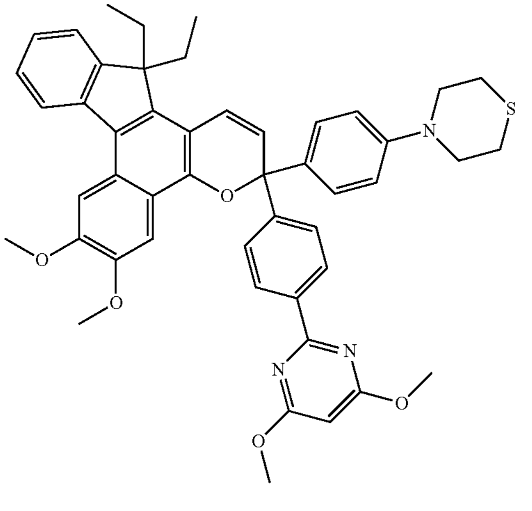
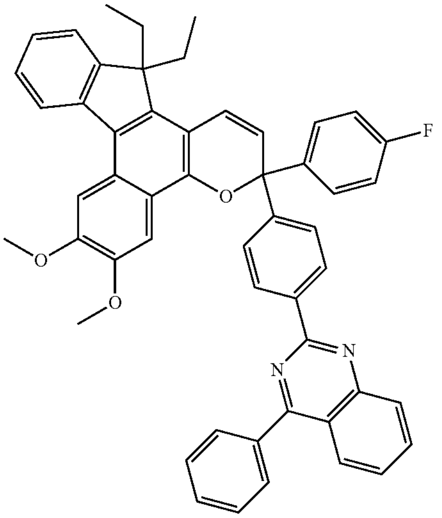

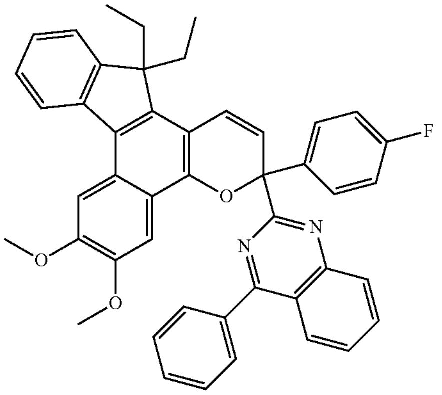
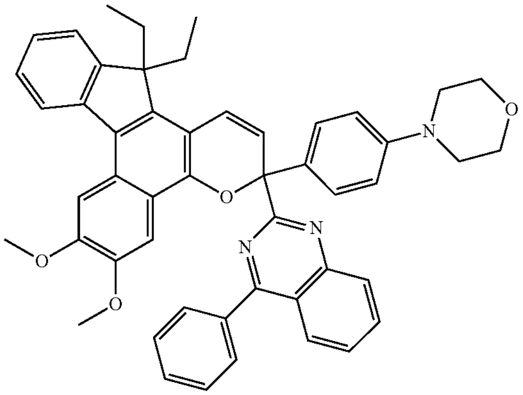
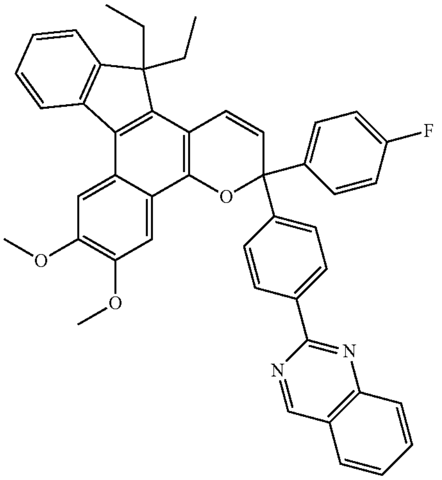
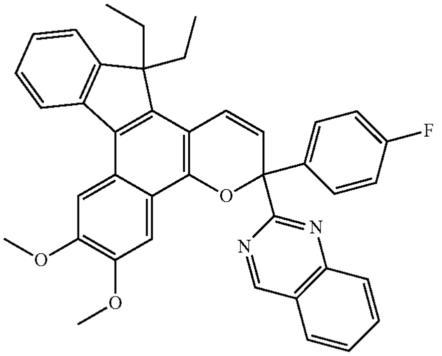
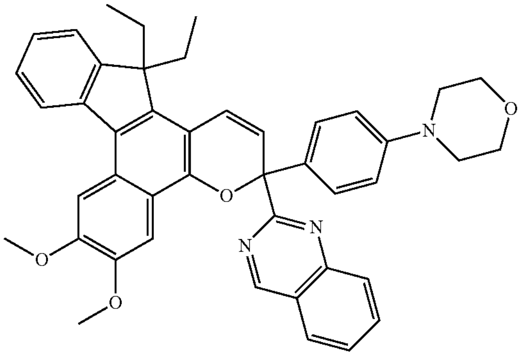
[C28]
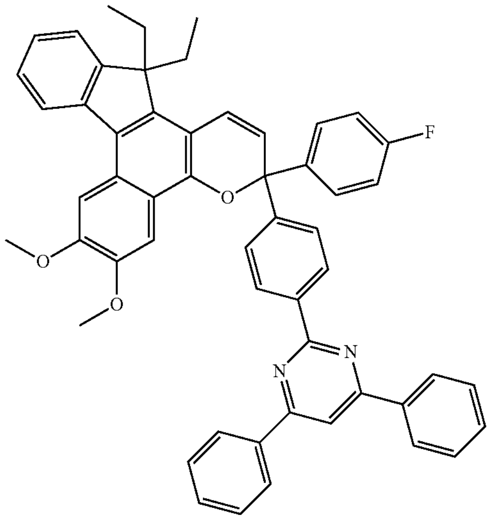
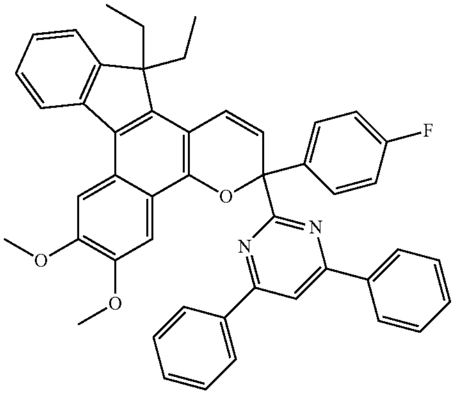

-continued
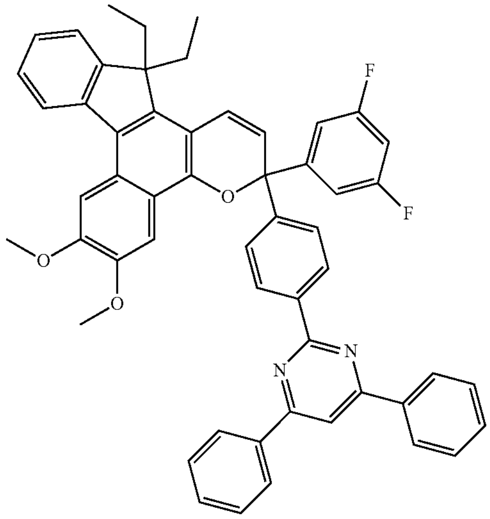
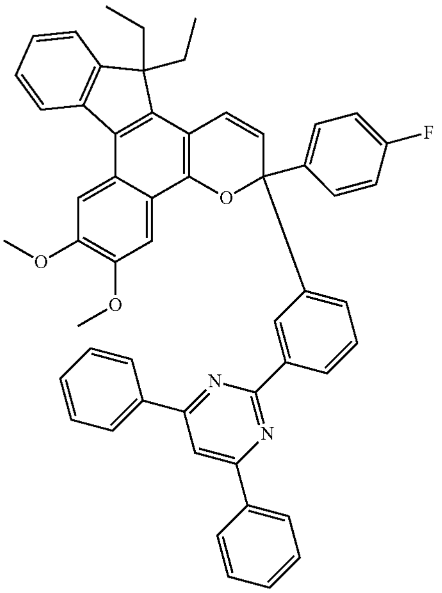
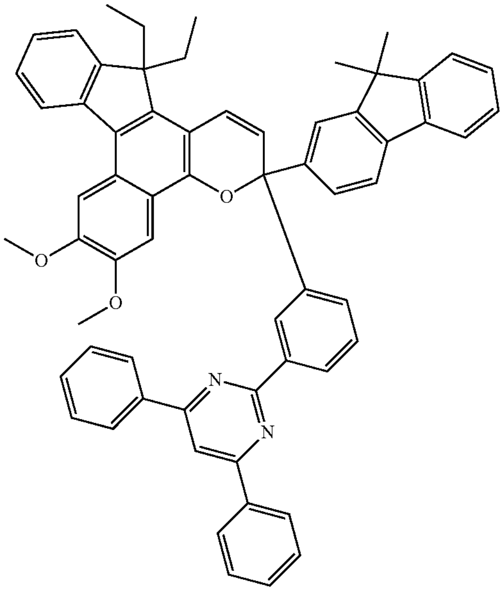
-continued
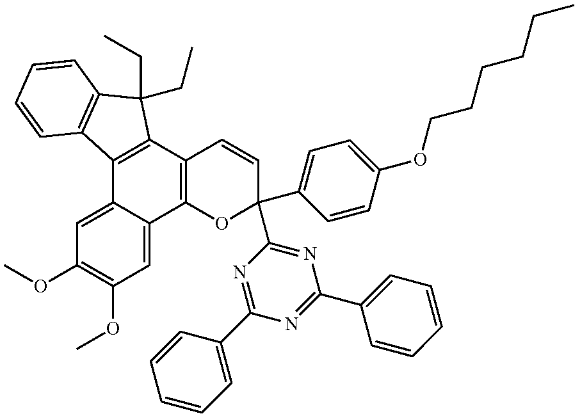
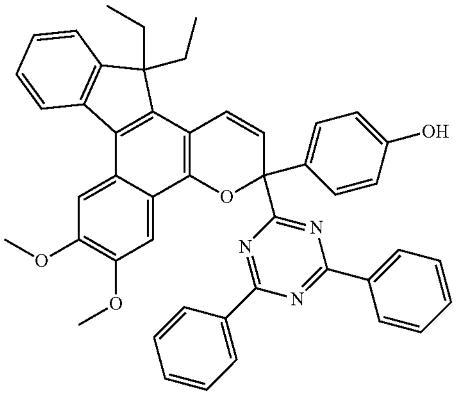
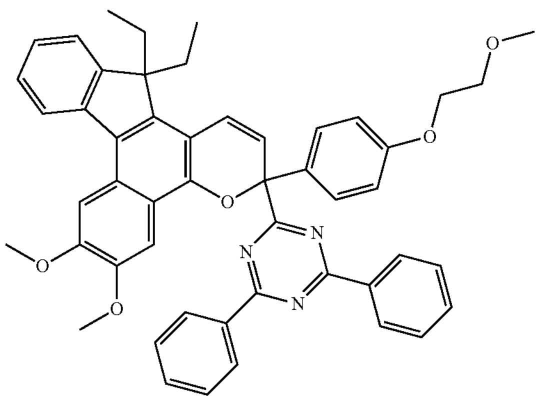

-continued
[C29]
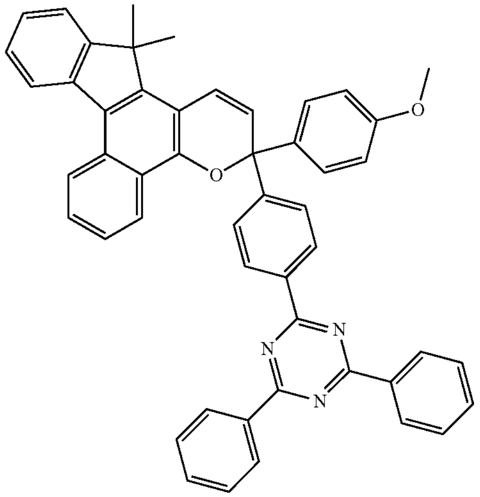
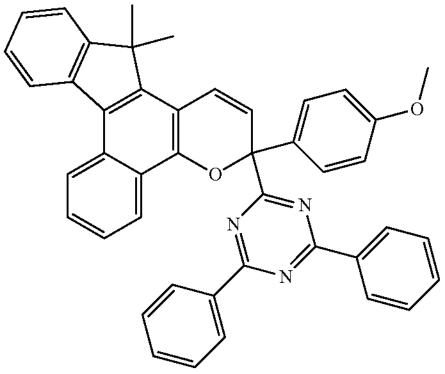
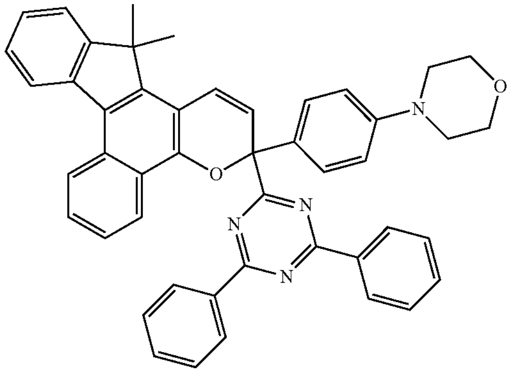
-continued
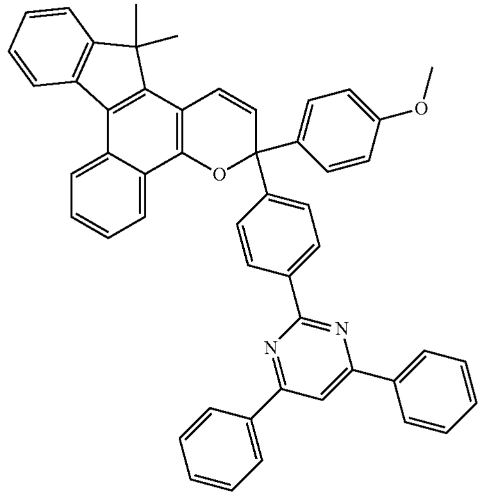
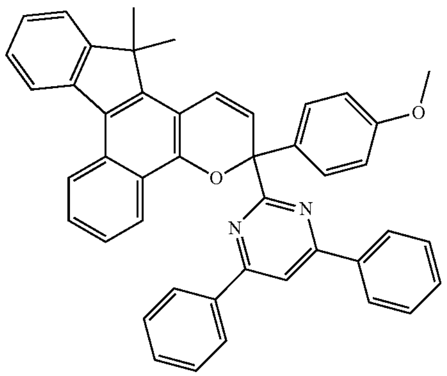
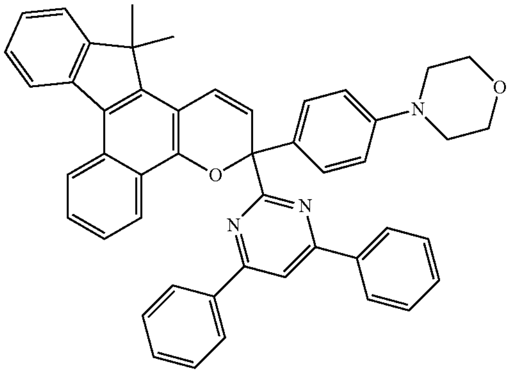

-continued
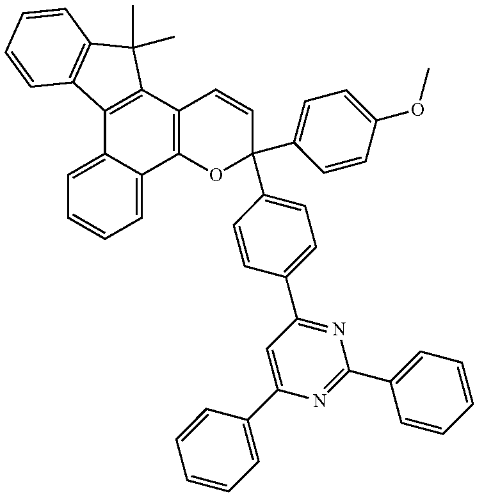
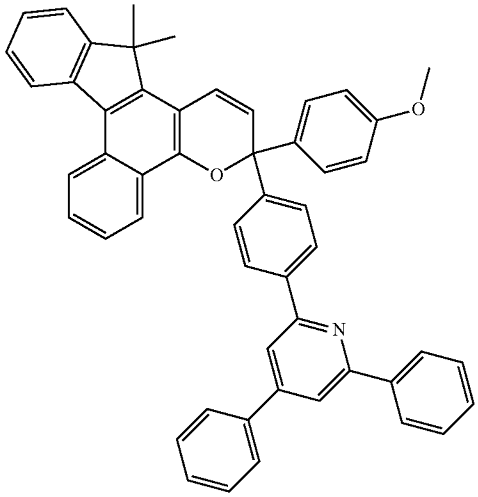
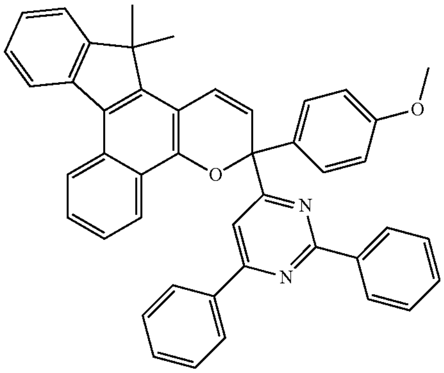
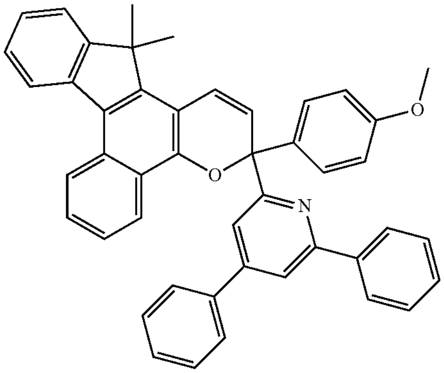
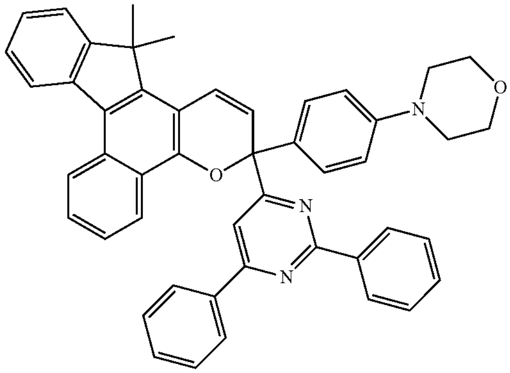
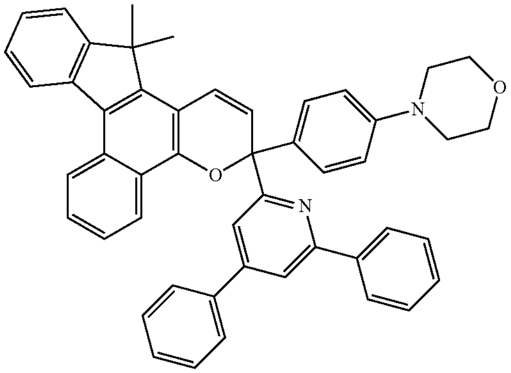

-continued
[C30]
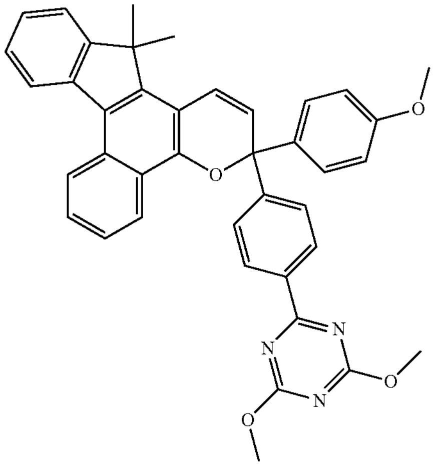
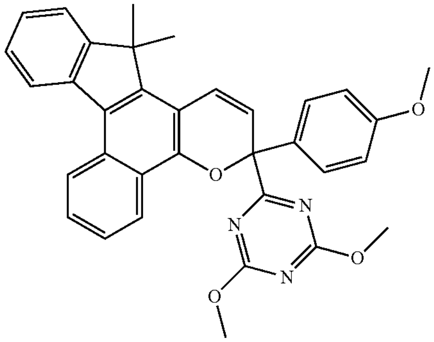
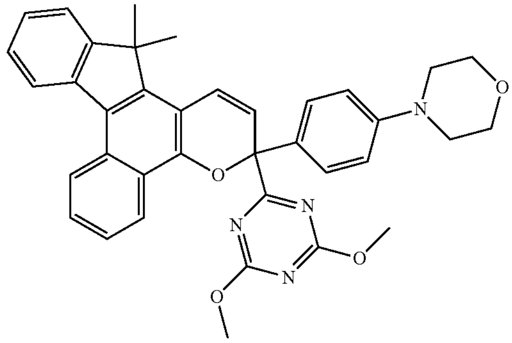
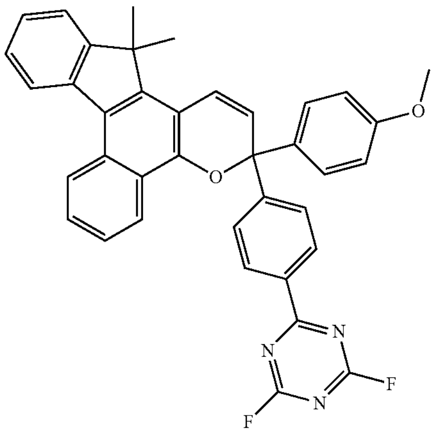
-continued
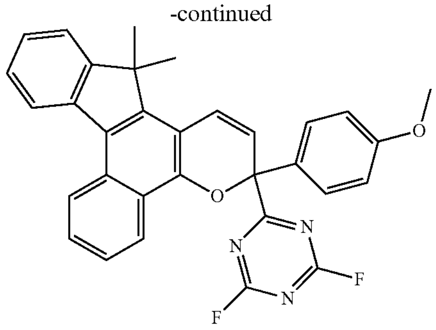
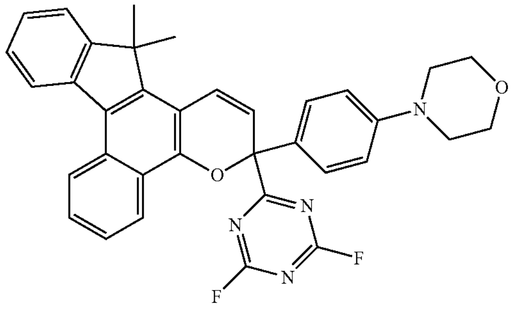
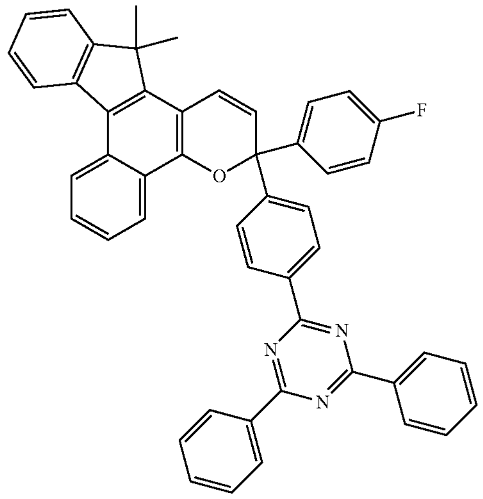
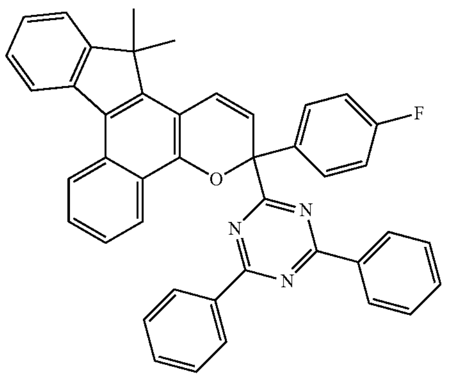

-continued
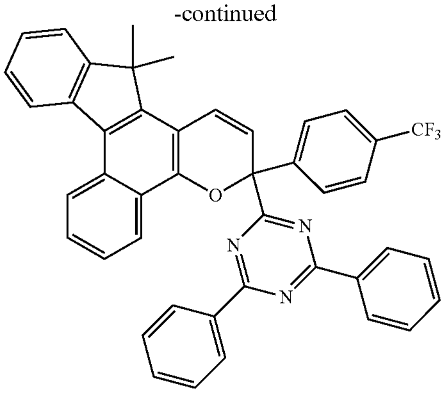
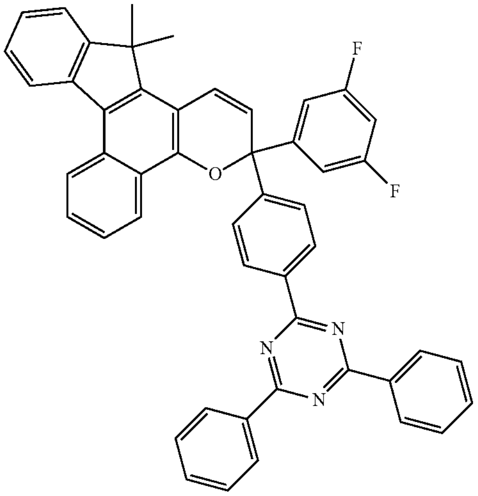
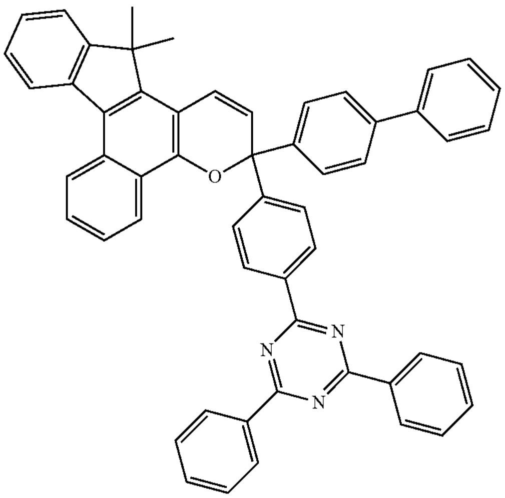
-continued
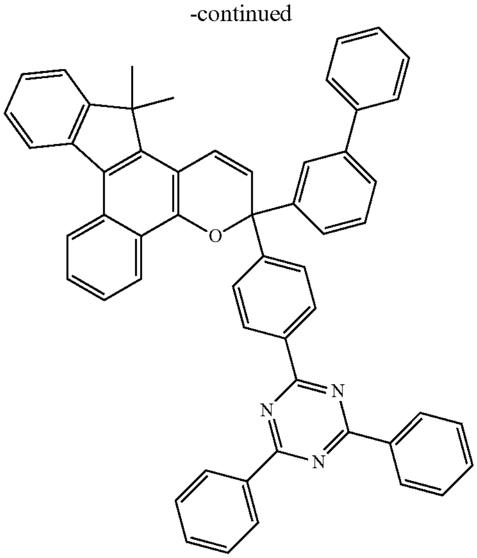
[C31]
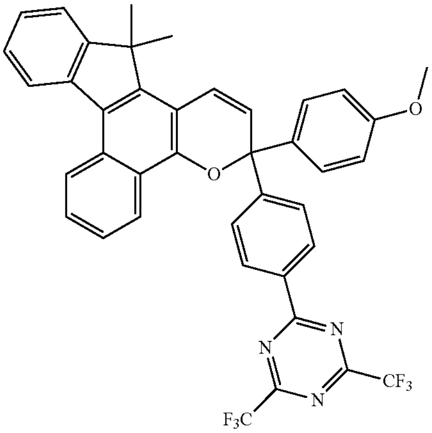
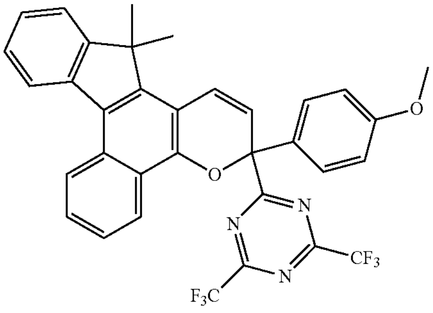
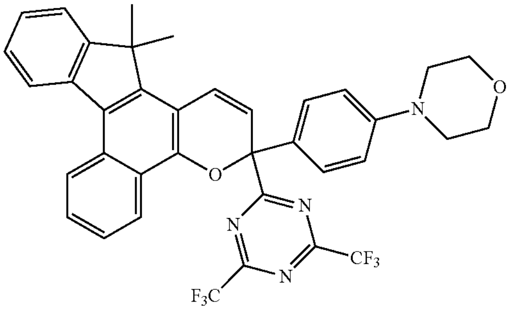

-continued
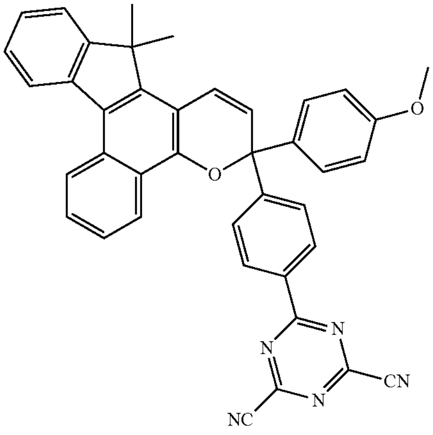
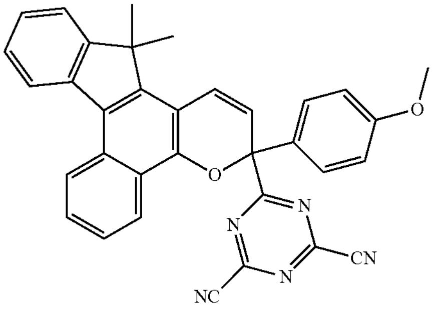
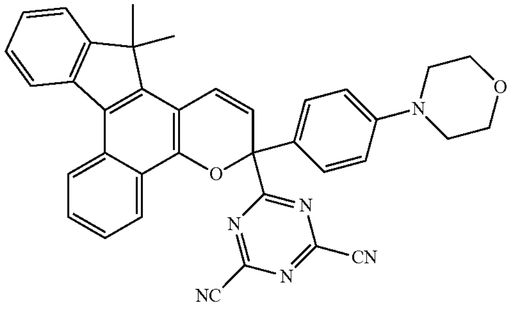
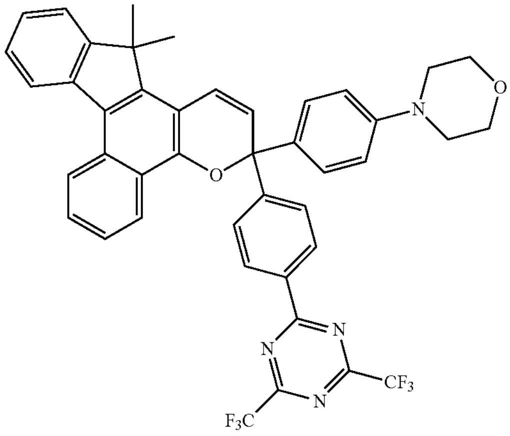
-continued
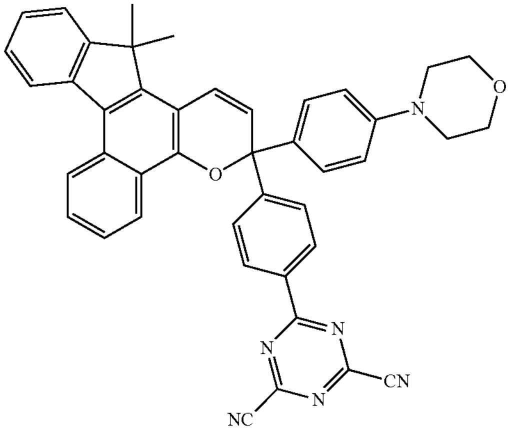
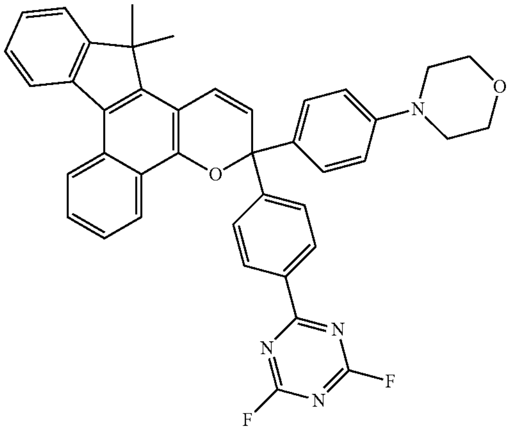
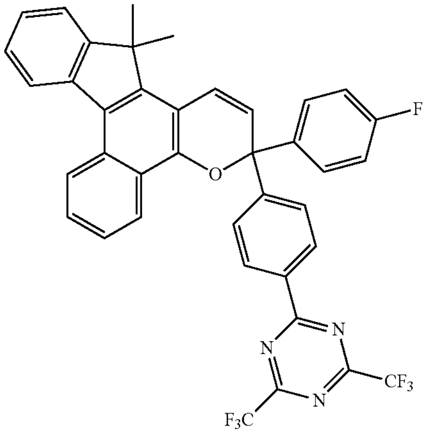
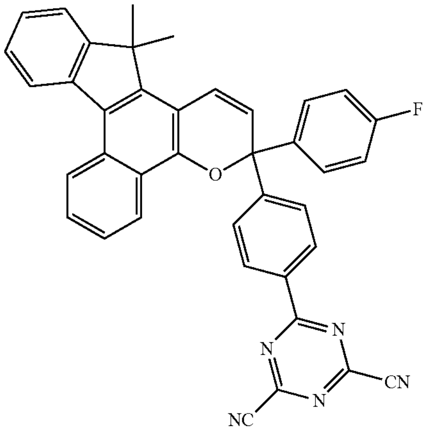

-continued
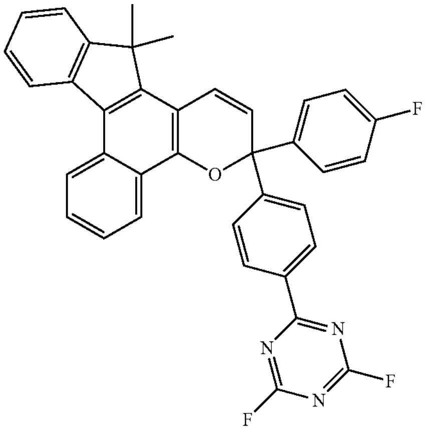
[C32]
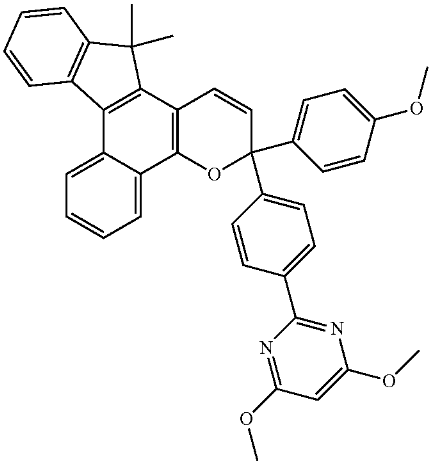
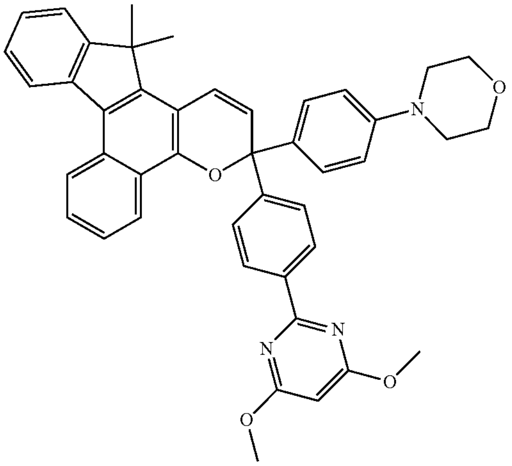
-continued
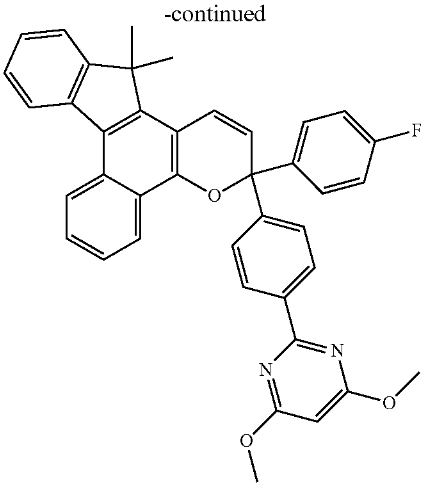
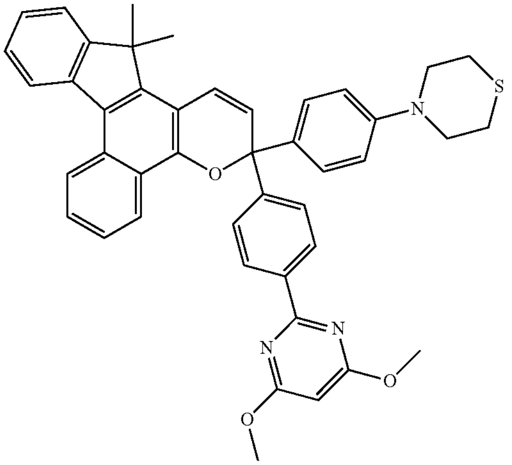
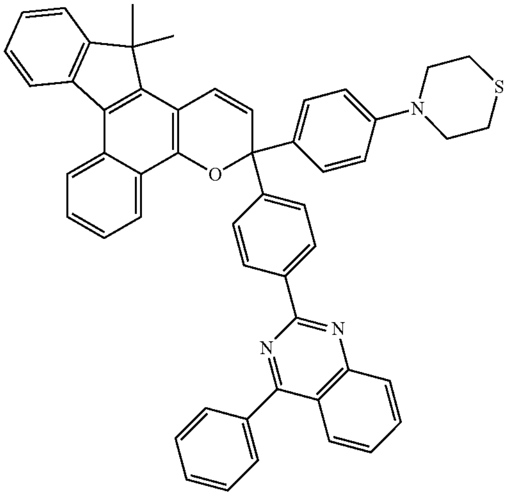

-continued
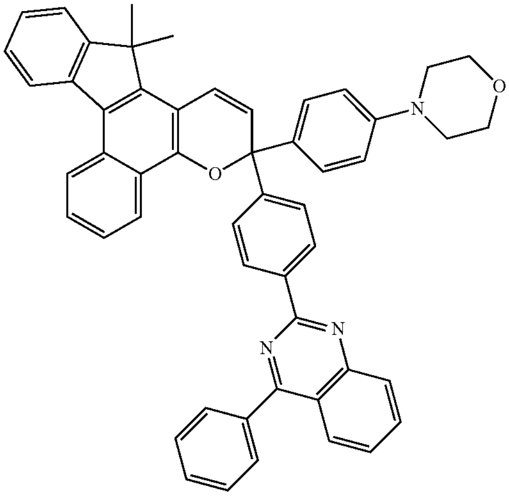
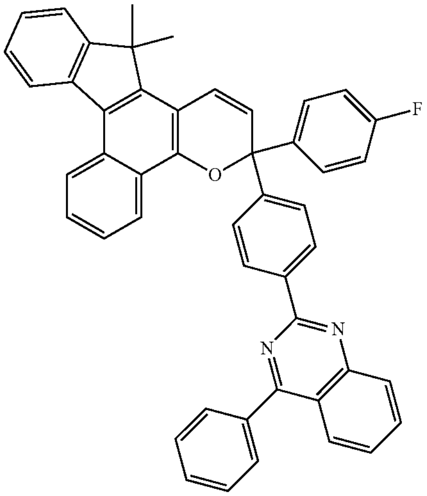
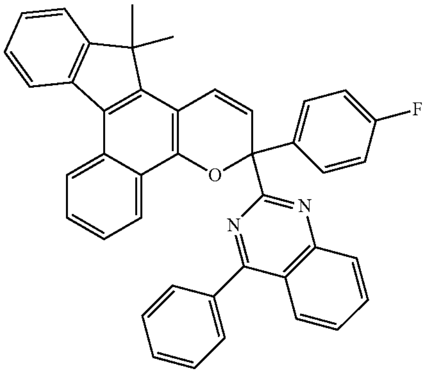
-continued
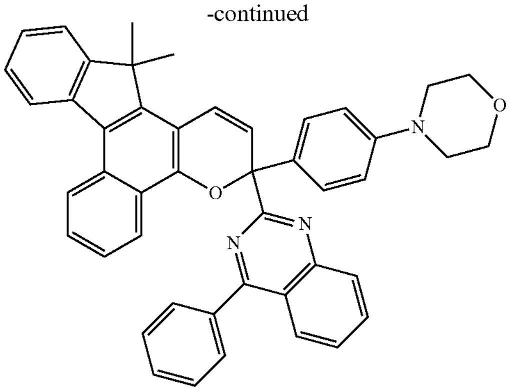
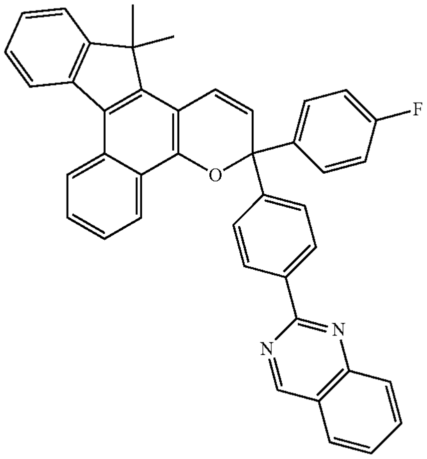
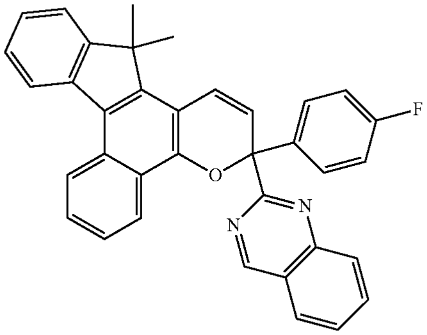
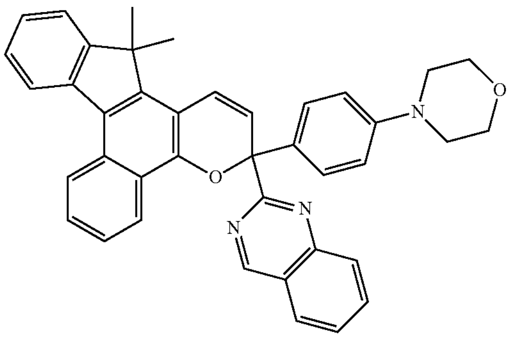

-continued
[C33]
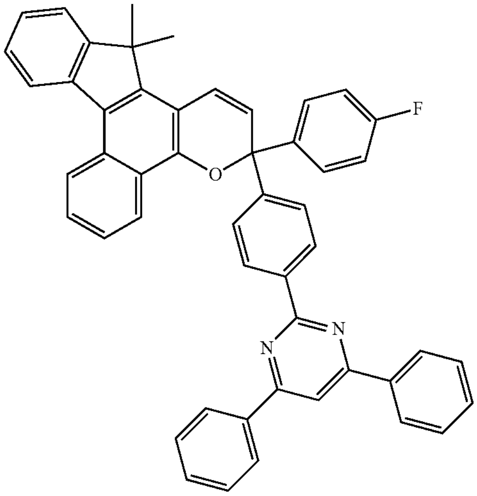
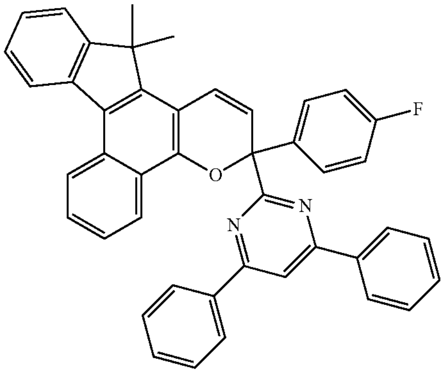
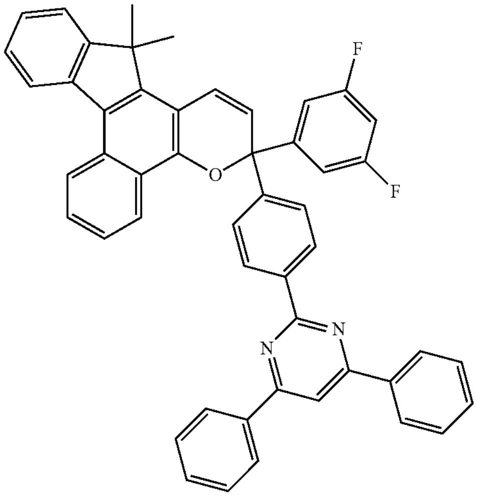
-continued
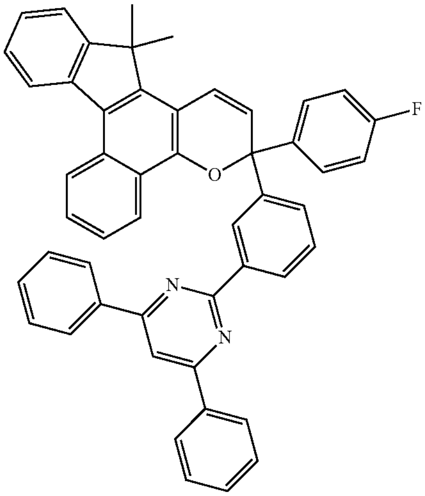
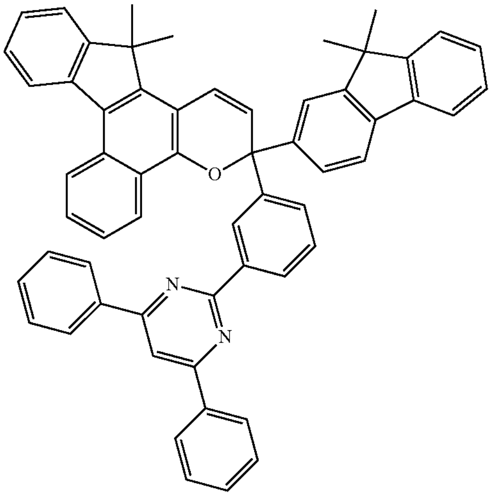
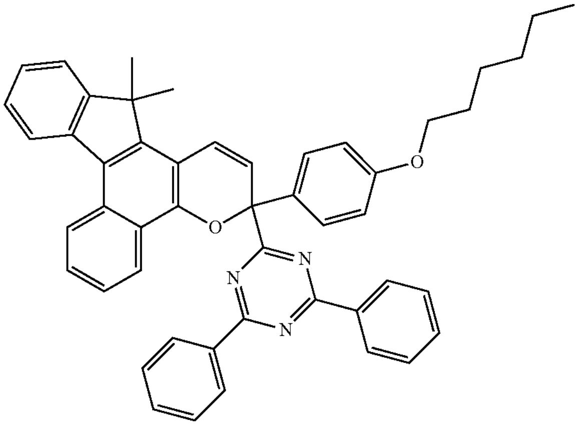

-continued
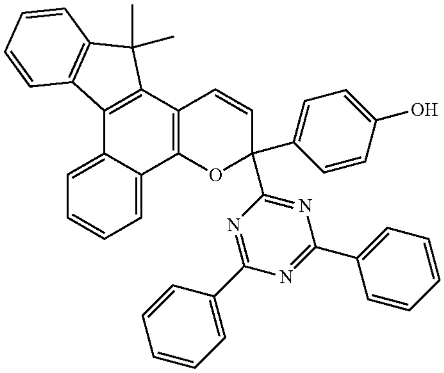
[C34]
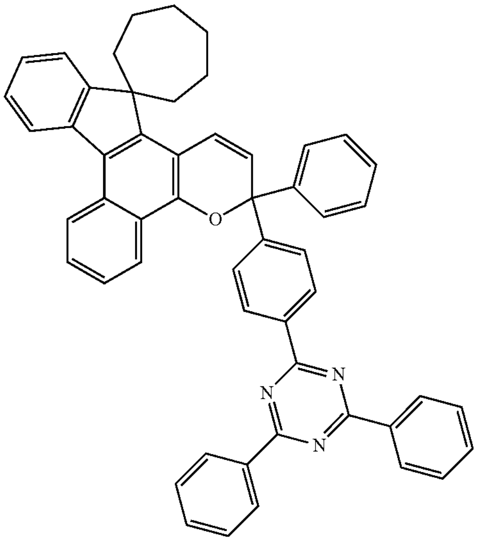
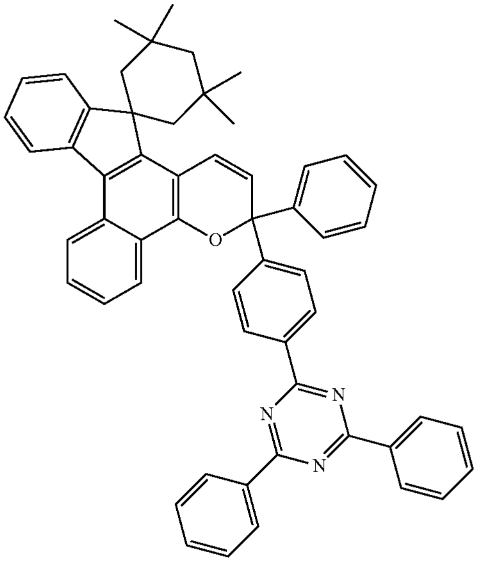
-continued
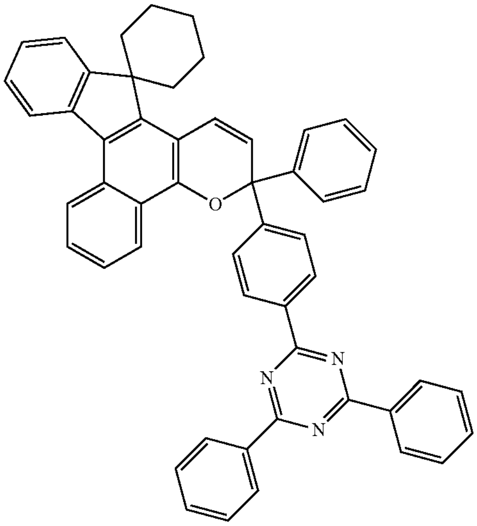
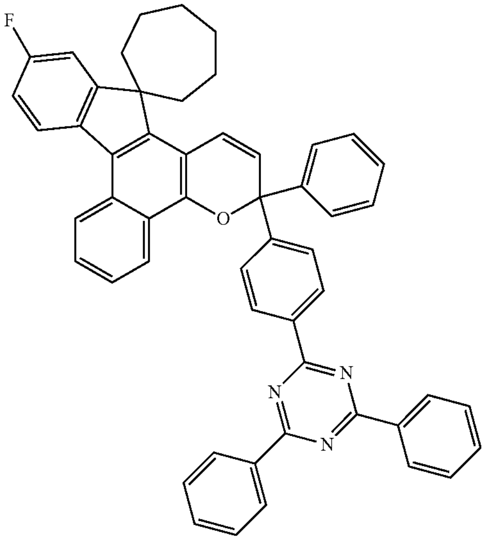
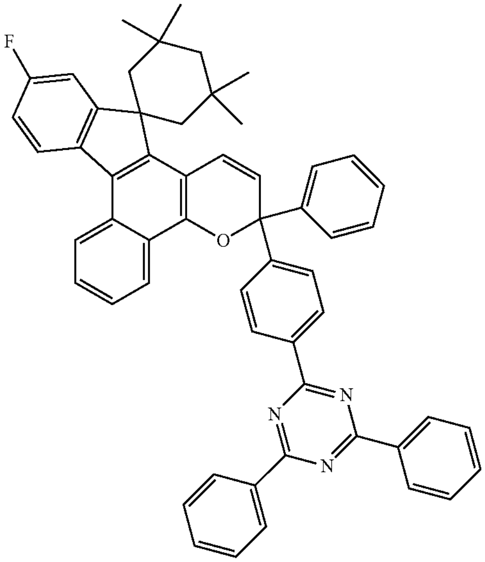

-continued
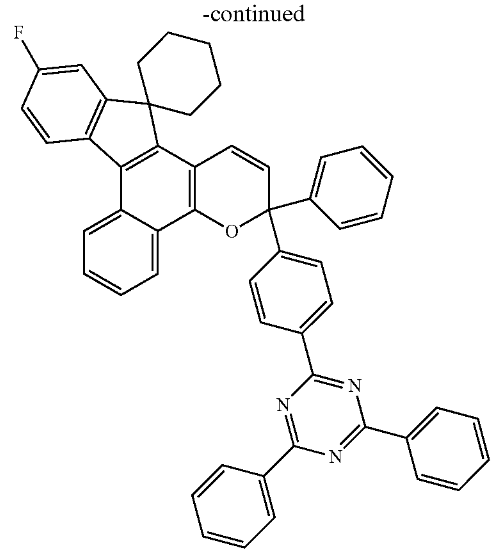
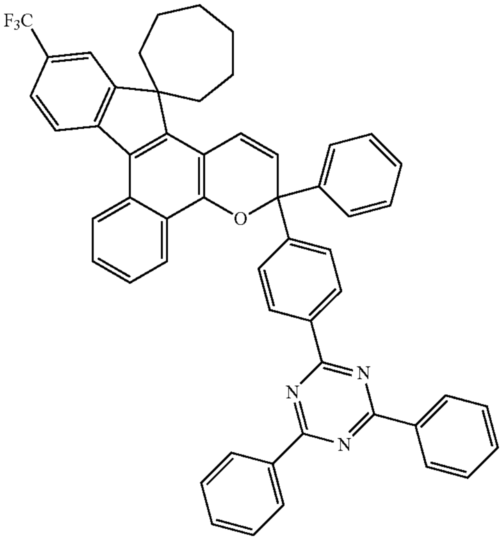
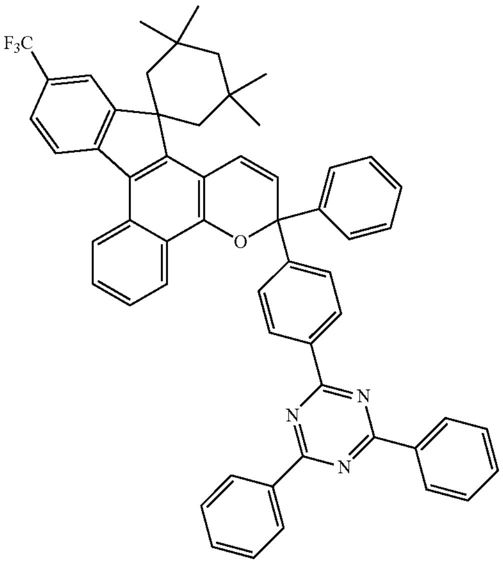
-continued
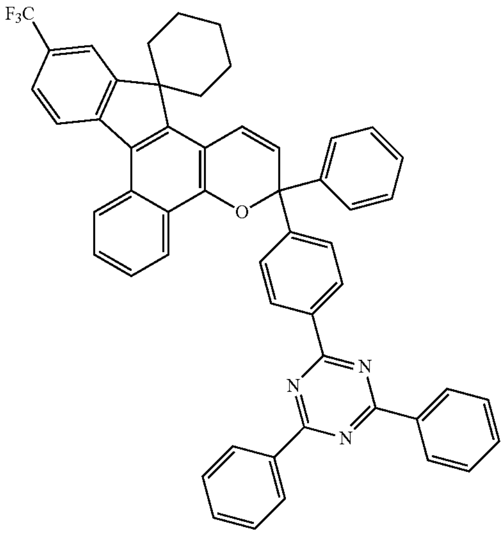
[C35]
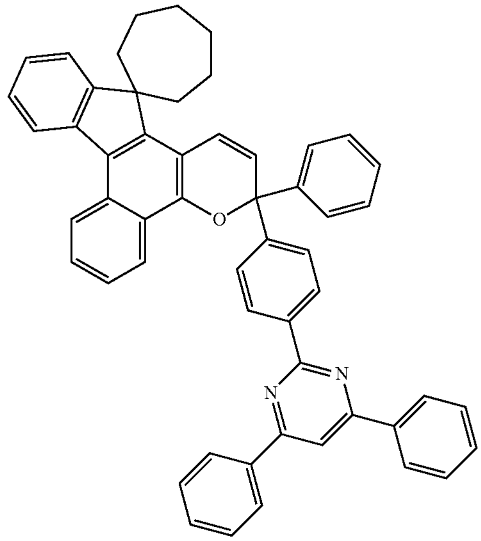
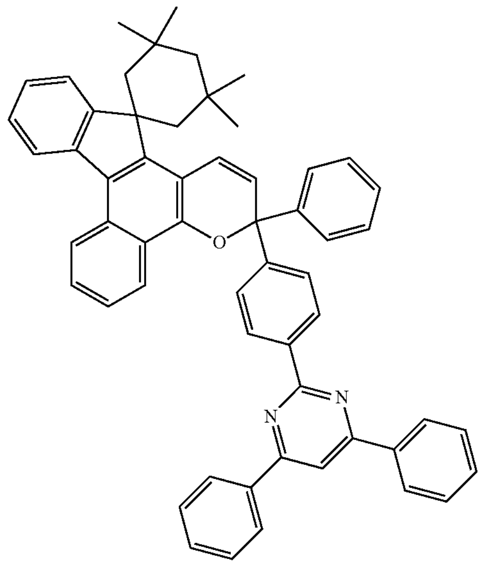

-continued
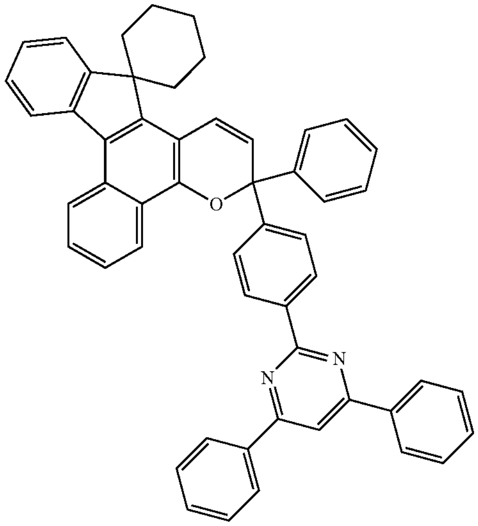
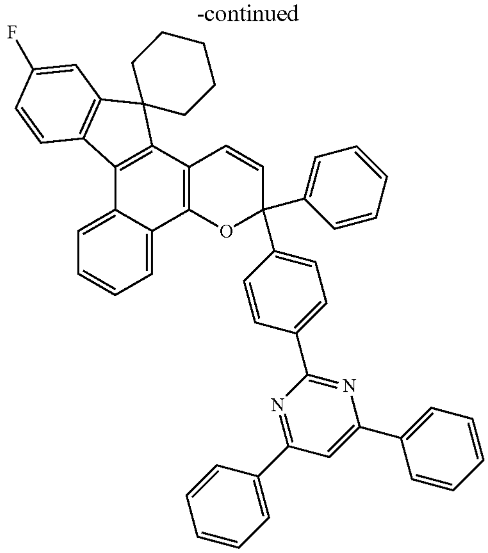
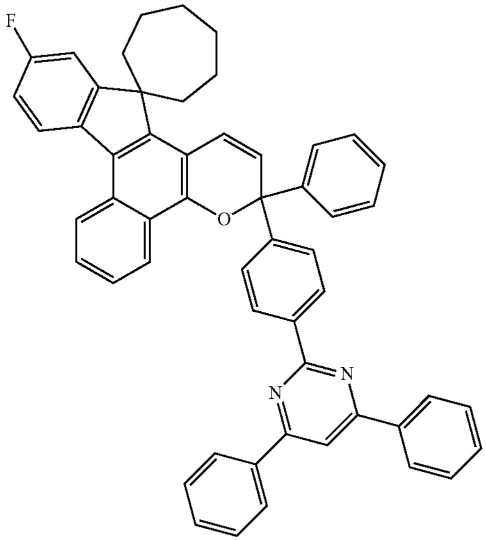
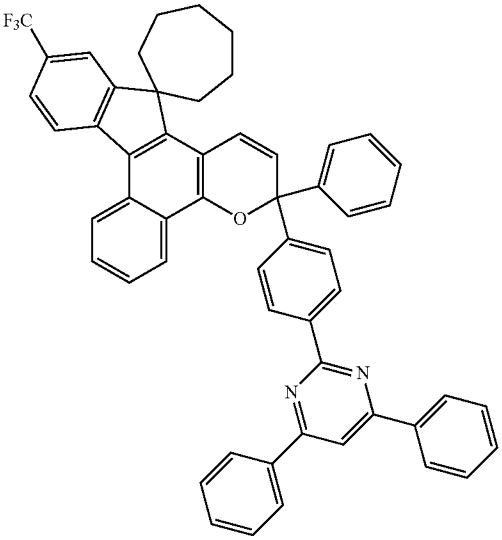
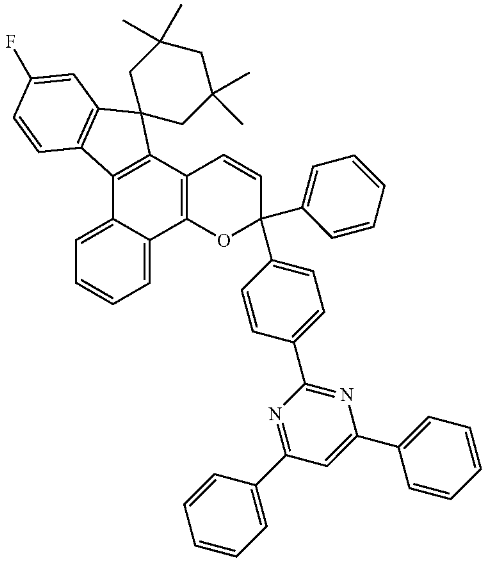
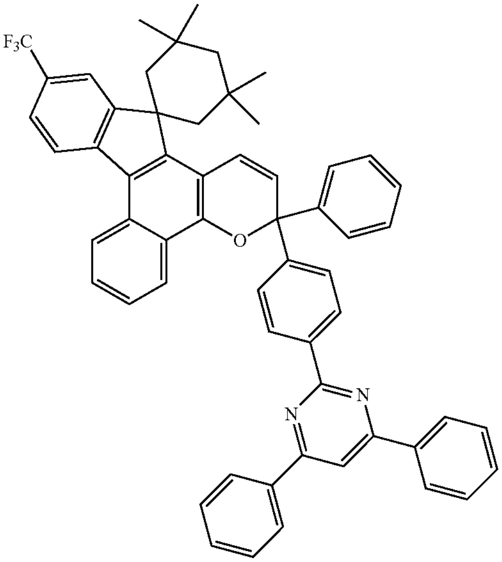
-continued -continued
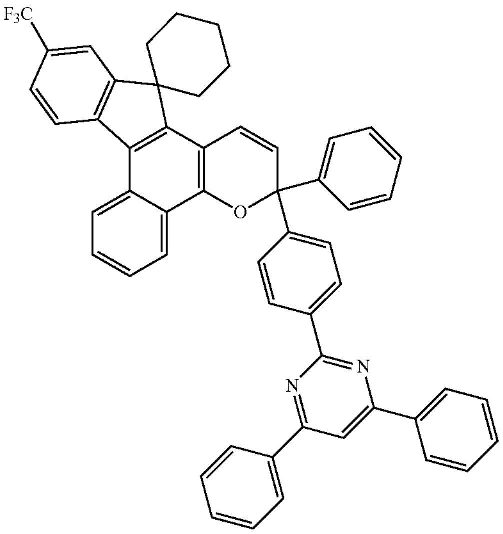
-continued
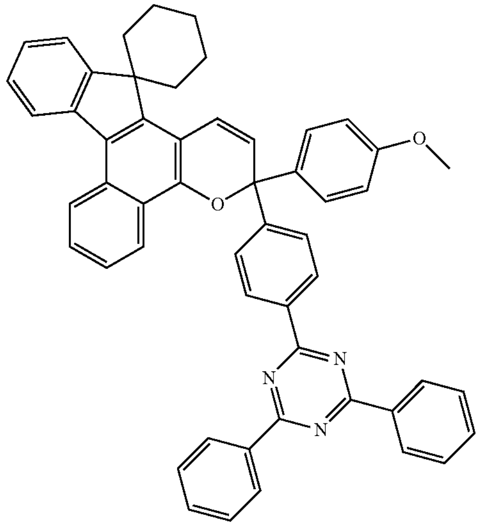
[C36]
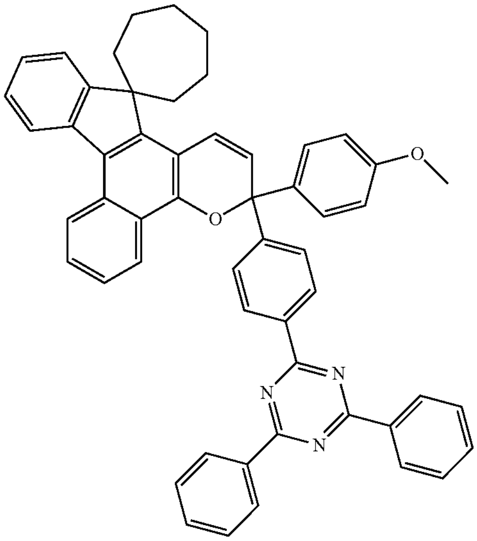
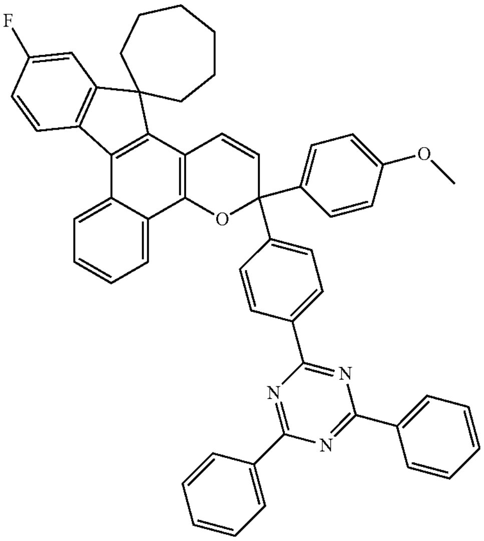
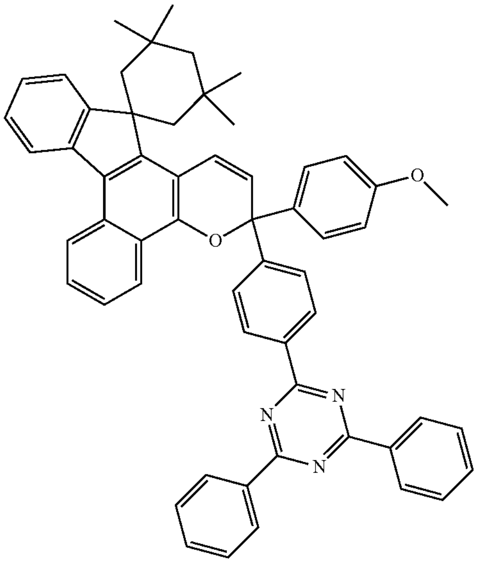
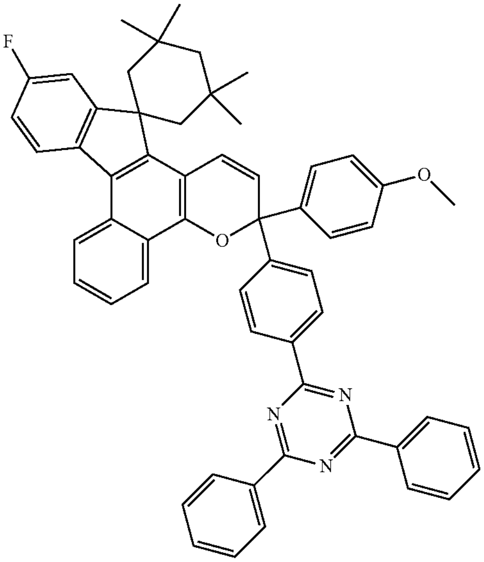

-continued
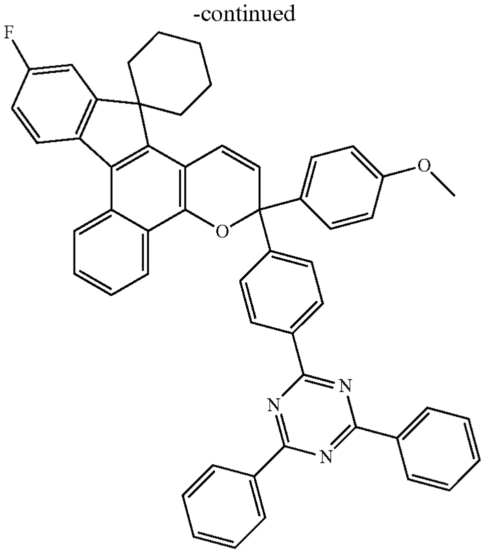
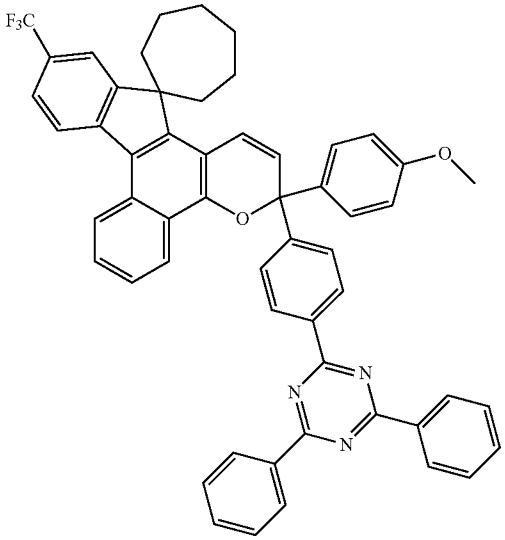
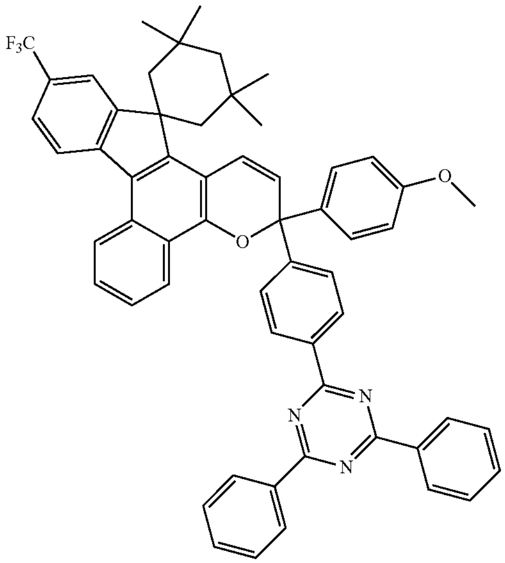
-continued
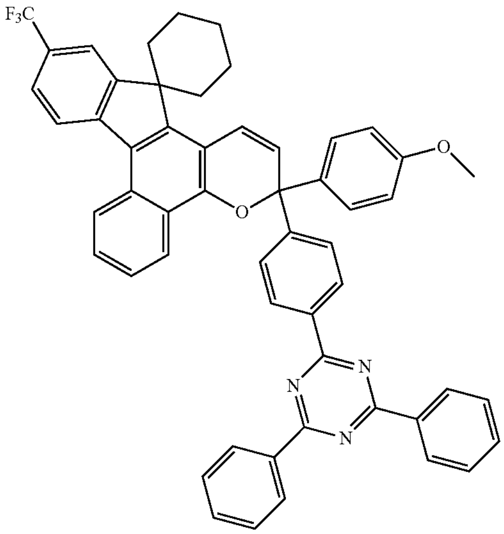
[C37]
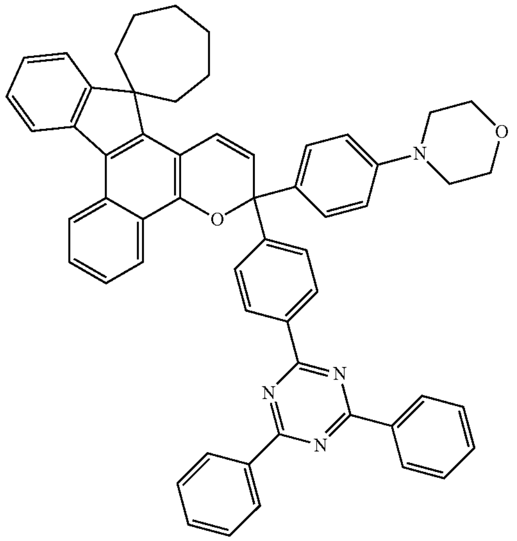
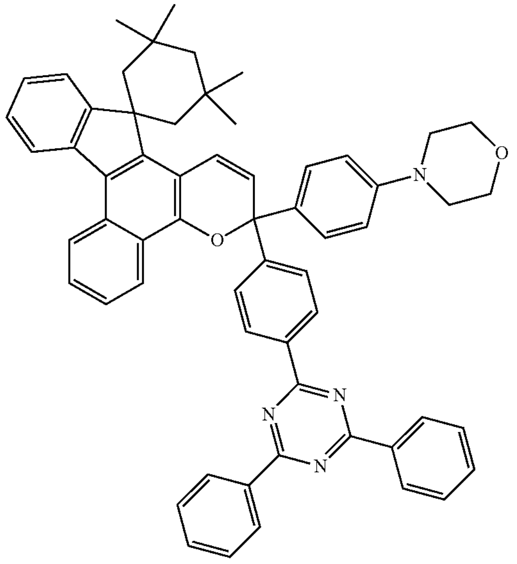

-continued
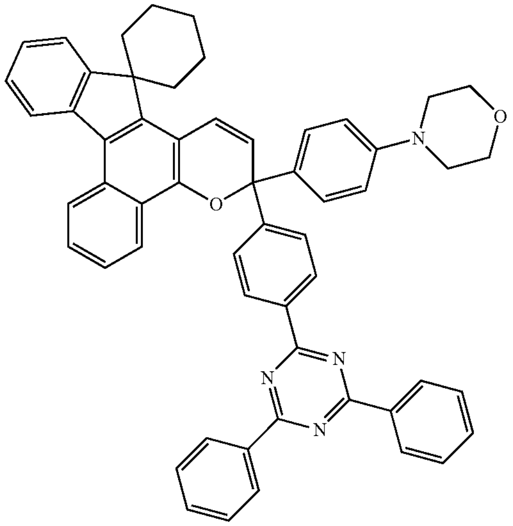
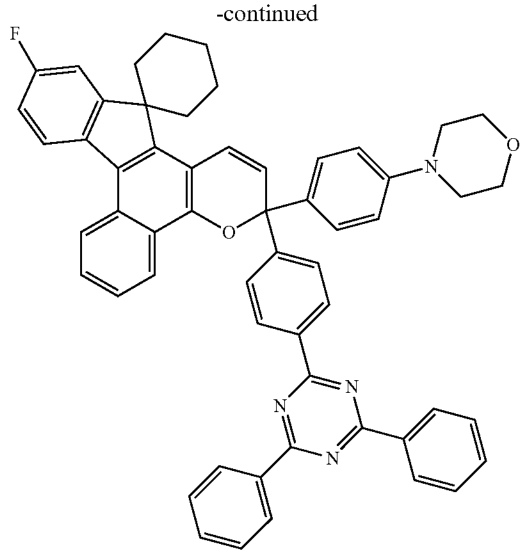
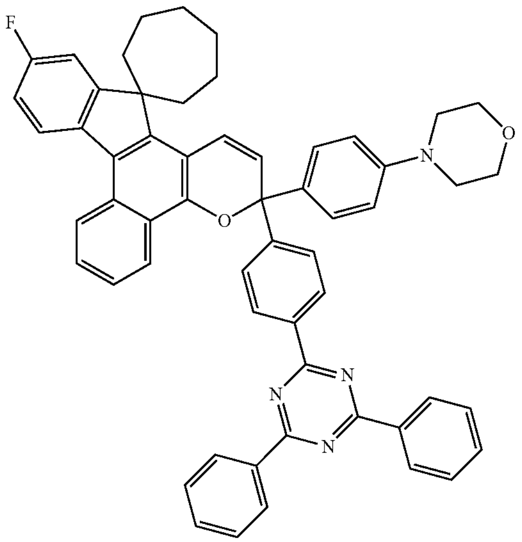
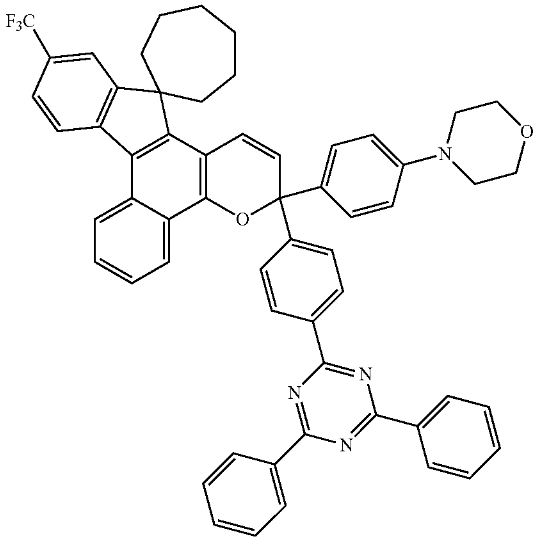
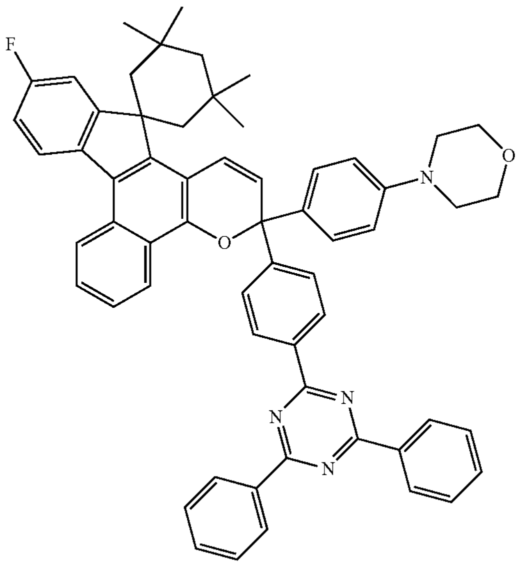
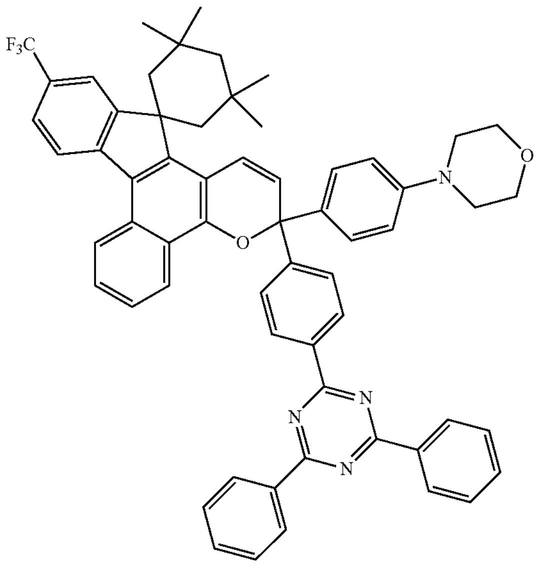
-continued -continued
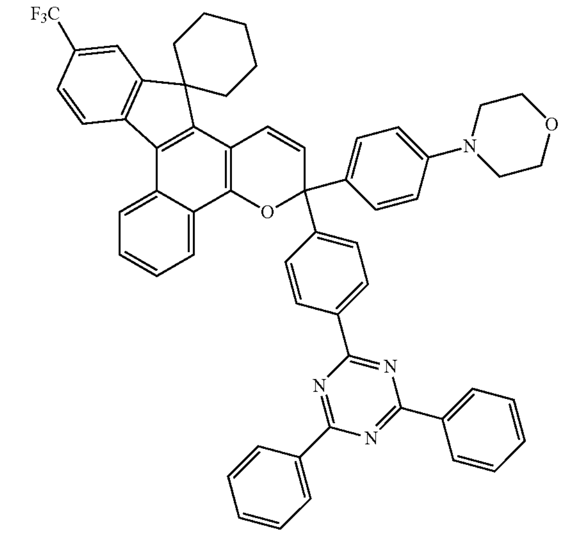
[C38]
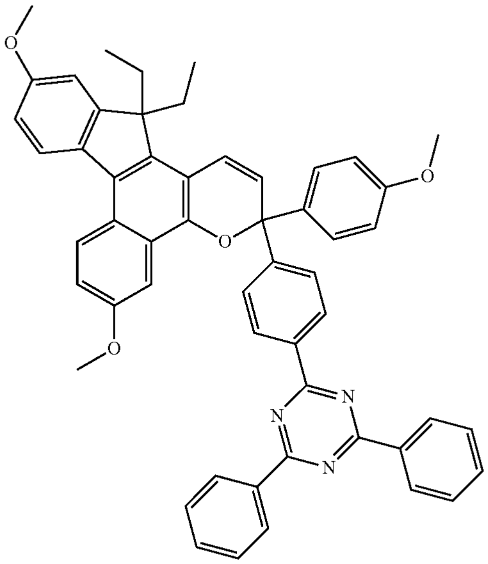
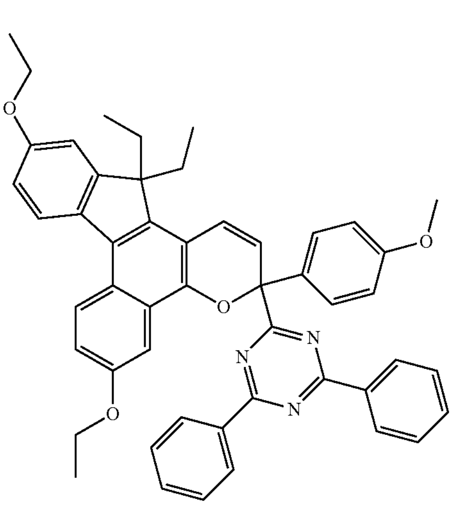
-continued
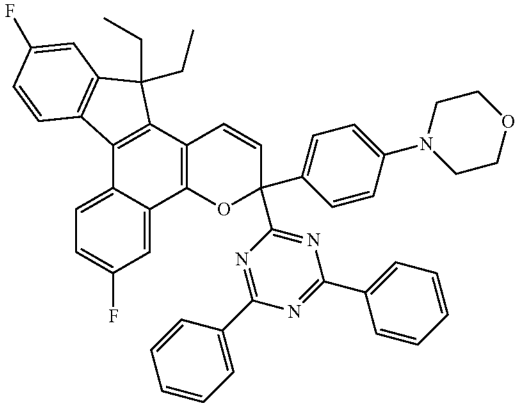
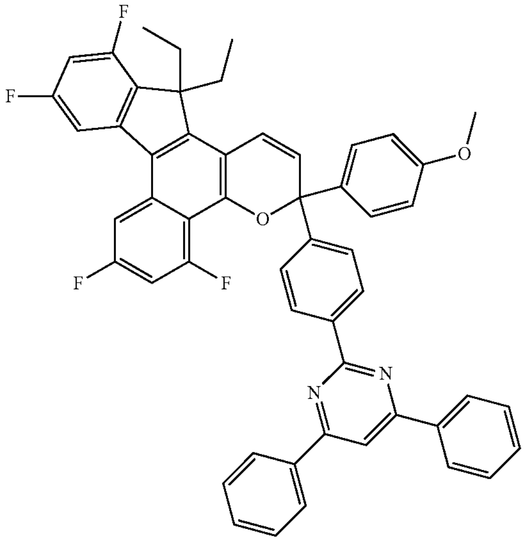
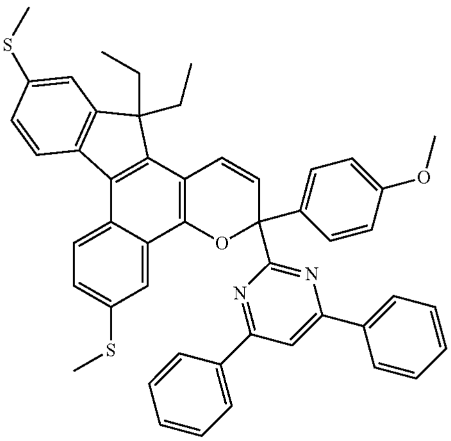

-continued

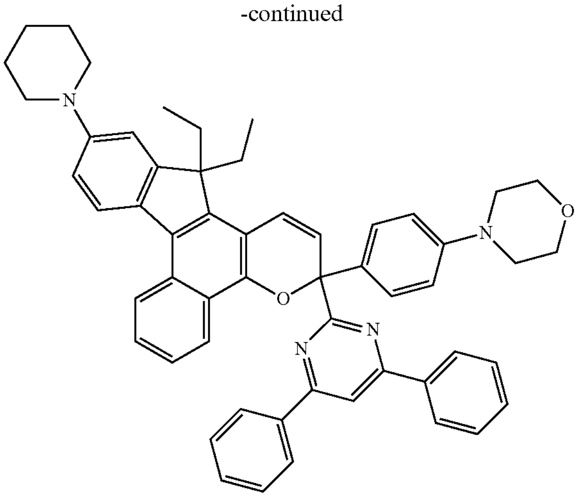

The photochromic compounds represented by General Formula 1 can be synthesized by a known method. For the synthesis method, for example, the following documents can be referred to. Japanese Patent No. 4884578, US 2006/0226402A1, US 2006/0228557A1, US 2008/0103301A1, US 2011/0108781A1, US 2011/0108781A1, U.S. Pat. Nos. 7,527,754, 7,556,751, WO 2001/60811A1, WO 2013/086248A1, WO 1996/014596A1, WO 2001/019813A1, WO 1995/16215A1, U.S. Pat. No. 5,656,206 and WO 2011/016582A1. In addition, regarding the introduction reaction of the azine ring group, the following documents can be referred to. (1) Journal of Industrial and Engineering Chemistry, 102, 226-232 (2021), (2) Heterocycles, 26(11), 2853-2856 (1987). As an example, the synthesis pathway of Reaction Product 2 in Example 1 described below and Reaction Product 1 in Example 16 described below is shown below. In the following Step 1, particularly, the above (1) can be referred to. For Step 2 and subsequent steps, the above documents can be referred to.

[C39]
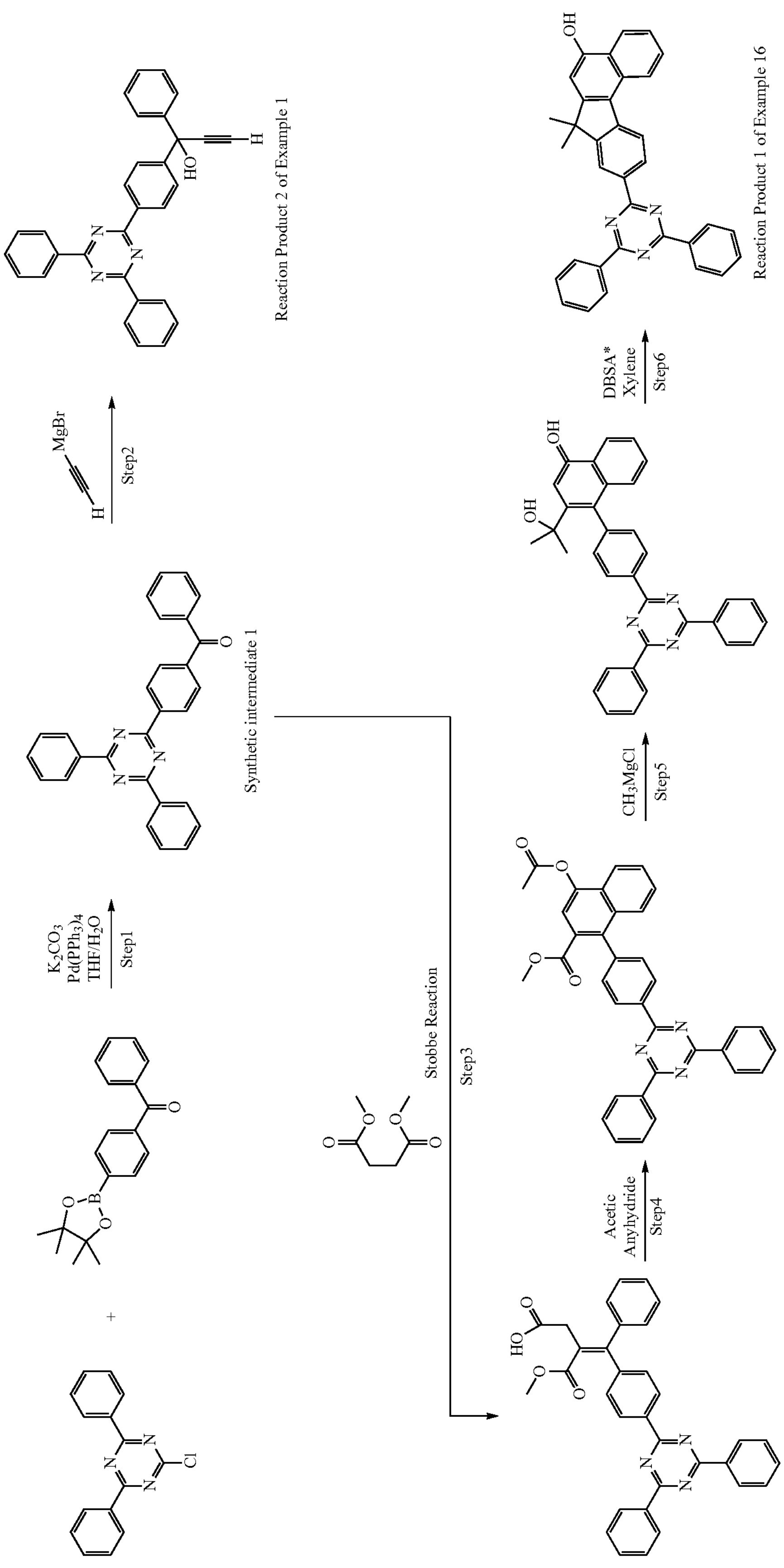

[Photochromic Composition and Photochromic Article]

One aspect of the present disclosure relates to a photochromic composition containing one or more photochromic compounds represented by General Formula 1.

In addition, one aspect of the present disclosure relates to a photochromic article containing one or more photochromic compounds represented by General Formula 1.

The photochromic composition and the photochromic article can contain only one of photochromic compounds represented by General Formula 1 or two or more (for example, two or more and four or less) thereof. The photochromic article and the photochromic composition can contain, for example, about 0.1 to 15.0 mass % of photochromic compounds represented by General Formula 1 with respect to a total amount of 100 mass % thereof. However, the present disclosure is not limited to the above range.

The photochromic article can have at least a substrate. In one aspect, the photochromic compound represented by General Formula 1 can be included in the substrate of the photochromic article. The photochromic article can have a substrate and a photochromic layer, and the substrate and/or the photochromic layer can contain one or more photochromic compounds represented by General Formula 1. In the substrate and the photochromic layer, the photochromic compound represented by General Formula 1 can be contained only in the substrate in one aspect, only in the photochromic layer in another aspect or in the substrate and the photochromic layer in still another aspect. In addition, the substrate and the photochromic layer can contain, as a photochromic compound, only the photochromic compound represented by General Formula 1 or one or more other photochromic compounds. Examples of other photochromic compounds include azobenzene and its derivatives, spiropyran and its derivatives, spirooxazine and its derivatives, benzopyran and its derivatives, naphthopyran and its derivatives, indeno-fused naphthopyran and its derivatives, fluoranthenopyran and its derivatives, phenanthropyran and its derivatives, triphenylenopyran and its derivatives, bisimidazole and its derivatives, donor-acceptor Stenhouse adduct (DASA) and its derivatives, salicylalaniline and its derivatives, dihydropyrene and its derivatives, anthracene dimer and its derivatives, fulgide and its derivatives, diarylethene and its derivatives, phenoxynaphthacenequinone and its derivatives, and stilbene and its derivatives. Among these, naphthopyran and its derivatives, indeno-fused naphthopyran and its derivatives, fluoranthenopyran and its derivatives, triphenylenopyran and its derivatives may be used.

<Substrate>

The photochromic article can contain a substrate selected according to the type of the photochromic article. Examples of substrates include spectacle lens substrates such as a plastic lens substrate and a glass lens substrate. The glass lens substrate can be, for example, a lens substrate made of inorganic glass. Examples of plastic lens substrates include styrene resins such as (meth)acrylic resins, allyl carbonate resins such as a polycarbonate resin, allyl resin, and diethylene glycol bisallyl carbonate resin (CR-39), vinyl resins, polyester resins, polyether resins, urethane resins obtained by reacting an isocyanate compound and a hydroxy compound such as diethylene glycol, thiourethane resins obtained by reacting an isocyanate compound and a polythiol compound, and a cured product obtained by curing a curable composition containing a (thio)epoxy compound having one or more disulfide bonds in the molecule (generally referred to as a transparent resin). As the lens substrate, an undyed substrate (colorless lens) may be used or a dyed substrate (dyed lens) may be used. The refractive index of the lens substrate may be, for example, about 1.50 to 1.75. However, the refractive index of the lens substrate is not limited to the above range, and may be within the above range or may be above or below outside the above range. Here, the refractive index refers to a refractive index for light having a wavelength of 500 nm. In addition, the lens substrate may be a lens having refractive power (so-called prescription lens) or a lens having no refractive power (so-called non-prescription lens).

For example, the photochromic composition can be a polymerizable composition. In the present disclosure and this specification, the "polymerizable composition" is a composition containing one or more polymerizable compounds. A polymerizable composition containing at least one or more photochromic compounds represented by General Formula 1 and one or more polymerizable compounds can be molded by a known molding method to produce a cured product of such a polymerizable composition. Such a cured product can be included as a substrate in the photochromic article and/or can be included as a photochromic layer. The curing treatment can be light emission and/or a heat treatment. The polymerizable compound is a compound having a polymerizable group, and as the polymerization reaction of the polymerizable compound proceeds, the polymerizable composition can be cured to form a cured product. The polymerizable composition can further contain one or more additives (for example, a polymerization initiator).

The spectacle lens may include various lenses such as a single focus lens, a multifocal lens, and a progressive power lens. The type of the lens is determined by the surface shape of both sides of the lens substrate. In addition, the surface of the lens substrate may be a convex surface, a concave surface, or a flat surface. In a general lens substrate and spectacle lens, the object-side surface is a convex surface and the eyeball-side surface is a concave surface. However, the present disclosure is not limited thereto. The photochromic layer may be generally provided on the object-side surface of the lens substrate, or may be provided on the eyeball-side surface.

<Photochromic Layer>

The photochromic layer can be a layer that is directly provided on the surface of the substrate or indirectly provided via one or more other layers. The photochromic layer can be, for example, a cured layer obtained by curing a polymerizable composition. A photochromic layer can be formed as a cured layer obtained by curing a polymerizable composition containing at least one or more photochromic compounds represented by General Formula 1 and one or more polymerizable compounds. For example, when such a polymerizable composition is directly applied to the surface of the substrate or applied to the surface of the layer provided on the substrate, and a curing treatment is performed on the applied polymerizable composition, a photochromic layer can be formed as a cured layer containing one or more photochromic compounds represented by General Formula 1. As the coating method, known coating methods such as a spin coating method, a dip coating method, a spray coating method, an inkjet method, a nozzle coating method, and a slit coating method can be used. The curing treatment can be light emission and/or a heat treatment. The polymerizable composition can further contain one or more additives (for example, a polymerization initiator) in addition to one or more polymerizable compounds.

As the polymerization reaction of the polymerizable compound proceeds, the polymerizable composition can be cured to form a cured layer.

The thickness of the photochromic layer may be, for example, 5 μm or more, 10 μm or more or 20 μm or more, and may be, for example, 80 μm or less, 70 μm or less or 50 μm or less.

<Polymerizable Compound>

In the present disclosure and this specification, the term polymerizable compound refers to a compound having one or more polymerizable groups in one molecule, and the term "polymerizable group" refers to a reactive group that can undergo a polymerization reaction. Examples of polymerizable groups include an acryloyl group, methacryloyl group, vinyl group, vinyl ether group, epoxy group, thiol group, oxetane group, hydroxy group, carboxy group, amino group, and isocyanate group.

Examples of polymerizable compounds that can be used to form the above substrate and the above photochromic layer include the following compounds.

(Episulfide Compound)

The episulfide compound is a compound having two or more episulfide groups in one molecule. The episulfide group is a polymerizable group that can undergo ring-opening polymerization. Specific examples of episulfide compounds include bis(1,2-epithioethyl)sulfide, bis(1,2-epithioethyl)disulfide, bis(2,3-epithiopropyl)sulfide, bis(2,3-epithiopropylthio)methane, bis(2,3-epithiopropyl)disulfide, bis(2,3-epithiopropyldithio)methane, bis(2,3-epithiopropyldithio)ethane, bis(6,7-epithio-3,4-dithiaheptyl)sulfide, bis(6,7-epithio-3,4-dithiaheptyl)disulfide, 1,4-dithiane-2,5-bis(2,3-epithiopropyldithiomethyl), 1,3-bis(2,3-epithiopropyldithiomethyl)benzene, 1,6-bis(2,3-epithiopropyldithiomethyl)-2-(2,3-epithiopropyldithioethylthio)-4-thiahexane, 1,2,3-tris(2,3-epithiopropyldithio)propane, 1,1,1,1-tetrakis(2,3-epithiopropyldithiomethyl)methane, 1,3-bis(2,3-epithiopropyldithio)-2-thiapropane, 1,4-bis(2,3-epithiopropyldithio)-2,3-dithiabutane, 1,1,1-tris(2,3-epithiopropyldithio)methane, 1,1,1-tris(2,3-epithiopropyldithiomethylthio)methane, 1,1,2,2-tetrakis(2,3-epithiopropyldithio)ethane, 1,1,2,2-tetrakis(2,3-epithiopropyldithiomethylthio)ethane, 1,1,3,3-tetrakis(2,3-epithiopropyldithio)propane, 1,1,3,3-tetrakis(2,3-epithiopropyldithiomethylthio)propane, 2-[1,1-bis(2,3-epithiopropyldithio)methyl]-1,3-dithietane, and 2-[1,1-bis(2,3-epithiopropyldithiomethylthio)methyl]-1,3-dithietane.

(Thietanyl Compound)

The thietanyl compound is a thietane compound having two or more thietanyl groups in one molecule. The thietanyl group is a polymerizable group that can undergo ring-opening polymerization. Some thietanyl compounds have an episulfide group together with a plurality of thietanyl groups. Such compounds are listed as examples in the above episulfide compound. Other thietanyl compounds include metal-containing thietane compounds having metal atoms in the molecule and non-metallic thietane compounds which contain no metal.

Specific examples of non-metallic thietane compounds include bis(3-thietanyl)disulfide, bis(3-thietanyl)sulfide, bis(3-thietanyl)trisulfide, bis(3-thietanyl)tetrasulfide, 1,4-bis(3-thietanyl)-1,3,4-trithibutane, 1,5-bis(3-thietanyl)-1,2,4,5-tetrathiapentane, 1,6-bis(3-thietanyl)-1,3,4,6-tetrathiahexane, 1,6-bis(3-thietanyl)-1,3,5,6-tetrathiahexane, 1,7-bis(3-thietanyl)-1,2,4,5,7-pentathiaheptane, 1,7-bis(3-thietanylthio)-1,2,4,6,7-pentathiaheptane, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiundecane, 1,11-bis(3-thietanylthio)-4,7-bis(3-thietanylthiomethyl)-3,6,9-trithiundecane, 1,11-bis(3-thietanylthio)-5,7-bis(3-thietanylthiomethyl)-3,6,9-trithiundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, bis-thietanylsulfide, bis(thietanylthio)methane, 3-[<(thietanylthio)methylthio>methylthio]thietane, bis-thietanyl disulfide, bis-thietanyl trisulfide, bis-thietanyl tetrasulfide, bis-thietanyl pentasulfide, 1,4-bis(3-thietanyldithio)-2,3-dithibutane, 1,1,1-tris(3-thietanyldithio)methane, 1,1,1-tris(3-thietanyldithiomethylthio)methane, 1,1,2,2-tetrakis(3-thietanyldithio)ethane, and 1,1,2,2-tetrakis(3-thietanyldithiomethylthio)ethane.

Examples of metal-containing thietane compounds include those containing Group 14 atoms such as Sn atoms, Si atoms, Ge atoms, and Pb atoms, Group 4 elements such as Zr atoms and Ti atoms, Group 13 atoms such as Al atoms, and Group 12 atoms such as Zn atoms, as metal atoms in the molecule. Specific examples thereof include alkylthio(thietanylthio)tin, bis(alkylthio)bis(thietanylthio)tin, alkylthio(alkylthio)bis(thietanylthio)tin, bis(thietanylthio)cyclic dithiotin compounds, and alkyl(thietanylthio)tin compounds.

Specific examples of alkylthio(thietanylthio)tin include methylthiotris(thietanylthio)tin, ethylthiotris(thietanylthio)tin, propylthiotris(thietanylthio)tin, and isopropylthiotris(thietanylthio)tin.

Specific examples of bis(alkylthio)bis(thietanylthio)tin include bis(methylthio)bis(thietanylthio)tin, bis(ethylthio)bis(thietanylthio)tin, bis(propylthio)bis(thietanylthio)tin, and bis(isopropylthio)bis(thietanylthio)tin.

Specific examples of alkylthio(alkylthio)bis(thietanylthio)tin include ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin, and isopropylthio(propylthio)bis(thietanylthio)tin.

Specific examples of bis(thietanylthio)cyclic dithiotin compounds include bis(thietanylthio)dithiastannetane, bis(thietanylthio)dithiastannolane, bis(thietanylthio)dithiastannolane, and bis(thietanylthio)trithiastannocane.

Specific examples of alkyl(thietanylthio)tin compounds include methyltris(thietanylthio)tin, dimethylbis(thietanylthio)tin, butyltris(thietanylthio)tin, tetrakis(thietanylthio)tin, tetrakis(thietanylthio)germanium, and tris(thietanylthio)bismuth.

(Polyamine Compound)

The polyamine compound is a compound having two or more $NH_2$ groups in one molecule, and can form a urea bond according to a reaction with a polyisocyanate and can form a thiourea bond according to a reaction with a polyisothiocyanate. Specific examples of polyamine compounds include ethylenediamine, hexamethylenediamine, isophoronediamine, nonamethylenediamine, undecamethylenediamine, dodecamethylenediamine, metaxylenediamine, 1,3-propanediamine, putrescine, 2-(2-aminoethylamino)ethanol, diethylenetriamine, p-phenylenediamine, m-phenylenediamine, melamine, and 1,3,5-benzenetriamine.

(Epoxy Compound)

The epoxy compound is a compound having an epoxy group in the molecule. The epoxy group is a polymerizable group that can undergo ring-opening polymerization. The epoxy compounds are generally classified into aliphatic epoxy compounds, alicyclic epoxy compounds and aromatic epoxy compounds.

Specific examples of aliphatic epoxy compounds include ethylene oxide, 2-ethyloxirane, butyl glycidyl ether, phenyl glycidyl ether, 2,2'-methylenebisoxirane, 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, trimethylolpropane triglycidyl ether, glycerol triglycidyl ether, diglycerol tetraglycidyl ether, pentaerythritol tetraglycidyl ether, and tris(2-hydroxyethyl)isocyanurate triglycidyl ether.

Specific examples of alicyclic epoxy compounds include isophoronediol diglycidyl ether and bis-2,2-hydroxycyclohexylpropane diglycidyl ether.

Specific examples of aromatic epoxy compounds include resole syndiglycidyl ether, bisphenol A diglycidyl ether, bisphenol F diglycidyl ether, bisphenol S diglycidyl ether, diglycidyl orthophthalate, phenol novolac polyglycidyl ether, and cresol novolac polyglycidyl ether.

In addition, in addition to the above examples, an epoxy compound having a sulfur atom in the molecule together with an epoxy group can be used. Such epoxy compounds containing sulfur atoms include linear aliphatic compounds and cycloaliphatic compounds.

Specific examples of linear aliphatic epoxy compounds containing sulfur atoms include bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithia octane, 1,2,3-tris(2,3-epoxypropylthio)propane, 2,2-bis(2,3-epoxypropylthio)-1,3-bis(2,3-epoxypropylthiomethyl)propane, and 2,2-bis(2,3-epoxypropylthiomethyl)-1-(2,3-epoxypropylthio)butane.

Specific examples of cycloaliphatic epoxy compounds containing sulfur atoms include 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[<2-(2,3-epoxypropylthio)ethyl>thiomethyl]-1,4-dithiane, and 2,5-bis(2,3-epoxypropylthiomethyl)-2,5-dimethyl-1,4-dithiane.

(Compound Having Radically Polymerizable Group)

The compound having a radically polymerizable group has a polymerizable group that can undergo radical polymerization. Examples of radically polymerizable groups include an acryloyl group, methacryloyl group, allyl group, and vinyl group.

In the following, a compound having a polymerizable group selected from the group consisting of acryloyl groups and methacryloyl groups will be referred to as a "(meth)acrylate compound". Specific examples of (meth)acrylate compounds include ethylene glycol di(meth)acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, polypropylene glycol di(meth)acrylate, neopentyl glycol di(meth)acrylate, ethylene glycol bisglycidyl(meth)acrylate), bisphenol A di(meth)acrylate, 2,2-bis(4-(meth)acryloxyethoxyphenyl)propane, 2,2-bis(4-(meth)acryloxydiethoxyphenyl)propane, 2,2-bis(4-(meth)acryloyloxyethoxyphenyl)propane, 2,2-bis(3,5-dibromo-4-(meth)acryloyloxyethoxyphenyl)propane, 2,2-bis(4-(meth)acryloyloxydipropoxyphenyl)propane, bisphenol F di(meth)acrylate, 1,1-bis(4-(meth)acryloxyethoxyphenyl)methane, 1,1-bis(4-(meth)acryloxydiethoxyphenyl)methane, dimethyloltricyclodecane di(meth)acrylate, trimethylolpropane tri(meth)acrylate, ditrimethylolpropane tetra(meth)acrylate, glycerol di(meth)acrylate, pentaerythritol tri(meth)acrylate, pentaerythritol tetra(meth)acrylate, methylthio(meth)acrylate, phenylthio(meth)acrylate, benzylthio(meth)acrylate, xylylene dithiol di(meth)acrylate, mercaptoethylsulfide di(meth)acrylate, and difunctional urethane (meth)acrylate.

Specific examples of compounds having an allyl group (allyl compound) include allyl glycidyl ether, diallyl phthalate, diallyl terephthalate, diallyl isophthalate, diallyl carbonate, diethylene glycol bisallyl carbonate, methoxy polyethylene glycol allyl ether, polyethylene glycol allyl ether, methoxy polyethylene glycol-polypropylene glycol allyl ether, butoxy polyethylene glycol-polypropylene glycol allyl ether, methacryloyloxy polyethylene glycol-polypropylene glycol allyl ether, phenoxy polyethylene glycol allyl ether, and methacryloyloxy polyethylene glycol allyl ether.

Examples of compounds having a vinyl group (vinyl compound) include α-methylstyrene, α-methylstyrene dimer, styrene, chlorostyrene, methylstyrene, bromostyrene, dibromostyrene, divinylbenzene, and 3,9-divinylspirobi(m-dioxane).

The photochromic article can include one or more layers known as functional layers of the photochromic article such as a protective layer for improving the durability of the photochromic article, an antireflection layer, a water-repellent or hydrophilic antifouling layer, a defogging layer, and a primer layer for improving adhesion between layers at any position.

The photochromic article can be an optical article. One form of the optical article is a spectacle lens. Such a spectacle lens can also be called a photochromic lens or a photochromic spectacle lens. In addition, as one form of the optical article, a goggle lens, a visor (cap) part of a sun visor, a shield member of a helmet and the like may be exemplified. The photochromic composition which is a polymerizable composition is applied to the substrate for these optical articles, a curing treatment is performed on the applied composition, a photochromic layer is formed, and thereby an optical article having an anti-glare function can be obtained.

[Spectacles]

One aspect of the present disclosure relates to spectacles having a spectacle lens that is one form of the photochromic article. Details of the spectacle lens included in the spectacles are as described above. By providing such a spectacle lens, for example, the spectacles can exhibit an anti-glare effect like sunglasses when the photochromic compound is colored upon receiving sunlight outdoors, and the photochromic compound can fade upon returning indoors, and thus the transmittance can be recovered. For the spectacles, a known technique can be applied to the configuration of the frame or the like.

EXAMPLES

Hereinafter, the present disclosure will be described in more detail with reference to examples. However, the present disclosure is not limited to embodiments shown in examples.

In the following, the molecular structure was identified using a nuclear magnetic resonance device (NMR). Proton NMR of ECS-400 (commercially available from JEOL Ltd.) was used as NMR. As a measurement solvent, deuterated chloroform was mainly used, and heavy dimethylsulfoxide, heavy acetone, heavy acetonitrile, heavy benzene, heavy methanol, heavy pyridine or the like was appropriately used only when it was poorly soluble in deuterated chloroform.

The purity was analyzed using high-performance liquid chromatography (HPLC). LC-2040C (commercially available from Shimadzu Corporation) was used as HPLC. YMC-Triart C18 was used for the column, and the measurement temperature was set to 40° C. For the mobile phase, a mixed solvent containing water containing 0.1% of trifluoroacetic acid and acetonitrile was used and the flow rate was 0.4 mL/min.

For mass spectrometry, a device including SQD2 was used as a mass spectrometry unit in ACQUITY UPLC H-Class system (UPLC) (commercially available from Nihon Waters K.K.). ACQUITY UPLC BEH C18 was used as the column, and the measurement temperature was set to 40° C. For the mobile phase, a mixed solvent containing water to which formic acid was added and acetonitrile was used, a concentration gradient was applied and a flow rate was set to 0.61 mL/min for flowing. An electrospray ionization (ESI) method was used for ionization.

CHN (carbonhydrogennitrogen) elemental analysis was performed by a combustion method.

Example 1

From the reaction product shown in Table 1, the following Exemplary Compound 1 was obtained by the following method.

Under an argon atmosphere, p-toluenesulfonic acid monohydrate (0.15 g, 0.80 mmol) was added to a toluene solution (36 mL) containing Reaction Product 1 (1.0 g, 4 mmol) and Reaction Product 2 (3.5 g, 8 mmol) shown in Table 1, and the mixture was stirred at room temperature overnight. A sodium hydroxide aqueous solution (1.0 M, 37 mL) was added thereto, and the mixture was stirred for about 20 minutes. Impurities were removed by filtration, extraction with toluene (30 mL×2) was performed, and the combined organic layer was then washed with water (20 mL×2) and concentrated. The obtained residue was purified through column chromatography ($SiO_2$: 200 g, heptane/chloroform (volume basis)=70/30 to 60/40) (1.2 g, brown solid). The obtained solid was suspended in heptane/ethyl acetate (2/1 (volume basis), 90 mL), subjected to an ultrasonic treatment for about 30 minutes, filtered and dried, and as the final product, a light purple solid (0.8 g) was obtained as Exemplary Compound 1. In the following, Exemplary Compound 1 represents the product of Example 1 in Table 1. The same applies to other examples. Comparative Compound 1 represents the purified product of Comparative Example 1 in Table 1. The same applies to other comparative examples.

The obtained products were analyzed by the following method.

The structure was identified by a nuclear magnetic resonance device (NMR).

The purity was analyzed by HPLC and was a value shown in Table 1 in terms of area ratio.

As a result of mass spectrometry, the measured value (M+, relative intensity of 100) was shown in Table 1 for the calculated value of the exact mass shown in Table 1.

As a result of CHN elemental analysis by a combustion method, the measured value was the value shown in Table 1 for the calculated value shown in Table 1.

It was confirmed based on the above analysis results that Exemplary Compound 1 as a desired compound was produced comprehensively.

Examples 2 to 16 and Comparative Examples 1 to 3

Exemplary Compounds 2 to 16 and Comparative Compounds 1 to 3 were obtained in the same operation as described above, except that reaction products shown in Table 1 were used as Reaction Product 1 and Reaction Product 2 used to synthesize compounds.

The obtained products were analyzed by the method described above. The analysis results are shown in Table 1 (Table 1-1 to Table 1-5).

TABLE 1-1

| | Reaction Product 1 | Reaction Product 2 | Product | HPLC purity (%) | Calculated exact mass | Mass spectrometry measured value | CHN composition calculated value (%) | CHN elemental analysis measured value (%) | Rate constant ($10^{-3}$ sec.$^{-1}$) |
|---|---|---|---|---|---|---|---|---|---|
| Example 1 | 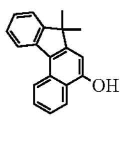 [SMILES: CC1(C)c2ccccc2-c2c1cc(O)c1ccccc21] | 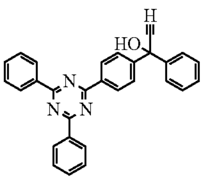 | 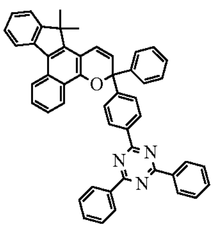 [SMILES: CC1(C)c2ccccc2-c2c1c1c(c3ccccc23)OC(c2ccccc2)(c2ccc(-c3nc(-c4ccccc4)nc(-c4ccccc4)n3)cc2)C=C1] | 98% | 681.278 | 681.5 | C: 86.3% H: 5.2% N: 6.2% | CL: 86.5% H: 6.0% N: 6.0% | 5.8 |

TABLE 1-1-continued

| | Reaction Product 1 | Reaction Product 2 | Product | HPLC purity (%) | Calc-ulated exact mass | Mass spec-tro-metry meas-ured value | CHN comp-osition calc-ulated value (%) | CHN ele-mental ana-lysis meas-ured value (%) | Rate cons-tant ($10^{-3}$ sec.$^{-1}$) |
|---|---|---|---|---|---|---|---|---|---|
| Ex-am-ple 2 | 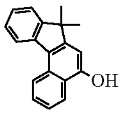 [SMILES: CC1(C)c2ccccc2-c2c1cc(O)c1ccccc21] | 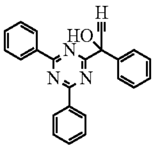 | 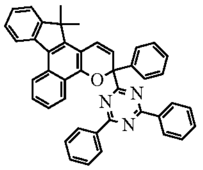 [SMILES: CC1(C)c2ccccc2-c2c1c1c(c3ccccc23)OC(c2ccccc2)(c2nc(-c3ccccc3)nc(-c3ccccc3)n2)C=C1] | 95% | 605.247 | 606.8 | C: 85.3% H: 5.2% N: 6.9% | CL: 86.7% H: 5.5% N: 7.2% | 6.2 |
| Ex-am-ple 3 | 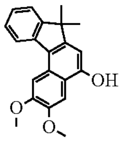 [SMILES: COc1cc2c(O)cc3c(c2cc1OC)-c1ccccc1C3(C)C] | 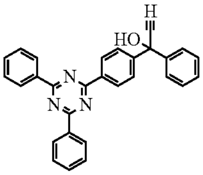 | 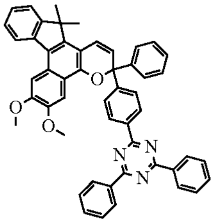 [SMILES: COc1cc2c3c(c4c(c2cc1OC)-c1ccccc1C4(C)C)C=CC(c1ccccc1)(c1ccc(-c2nc(-c4ccccc4)nc(-c4ccccc4)n2)cc1)O3] | 97% | 741.299 | 741.2 | C: 82.6% H: 5.3% N: 5.7% | CL: 83.09% H: 6.1% N: 6.0% | 6.0 |
| Ex-am-ple 4 | 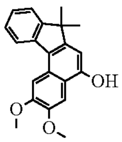 [SMILES: COc1cc2c(O)cc3c(c2cc1OC)-c1ccccc1C3(C)C] | 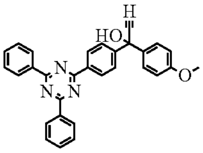 | 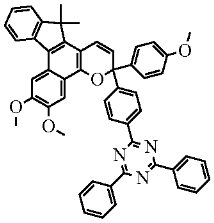 [SMILES: COc1ccc(C2(c3ccc(-c4nc(-c5ccccc5)nc(-c5ccccc5)n4)cc3)C=Cc3c4c(c5cc(OC)c(OC)cc5c3O2)-c2ccccc2C4(C)C)cc1] | 97% | 771.310 | 770.4 | C: 20.9% H: 5.4% N: 5.4% | CL: 79.9% H: 5.5% N: 5.0% | 9.0 |

TABLE 1-2

| | Reaction Product 1 | Reaction Production 2 | Product | HPLC purity (%) | Calc-ulated exact mass | Mass spec-tro-metry meas-ured value | CHN com-po-sition calcu-lated value (%) | CHN ele-men-tal ana-lysis mea-sured valued (%) | Rate cons-tant ($10^{-3}$ sec.$^{-1}$) |
|---|---|---|---|---|---|---|---|---|---|
| Ex-am-ple 5 | 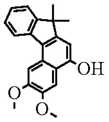 | 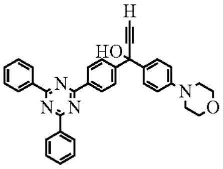 [SMILES: C#CC(O)(c1ccc(-c2nc(-c3ccccc3)nc(-c3ccccc3)n2)cc1)c1ccc(N2CCOCC2)cc1] | 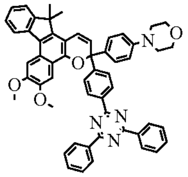 [SMILES: COc1cc2c3c(c4c(c2cc1OC)-c1ccccc1C4(C)C)C=CC(c1ccc(-c2nc(-c4ccccc4)nc(-c4ccccc4)n2)cc1)(c1ccc(N2CCOCC2)cc1)O3] | 97% | 825.352 | 827.0 | C: 79.9% H: 5.6% N: 6.8% | C: 80.1% H: 5.6% N: 7.0% | 14.5 |
| Ex-am-ple 6 | 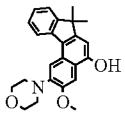 [SMILES: COc1cc2c(O)cc3c(c2cc1N1CCOCC1)-c1ccccc1C3(C)C] | 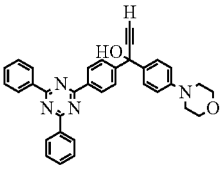 [SMILES: C#CC(O)(c1ccc(-c2nc(-c3ccccc3)nc(-c3ccccc3)n2)cc1)c1ccc(N2CCOCC2)cc1] | 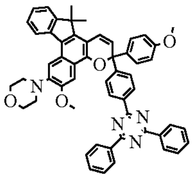 [SMILES: COc1ccc(C2(c3ccc(-c4nc(-c5ccccc5)nc(-c5ccccc5)n4)cc3)C=Cc3c4c(c5cc(N6CCOCC6)c(OC)cc5c3O2)-c2ccccc2C4(C)C)cc1] | 96% | 826.352 | 826.4 | C: 79.9% H: 5.6% N: 6.8% | C: 79.5% H: 5.5% N: 6.3% | 8.5 |

TABLE 1-2-continued

| | Reaction Product 1 | Reaction Production 2 | Product | HPLC purity (%) | Calculated exact mass | Mass spectrometry measured value | CHN composition calculated value (%) | CHN elemental analysis measured valued (%) | Rate constant ($10^{-3}$ sec.$^{-1}$) |
|---|---|---|---|---|---|---|---|---|---|
| Example 7 | 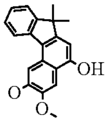 | 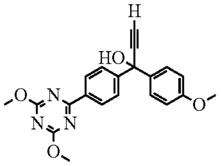 | 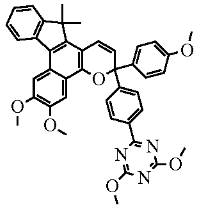 [SMILES: COc1ccc(C2(c3ccc(-c4nc(OC)nc(OC)n4)cc3)C=Cc3c4c(c5cc(OC)c(OC)cc5c3O2)-c2ccccc2C4(C)C)cc1] | 95% | 679.268 | 680.0 | C: 74.2% H: 6.5% N: 6.2% | C: 75.0% H: 5.8% N: 6.1% | 8.7 |
| Example 8 | 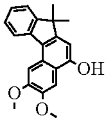 | 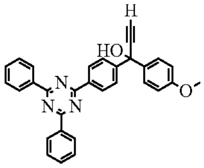 [SMILES: C#CC(O)(c1ccc(OC)cc1)c1ccc(-c2nc(-c3ccccc3)nc(-c3ccccc3)n2)cc1] | 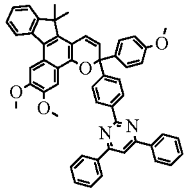 [SMILES: COc1ccc(C2(c3ccc(-c4nc(-c5ccccc5)cc(-c5ccccc5)n4)cc3)C=Cc3c4c(c5cc(OC)c(OC)cc5c3O2)-c2ccccc2C4(C)C)cc1] | 98% | 770.314 | 770.1 | C: 82.8% H: 6.5% N: 3.6% | C: 84.0% H: 6.0% N: 3.7% | 7.2 |

TABLE 1-3

| | Reaction Product 1 | Reaction Production 2 | Product | HPLC purity (%) | Calculated exact mass | Mass spectrometry measured value | CHN composition calculated value (%) | CHN elemental analysis measured valued (%) | Rate constant ($10^{-3}$ sec.$^{-1}$) |
|---|---|---|---|---|---|---|---|---|---|
| Example 9 | 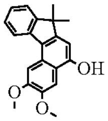 | 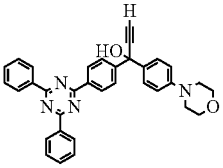 [SMILES: C#CC(O)(c1ccc(-c2nc(-c3ccccc3)nc(-c3ccccc3)n2)cc1)c1ccc(N2CCOCC2)cc1] | 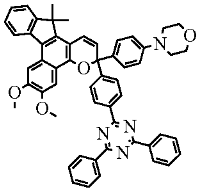 [SMILES: COc1cc2c3c(c4c(c2cc1OC)-c1ccccc1C4(C)C)C=CC(c1ccc(-c2nc(-c4ccccc4)nc(-c4ccccc4)n2)cc1)(c1ccc(N2CCOCC2)cc1)O3] | 96% | 825.357 | 825.5 | C: 81.4% H: 5.7% N: 5.1% | C: 81.3% H: 5.8% N: 4.9% | 10.4 |
| Example 10 | 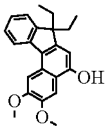 [SMILES: CCC1(CC)c2ccccc2-c2c1cc(O)c1cc(OC)c(OC)cc21] | 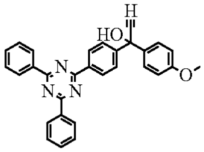 | 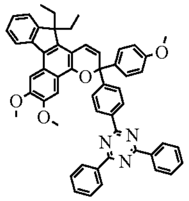 [SMILES: CCC1(CC)c2ccccc2-c2c1c1c(c3cc(OC)c(OC)cc23)OC(c2ccc(OC)cc2)(c2ccc(-c3nc(-c4ccccc4)nc(-c4ccccc4)n3)cc2)C=C1] | 97% | 799.341 | 799.8 | C: 81.1% H: 5.7% N: 5.3% | C: 82.0% H: 6.2% N: 5.1% | 11.2 |
| Example 11 | 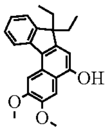 [SMILES: CCC1(CC)c2ccccc2-c2c1cc(O)c1cc(OC)c(OC)cc21] | 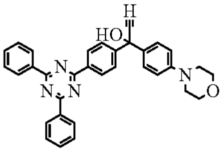 | 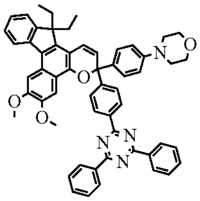 [SMILES: CCC1(CC)c2ccccc2-c2c1c1c(c3cc(OC)c(OC)cc23)OC(c2ccc(-c3nc(-c4ccccc4)nc(-c4ccccc4)n3)cc2)(c2ccc(N3CCOCC3)cc2)C=C1] | 97% | 854.383 | 854.7 | C: 80.1% H: 5.9% N: 6.6% | C: 80.3% H: 6.0% N: 6.2% | 16.2 |

TABLE 1-3-continued
| | Reaction Product 1 | Reaction Production 2 | Product | HPLC purity (%) | Calculated exact mass | Mass spectrometry measured value | CHN composition calculated value (%) | CHN elemental analysis measured valued (%) | Rate constant ($10^{-3}$ sec.$^{-1}$) |
|---|---|---|---|---|---|---|---|---|---|
| Example 12 | 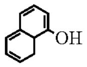 | 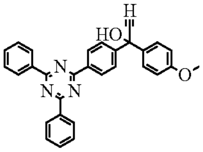 | 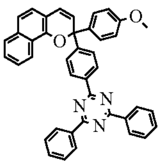 [SMILES: COc1ccc(C2(c3ccc(-c4nc(-c5ccccc5)nc(-c5ccccc5)n4)cc3)C=Cc3ccc4ccccc4c3O2)cc1] | 95% | 595.226 | 595.7 | C: 22.7% H: 4.9% N: 7.1% | C: 84.0% H: 5.0% N: 7.0% | 7.8 |
TABLE 1-4
| | Reaction Product 1 | Reaction Production 2 | Product |
|---|---|---|---|
| Example 13 | 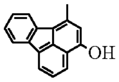 [SMILES: Cc1cc(O)c2cccc3c2c1-c1ccccc1-3] | 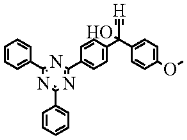 | 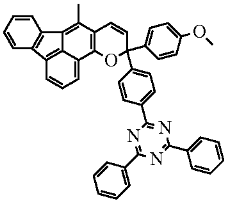 [SMILES: COc1ccc(C2(c3ccc(-c4nc(-c5ccccc5)nc(-c5ccccc5)n4)cc3)C=Cc3c(C)c4c5c(cccc5c3O2)-c2ccccc2-4)cc1] |
| Example 14 | 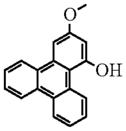 [SMILES: COc1cc(O)c2c3ccccc3c3ccccc3c2c1] | 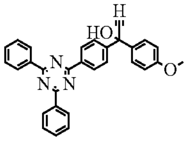 | 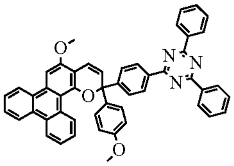 [SMILES: COc1ccc(C2(c3ccc(-c4nc(-c5ccccc5)nc(-c5ccccc5)n4)cc3)C=Cc3c(OC)cc4c5ccccc5c5ccccc5c4c3O2)cc1] |
| Example 15 | 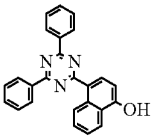 [SMILES: Oc1ccc(-c2nc(-c3ccccc3)nc(-c3ccccc3)n2)c2ccccc12] | 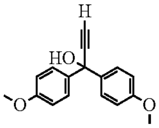 | 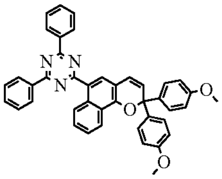 [SMILES: COc1ccc(C2(c3ccc(OC)cc3)C=Cc3cc(-c4nc(-c5ccccc5)nc(-c5ccccc5)n4)c4ccccc4c3O2)cc1] |
| Example 16 | 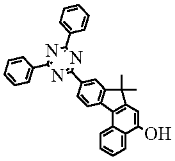 [SMILES: CC1(C)c2cc(-c3nc(-c4ccccc4)nc(-c4ccccc4)n3)ccc2-c2c1cc(O)c1ccccc21] | 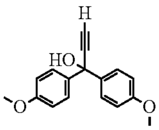 | 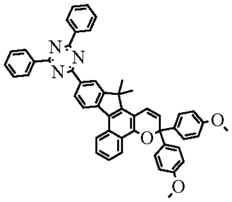 [SMILES: COc1ccc(C2(c3ccc(OC)cc3)C=Cc3c4c(c5ccccc5c3O2)-c2ccc(-c3nc(-c5ccccc5)nc(-c5ccccc5)n3)cc2C4(C)C)cc1] |

TABLE 1-4-continued

| | HPLC purity (%) | Calculated exact mass | Mass spectrometry measured value | CHN composition calculated value (%) | CHN elemental analysis measured valued (%) | Rate constant ($10^{-3}$ sec.$^{-1}$) |
|---|---|---|---|---|---|---|
| Example 13 | 98% | 583.257 | 683.9 | C: 84.3% H: 4.9% N: 6.1% | C: 85.0% H: 5.1% N: 5.9% | 11.2 |
| Example 14 | 95% | 725.268 | 725.4 | C: 82.7% H: 4.9% N: 5.8% | C: 83.2% H: 5.2% N: 5.4% | 13.3 |
| Example 15 | 98% | 825.237 | 625.8 | C: 80.6% H: 5.0% N: 6.7% | C: 81.2% H: 5.1% N: 6.4% | 15.5 |
| Example 16 | 98% | 741.299 | 741.2 | C: 82.6% H: 5.3% N: 5.7% | C: 83.1% H: 5.5% N: 5.8% | 9.8 |

TABLE 1-5

| | Reaction Product 1 | Reaction Production 2 | Product | HPLC purity (%) | Calculated exact mass | Mass spectrometry measured value | CHN composition calculated value (%) | CHN elemental analysis measured valued (%) | Rate constant ($10^{-3}$ sec.$^{-1}$) |
|---|---|---|---|---|---|---|---|---|---|
| Comparative Example 1 | 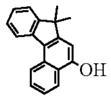 [SMILES: CC1(C)c2ccccc2-c2c1cc(O)c1ccccc21] | 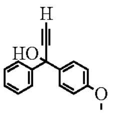 | 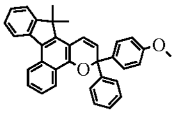 [SMILES: COc1ccc(C2(c3ccccc3)C=Cc3c4c(c5ccccc5c3O2)-c2ccccc2C4(C)C)cc1] | 98% | 480.209 | 480.3 | C: 87.5% H: 5.9% | C: 85.8% H: 6.3% | 2.8 |
| Comparative Example 2 | 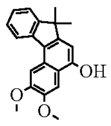 [SMILES: COc1cc2c(O)cc3c(c2cc1OC)-c1ccccc1C3(C)C] | 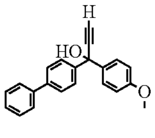 [SMILES: C#CC(O)(c1ccc(OC)cc1)c1ccc(-c2ccccc2)cc1] | 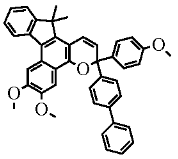 [SMILES: COc1ccc(C2(c3ccc(-c4ccccc4)cc3)C=Cc3c4c(c5cc(OC)c(OC)cc5c3O2)-c2ccccc2C4(C)C)cc1] | 98% | 616.261 | 616.5 | C: 83.7% H: 5.9% | C: 83.8% H: 8.0% | 4.0 |
| Comparative Example 3 | 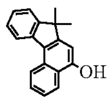 [SMILES: CC1(C)c2ccccc2-c2c1cc(O)c1ccccc21] | 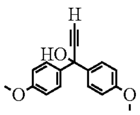 | 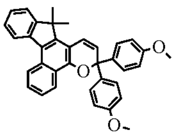 [SMILES: COc1ccc(C2(c3ccc(OC)cc3)C=Cc3c4c(c5ccccc5c3O2)-c2ccccc2C4(C)C)cc1] | 98% | 510.219 | 510.4 | C: 84.7% H: 6.9% | C: 85.1% H: 6.0% | 4.5 |

[Evaluation Method]

<Measurement of Solution Spectrum and Evaluation of Fade Rate>

For Examples 1 to 16 and Comparative Examples 1 to 3, each compound was dissolved in chloroform containing no stabilizer to prepare a chloroform solution containing the compound.

A 1 cm square quartz spectroscopic cell containing the prepared solution was covered, and ultraviolet rays were emitted using UV-LED (commercially available from Hamamatsu Photonics K.K.) (a combination of LIGHTNINGCURE LC-L1V5 and L14310-120, an output of 70%) as an ultraviolet light source for 15 seconds. The solution was stirred with a small stirrer during UV emission. Within 10 seconds after UV emission was completed, the absorbance was measured using a UV-visible spectrophotometer (UV-1900i, commercially available from Shimadzu Corporation, a measurement wavelength of 700 to 400 nm, wavelength increments of 2 nm, survey mode). The absorbance was measured at room temperature (20 to 30° C.). Here, the concentration of the solution was adjusted so that the absorbance at the first absorption wavelength (the peak of the absorption intensity observed at the longest wavelength) was 0.95 to 1.05. In addition, the absorbance was measured every 10 seconds, and the attenuation of the absorbance was measured. Normalization was performed so that the peak of the first absorption wavelength in the first absorbance measurement became 1, the attenuation of the absorbance was then measured, data of fading for an initial 100 seconds (11 absorbance measurements) from the change in absorbance over time was analyzed with a first-order reaction model, and thus the reaction rate constant was obtained. If $[A_0]$ is the initial concentration of the colored component, that is, the normalized absorbance value of 1, $[A]$ is the concentration of the colored component after a certain time, that is, the normalized absorbance value, t is time (seconds), and k is a rate constant, the first-order reaction can be expressed as in the following formula.

$$\ln\frac{[A]}{[A_0]} = -kt \quad \text{[Math. 1]}$$

Regarding Exemplary Compounds 1 to 16, it was confirmed that these compounds were compounds exhibiting photochromic properties because new absorption peaks appeared in the visible light range after UV emission. Accordingly, the compound exhibiting photochromic properties could be used for producing various photochromic articles such as spectacle lenses.

Table 1 shows the reaction rate constants obtained for Examples 1 to 16 and Comparative Examples 1 to 3. Based on the results shown in Table 1, it was confirmed that respective compounds of Examples 1 to 16 had a higher fade rate than Comparative Compounds 1 to 3 of Comparative Examples 1 to 3.

[Production and Evaluation of Spectacle Lens]

<Preparation of Photochromic Composition (Polymerizable Composition)>

In a plastic container, with respect to a total amount of 100 parts by mass of (meth)acrylates, 68 parts by mass of polyethylene glycol diacrylate, 12 parts by mass of trimethylolpropane trimethacrylate, and 20 parts by mass of neopentyl glycol dimethacrylate were mixed to prepare a (meth) acrylate mixture. 3 parts by mass of Exemplary Compound 1 was mixed with respect to 100 parts by mass of the (meth)acrylate mixture. In addition, a photopolymerization initiator (phenyl bis(2,4,6-trimethylbenzoyl)phosphine oxide), an antioxidant [bis(3-tert-butyl-4-hydroxy-5-methylphenyl)propionic acid)] [ethylene bis(oxyethylene)] and a light stabilizer (bis(1,2,2,6,6-pentamethyl-4-piperidyl) sebacate) were mixed and sufficiently stirred and a silane coupling agent (γ-methacryloxypropyltrimethoxysilane) was then added dropwise with stirring. Then, defoaming was performed using an automatic revolution type stirring and defoaming device.

A photochromic composition was prepared by the above method.

<Formation of Primer Layer>

A plastic lens substrate (commercially available from HOYA, product name EYAS: a center thickness of 2.5 mm, a diameter of 75 mm, and a spherical lens power of −4.00) was immersed in a sodium hydroxide aqueous solution having a concentration of 10 mass % (a liquid temperature of 60° C.) for 5 minutes, washed with an alkali and additionally washed with pure water and dried. Then, a water-based polyurethane resin liquid (polycarbonate polyol-based polyurethane emulsion, a viscosity of 100 cPs, and a solid content concentration of 38 mass %) was applied to the convex surface of the plastic lens substrate in an environment of room temperature and a relative humidity of 40 to 60% using a spin coater MS-B150 (commercially available from Mikasa Corporation) at a rotational speed of 1,500 rpm for 1 minute according to a spin coating method and then dried naturally for 15 minutes, and thereby a primer layer having a thickness of 5.5 μm was formed.

<Formation of Photochromic Layer>

The photochromic composition prepared above was added dropwise to the primer layer, and applied by a spin coating method using a program in which the rotational speed was changed in a slope mode from a rotational speed of 500 rpm to 1,500 rpm over 1 minute, and rotation was additionally performed at 1,500 rpm for 5 seconds using MS-B150 (commercially available from Mikasa Corporation). Then, ultraviolet rays (with a dominant wavelength of 405 nm) were emitted to the photochromic composition applied on the primer layer formed on the plastic lens substrate in a nitrogen atmosphere (with an oxygen concentration of 500 ppm or less) for 40 seconds, and the composition was cured to form a photochromic layer. The thickness of the formed photochromic layer was 45 μm.

Accordingly, a photochromic article (spectacle lens) was produced.

<Evaluation of Coloring Concentration>

The luminous transmittance was obtained by the following method according to JIS T 7333: 2005.

Light was emitted to the convex surface of the spectacle lens using a xenon lamp as a light source through an air mass filter for 15 minutes, and the photochromic layer was colored. Light emission was performed so that the irradiance and irradiance tolerance were values shown in Table 2 as specified in JIS T 7333: 2005. The transmittance during the coloring was measured with a spectrophotometer (commercially available from Otsuka Electronics Co., Ltd.).

TABLE 2

| Wavelength range (nm) | Irradiance ($W/m^2$) | Irradiance tolerance ($W/m^2$) |
|---|---|---|
| 300~340 | <2.5 | — |
| 340~380 | 5.6 | ±1.5 |
| 380~420 | 12 | ±3.0 |

TABLE 2-continued

| Wavelength range (nm) | Irradiance (W/$m^2$) | Irradiance tolerance (W/$m^2$) |
|---|---|---|
| 420~460 | 12 | ±3.0 |
| 460~500 | 26 | ±2.6 |

<Evaluation of Fade Rate>

The fade rate was evaluated by the following method. The transmittance (measurement wavelength: 550 nm) of the spectacle lens before light emission (uncolored state) was measured with a spectrophotometer (commercially available from Otsuka Electronics Co., Ltd.). The transmittance measured here is called an "initial transmittance".

Light was emitted to each spectacle lens using a xenon lamp as a light source through an air mass filter for 15 minutes, and the photochromic layer was colored. Light emission was performed sot that the irradiance and irradiance tolerance were values shown in Table 2 as specified in JIS T 7333: 2005. The transmittance during the coloring was measured in the same manner as the initial transmittance. The transmittance measured here is called a "transmittance during coloring".

Then, the time required for the transmittance to reach [(initial transmittance-transmittance during coloring)/2] from the time when light emission was stopped was measured.

The spectacle lens containing Exemplary Compound 1 had a luminous transmittance T % of 36% during coloring and had a half-life time of 245 seconds.

Based on the above results, it was confirmed that the above spectacle lens was a spectacle lens (photochromic lens) exhibiting photochromic properties in which the luminous transmittance before and after UV emission changed and the state was returned to the original state over time when emission of ultraviolet rays was stopped.

Finally, the above aspects are summarized.

According to one aspect, there is provided a photochromic compound represented by General Formula 1.

In one aspect, the azine ring group may be an azine ring group selected from the following groups.

[C40]

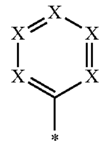

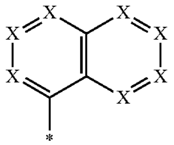

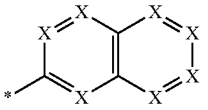

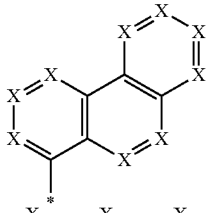

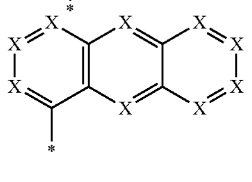

-continued

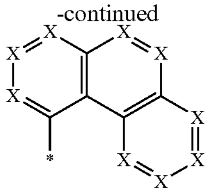

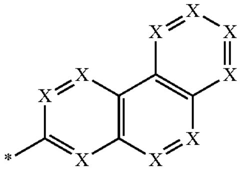

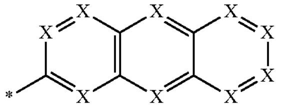

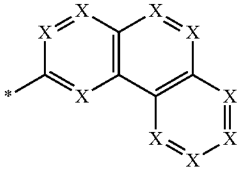

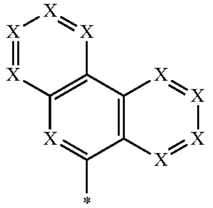

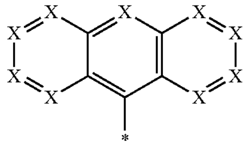

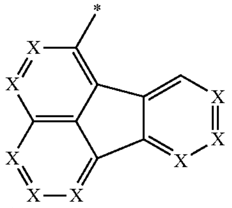

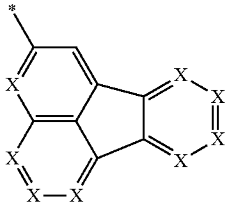

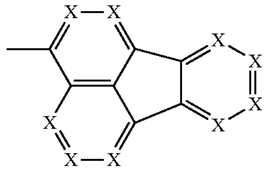

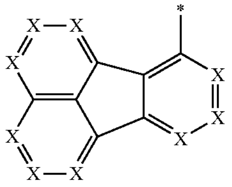

-continued

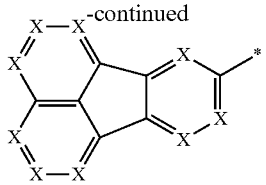

(in the above, X represents a nitrogen atom or a carbon atom which is unsubstituted or has a substituent, a plurality of X's contained in each azine ring group may be the same as or different from each other, provided that one or more of the plurality of X's contained in each azine ring group represent a nitrogen atom; and * represents a bonding position with L when b is an integer of 1 or more and a bonding position with D when b is 0).

In one aspect, in the azine ring group represented by Az in General Formula 1, among constituent atoms constituting an azine ring, when b is an integer of 1 or more, one or both of constituent atoms at two positions adjacent to a carbon atom bonded to a linking group L may be a nitrogen atom, and when b is 0, one or both of constituent atoms at two positions adjacent to a carbon atom bonded to a photochromic dye structure D may be a nitrogen atom.

In one aspect, the azine ring group may be an azine ring group selected from the following groups.

[C41]

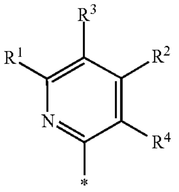

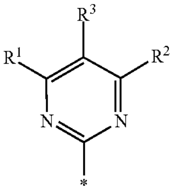

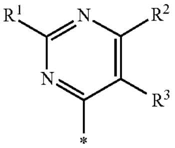

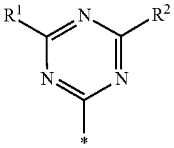

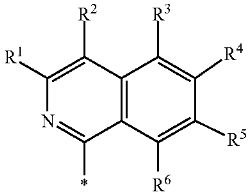

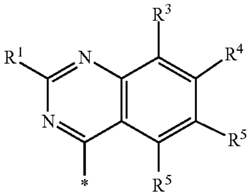

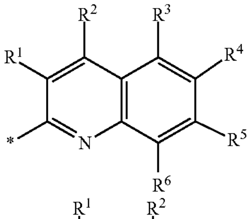

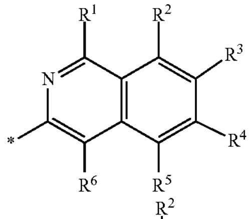

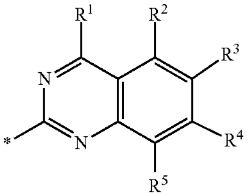

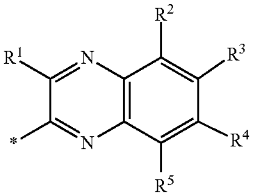

-continued

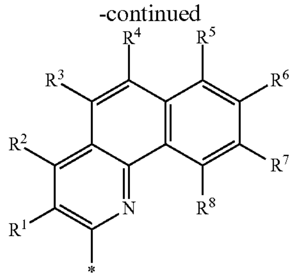

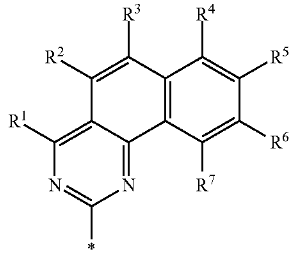

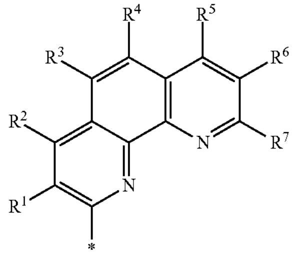

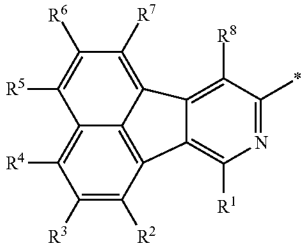

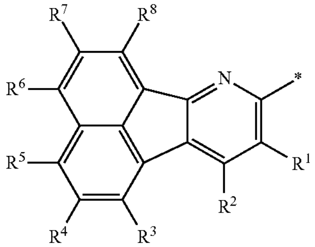

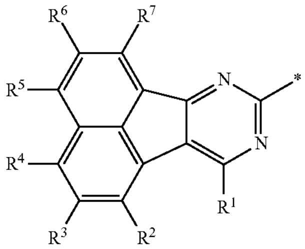

(in the above, $R^1$ to $R^8$ each independently represent a hydrogen atom or a substituent, * represents a bonding position with L when b is an integer of 1 or more and a bonding position with D when b is 0).

In one aspect, the azine ring group may be an azine ring group selected from the following groups.

[C42]

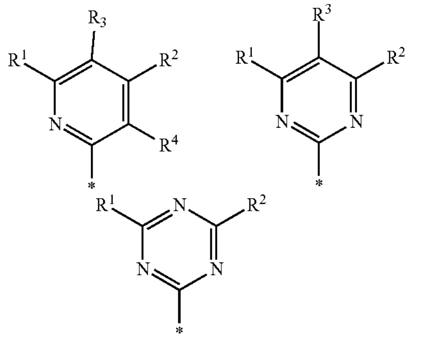

(in the above, $R^1$ to $R^3$ each independently represent a hydrogen atom or a substituent, * represents a bonding position with L when b is an integer of 1 or more and a bonding position with D when b is 0).

In one aspect, the photochromic dye structure represented by D may be a photochromic dye structure selected from the group consisting of naphthopyran and its derivatives and indeno-fused naphthopyran and its derivatives.

In one aspect, b may be 0.

In one aspect, b may be 1 and L may represent an arylene group which is unsubstituted or has a substituent or a heteroarylene group which is unsubstituted or has a substituent.

In one aspect, the photochromic compound represented by General Formula 1 may be a photochromic compound represented by any of General Formula 3 to General Formula 11.

In one aspect, in General Formula 3 to General Formula 11, either one of B and B' may represent a partial structure represented by General Formula 2.

In one aspect, the photochromic compound represented by General Formula 1 may be a photochromic compound represented by General Formula 7.

In one aspect, in General Formula 7, either one of B and B' may represent a partial structure represented by General Formula 2.

In one aspect, in General Formula 7, $R^{12}$ to $R^{15}$ all may represent a hydrogen atom.

According to one aspect, there is provided a photochromic composition including the photochromic compound.

In one aspect, the photochromic composition may further include a polymerizable compound.

According to one aspect, there is provided a photochromic article including a cured product obtained by curing the photochromic composition.

In one aspect, the photochromic article may include a substrate and a photochromic layer which is the cured product.

In one aspect, the photochromic article may be a spectacle lens.

In one aspect, the photochromic article may be a goggle lens.

In one aspect, the photochromic article may be a visor part of a sun visor.

In one aspect, the photochromic article may be a shield member of a helmet.

According to one aspect, there is provided spectacles including the spectacle lens.

Two or more of the various aspects and forms described in this specification may be combined in arbitrary combinations.

The embodiments disclosed herein are only examples in all respects and should not be considered as restrictive. The scope of the present disclosure is not limited to the above description, but is defined by the scope of claims, and is intended to encompass equivalents to the scope of claims and all modifications within the scope of the claims.

The present disclosure is beneficial in the technical fields of spectacles, goggles, sun visors, helmets and the like.

What is claimed is:

1. A photochromic compound represented by the following General Formula 1:

(General Formula 1)

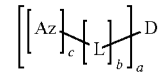

in General Formula 1, b is 0 or 1, wherein, when b is 1, L represents an arylene group which is unsubstituted or has a substituent or a heteroarylene group which is unsubstituted or has a substituent, D represents a photochromic dye structure, a and c each independently represent an integer of 1 or more; and when there are a plurality of Az's in General Formula 1, the plurality of Az's may be the same as or different from each other, and when b is 1 and a is 2 or more, in which case there are a plurality of L's in General Formula 1, the plurality of L's may be the same as or different from each other, and Az represents one of the following two azine ring groups:

in the following azine ring group:

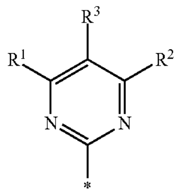

$R^1$ and $R^2$ each represent a phenyl group and $R^3$ represents a hydrogen atom;

* represents a bonding position with L when b is 1 and a bonding position with D when b is 0, and in the following azine ring group:

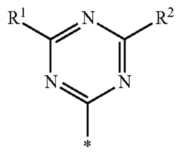

$R^1$ and $R^2$ each independently represent a phenyl group or a methoxy group;

* represents a bonding position with L when b is 1 and a bonding position with D when b is 0.

2. The photochromic compound according to claim 1, wherein the photochromic dye structure represented by D may be a photochromic dye structure selected from the group consisting of naphthopyran and its derivatives and indeno-fused naphthopyran and its derivatives.

3. The photochromic compound according to claim 1, wherein b is 0.

4. The photochromic compound according to claim 1 wherein b is 1.

5. The photochromic compound according to claim 1, wherein the photochromic compound represented by General Formula 1 is a photochromic compound represented by a general formula selected from the group consisting of the following General Formula 3, General Formula 4, General Formula 5, General Formula 6, General Formula 7, General Formula 8, General Formula 9, General Formula 10 and General Formula 11:

(General Formula 3)

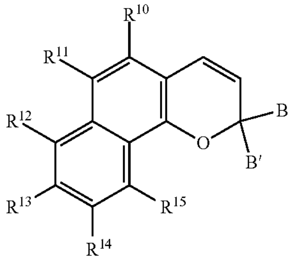

(General Formula 4)

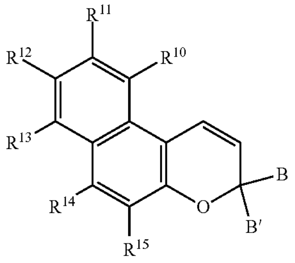

(General Formula 5)

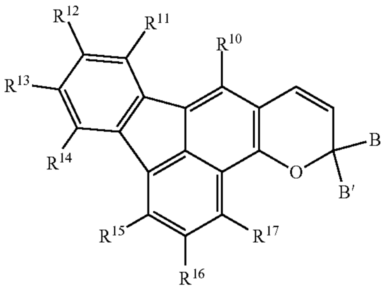

(General Formula 6)

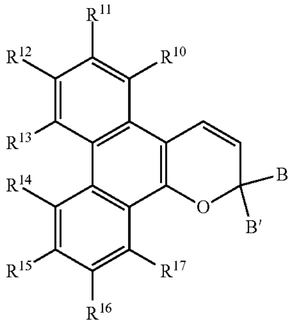

-continued (General Formula 7)

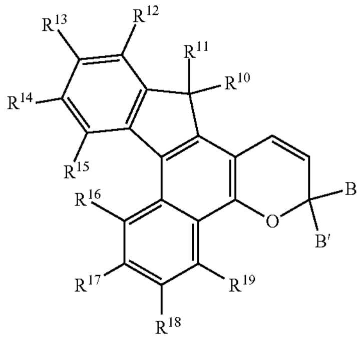

(General Formula 8)

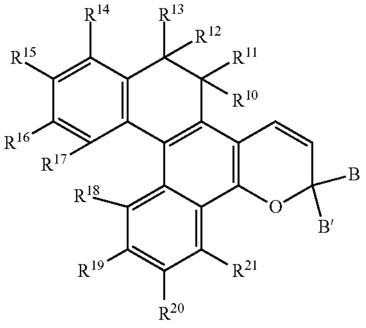

(General Formula 9)

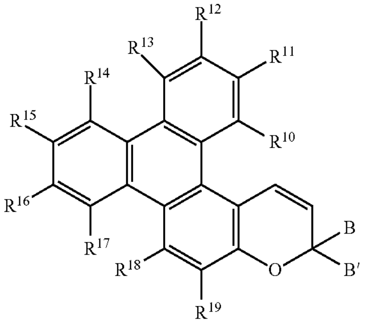

(General Formula 10)

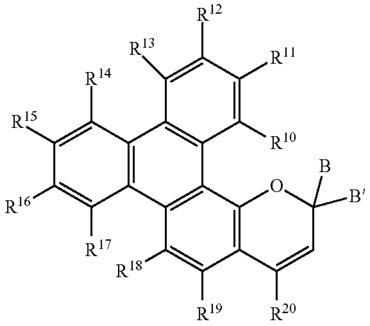

-continued (General Formula 11)

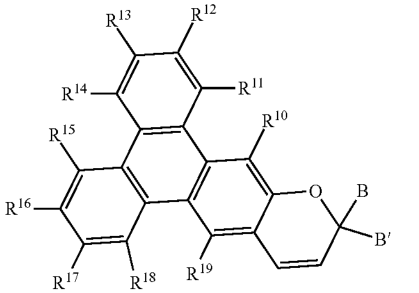

$R^{10}$ to $R^{15}$, B and B' in General Formula 3, $R^{10}$ to $R^{15}$, B and B' in General Formula 4, $R^{10}$ to $R^{17}$, B and B' in General Formula 5, $R^{10}$ to $R^{17}$, B and B' in General Formula 6, $R^{10}$ to $R^{1}$, B and B' in General Formula 7, $R^{10}$ to $R^{21}$, B and B' in General Formula 8, $R^{10}$ to $R^{19}$, B and B' in General Formula 9, $R^{10}$ to $R^{20}$, B and B' in General Formula 10, and $R^{10}$ to $R^{19}$, B and B' in General Formula 11 each independently represent a hydrogen atom or a substituent; provided that, any one of $R^{10}$ to $R^{15}$, B and B' in General Formula 3 represents a partial structure represented by the following General Formula 2, any one of $R^{10}$ to $R^{15}$, B and B' in General Formula 4 represents a partial structure represented by the following General Formula 2, any one of $R^{10}$ to $R^{17}$, B and B' in General Formula 5 represents a partial structure represented by the following General Formula 2, any one of $R^{10}$ to $R^{21}$, B and B' in General Formula 6 represents a partial structure represented by the following General Formula 2, any one of $R^{10}$ to $R^{19}$, B and B' in General Formula 7 represents a partial structure represented by the following General Formula 2, any one of $R^{10}$ to $R^{21}$, B and B' in General Formula 8 represents a partial structure represented by the following General Formula 2, any one of $R^{10}$ to $R^{19}$, B and B' in General Formula 9 represents a partial structure represented by the following General Formula 2, any one of $R^{10}$ to $R^{20}$, B and B' in General Formula 10 represents a partial structure represented by the following General Formula 2, and any one of $R^{10}$ to $R^{19}$, B and B' in General Formula 11 represents a partial structure represented by the following General Formula 2;

(General Formula 2)

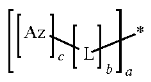

in General Formula 2, a is 1, Az, L, b and c each have the same meanings as in General Formula 1, and * represents a bonding position with an adjacent atom.

6. The photochromic compound according to claim 5, wherein either one of B and B' represents a partial structure represented by General Formula 2.

7. The photochromic compound according to claim 1, wherein the photochromic compound represented by General Formula 1 is a photochromic compound represented by the following General Formula 7:

(General Formula 7)

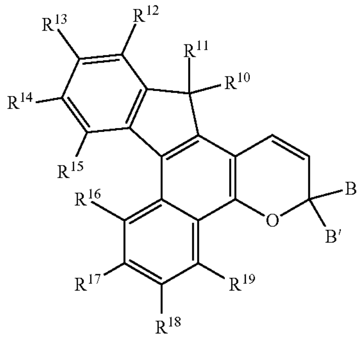

in General Formula 7, $R^{10}$ to $R^{19}$, B and B' each independently represent a hydrogen atom or a substituent, provided that any one of $R^{10}$ to $R^{19}$, B and B' represents a partial structure represented by the following General Formula 2:

(General Formula 2)

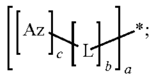

in General Formula 2, a is 1, Az, L, b and c each have the same meanings as in General Formula 1, and * represents a bonding position with an adjacent atom.

8. The photochromic compound according to claim 7, wherein either one of B and B' represents a partial structure represented by General Formula 2.

9. The photochromic compound according to claim 7, wherein, in General Formula 7, $R^{12}$ to $R^{15}$ all represent a hydrogen atom.

10. A photochromic composition comprising the photochromic compound according to claim 1.

11. The photochromic composition according to claim 10, further comprising a polymerizable compound.

12. A photochromic article comprising a cured product obtained by curing the photochromic composition according to claim 11.

13. The photochromic article according to claim 12, comprising a substrate and a photochromic layer which is the cured product.

14. The photochromic article according to claim 12, wherein the photochromic article is a spectacle lens.

15. Spectacles comprising the spectacle lens according to claim 14.

16. The photochromic article according to claim 12, wherein the photochromic article is a goggle lens, a visor part of a sun visor, or a shield member of a helmet.

* * * * *